US012145154B1

(12) United States Patent
Trahan et al.

(10) Patent No.: US 12,145,154 B1
(45) Date of Patent: Nov. 19, 2024

(54) ASSAY ARRAY PLATE

(71) Applicant: SomaLogic Operating Co., Inc., Boulder, CO (US)

(72) Inventors: Rachel Woolaver Trahan, Arvada, CO (US); Jon H. Monserud, Golden, CO (US); Maarten Rutgers, Los Angeles, CA (US); Robert T. Scribner, Longmont, CO (US)

(73) Assignee: SomaLogic Operating Co., Inc., Boulder, CO (US)

( * ) Notice: Subject to any disclaimer, the term of this patent is extended or adjusted under 35 U.S.C. 154(b) by 0 days.

(21) Appl. No.: 18/405,725

(22) Filed: Jan. 5, 2024

(51) Int. Cl.
*B01L 3/00* (2006.01)

(52) U.S. Cl.
CPC ... *B01L 3/50853* (2013.01); *B01L 2200/0689* (2013.01); *B01L 2300/0829* (2013.01)

(58) Field of Classification Search
None
See application file for complete search history.

(56) References Cited

U.S. PATENT DOCUMENTS 5,078,164 A * 1/1992 Doellgast ................ B01L 9/523 134/102.1
6,423,273 B1 * 7/2002 O'Mara ............ B01L 3/502707 422/503
8,034,306 B1 * 10/2011 Grudzien ............ B01L 3/50853 422/561
2002/0106787 A1 * 8/2002 Benn .................... C12Q 1/6869 435/303.1
2004/0266023 A1 * 12/2004 Clark .................. B01L 3/50255 436/180
2005/0214854 A1 * 9/2005 Dahm ..................... B01L 3/502 435/287.2
2019/0314812 A1 * 10/2019 Hickerson ........... B01L 3/50255
2020/0298241 A1 * 9/2020 Kabaha ...................... B01L 9/52
2022/0065757 A1 * 3/2022 Corwin .................... B01L 3/523
2023/0330678 A1 * 10/2023 Ung ..................... B01L 3/50853

OTHER PUBLICATIONS

ArraySlide 24-4 Hybridization Chamber Cassette AHS24-4. Retrieved from Internet: <https://www.gelcompanystore.com/collections/arrayslide/products/ahs24-4>; Mar. 22, 2024.
ArraySlide 16-4 Hybridization Chamber Cassette AHS16-4. Retrieved from Internet: <https://www.gelcompanystore.com/collections/arrayslide/products/ahs16-4>; Mar. 22, 2024.
(Continued)

*Primary Examiner* — Brian R Gordon
(74) *Attorney, Agent, or Firm* — Kolitch Romano Dascenzo Gates LLC

(57) ABSTRACT

Array plates in accordance with the present teachings may include: a perforated cover plate defining a plurality of first apertures, a supportive base plate defining a planar surface, and a gasket sandwiched between the perforated cover plate and the supportive base plate. Array plates are configured to support a slide, such that the slide is sandwiched between the gasket and the supportive base plate. In some examples, an array plate system in accordance with the present teachings includes a slide ejection tool and/or a gasket installation tool.

16 Claims, 34 Drawing Sheets

(56) References Cited

OTHER PUBLICATIONS

Arrayit Microarray Multi-Well Hybridization Cassette AHC4X24. Retrieved from Internet: <https://shop.arrayit.com/hybridizationcassette4x24.aspx>; Mar. 22, 2024.

Microplate Microarray Hybridization Cassette MMH96 (Glass Plate). Retrieved from Internet: <https://shop.arrayit.com/microplate-microarray.aspx>; Mar. 22, 2024.

Hybridization Cassettes. Retrieved from Internet: <https://shop.arrayit.com/hybridizationcassettes.aspx>; Mar. 22, 2024.

Microarrays. Retrieved from Internet: <https://www.gelcompanystore.com/collections/arrayslide>; Mar. 22, 2024.

Hybridization and Incubation. Retrieved from Internet: <https://gracebio.com/products/hybridization-and-incubation/>; Mar. 22, 2024.

Array Plate Microarray Hybridization Station (110 Volt). Retrieved from Internet: <https://shop.arrayit.com/hybridization-stations.aspx>; Mar. 22, 2024.

Screen capture from YouTube video clip entitled "ArraySlides by Gel Company," 1 page, uploaded on Apr. 3, 2023 by user "Gel Company." Retrieved from Internet: <https://youtu.be/tbprQ9IXE9l>.

* cited by examiner

ASSAY ARRAY PLATE

FIELD

This disclosure relates to systems and methods for slide retention for molecular assays. More specifically, the disclosed embodiments relate to array plates, such as those suitable for use in hybridization assays.

INTRODUCTION

Proteomics assays and other assays utilizing DNA (deoxyribonucleic acid) hybridization processes are often performed utilizing printed microarray slides. Printed microarray slides are generally comprised of a series of "spots" or "features" printed onto a glass surface. Each spot or feature generally comprises a collection of oligonucleotides (AKA DNA oligomers, or oligos) attached to the glass surface. During the DNA hybridization process, an aqueous sample of oligos in solution is introduced to the printed microarray slides, facilitating hybridization between the oligos in solution and the spots. Generally, the oligos in solution have been prepared with an attached fluorophore, such that a fluorescent light intensity of each spot may be used to measure relative oligo concentrations within a fluid sample.

DNA hybridization generally takes place in gasket-slide chambers, which utilize gaskets to provide multiple wells per printed microarray slide. However, conventional gasket-slide chambers have multiple limitations. In some examples, conventional gasket-slide chambers include a microarray slide paired with a second slide including thin extruded silicone gaskets. The microarray slide and the gasket slide collectively form wells defined by the silicone gaskets when assembled. During assembly, aqueous samples are pipetted onto the gasket slide such that each sample is encircled by a gasket. After the aqueous samples are applied to the gasket slide, the microarray slide is carefully placed on top of the gasket slide, such that the spots and gaskets face each other. These gasket-slide chambers have significant limitations as they are prone to leaks, and therefore are difficult to assemble, have limited usable slide area, resulting in an increased cost per sample and an irregular mixing pattern, which limits array uniformity.

In some examples, DNA hybridization takes place in assemblies known as hybridization plates, which compress a gasket and slide between two aluminum plates. However, conventional hybridization plates are prone to leaking, resulting in cross-contamination of samples. Furthermore, conventional hybridization plates are not suitable for use with common slide formats, resulting in a loss of usable slide area and an increased cost per sample.

SUMMARY

The present disclosure provides systems, apparatuses, and methods relating to hybridization plates.

In some examples, an array plate according to the present disclosure includes: a perforated cover plate defining a plurality of first apertures; a supportive base plate defining a planar surface; and a gasket sandwiched between the perforated cover plate and the supportive plate and defining a plurality of second apertures, such that the plurality of first apertures and the plurality of second apertures collectively define a plurality of wells.

In some examples, an array plate according to the present disclosure comprises: a perforated cover plate defining a plurality of first apertures; a supportive base plate defining a planar surface; a gasket disposed between the perforated cover plate and the supportive plate and defining a plurality of second apertures, such that the first plurality of apertures and the second plurality of apertures collectively define a plurality of wells; and one or more slides sandwiched between the gasket and the planar surface, such that the planar surface supports the one or more slides.

In some examples, a method of assembling an array plate comprises: placing one or more slides into a bottom plate of the array plate; pressing a gasket into a top plate of the array plate; aligning the top plate and the gasket with the bottom plate and the one or more slides; and compressing the array plate by tightening one or more fasteners extending through the bottom plate and the top plate.

Features, functions, and advantages may be achieved independently in various embodiments of the present disclosure, or may be combined in yet other embodiments, further details of which can be seen with reference to the following description and drawings.

DETAILED DESCRIPTION

Figure 1:
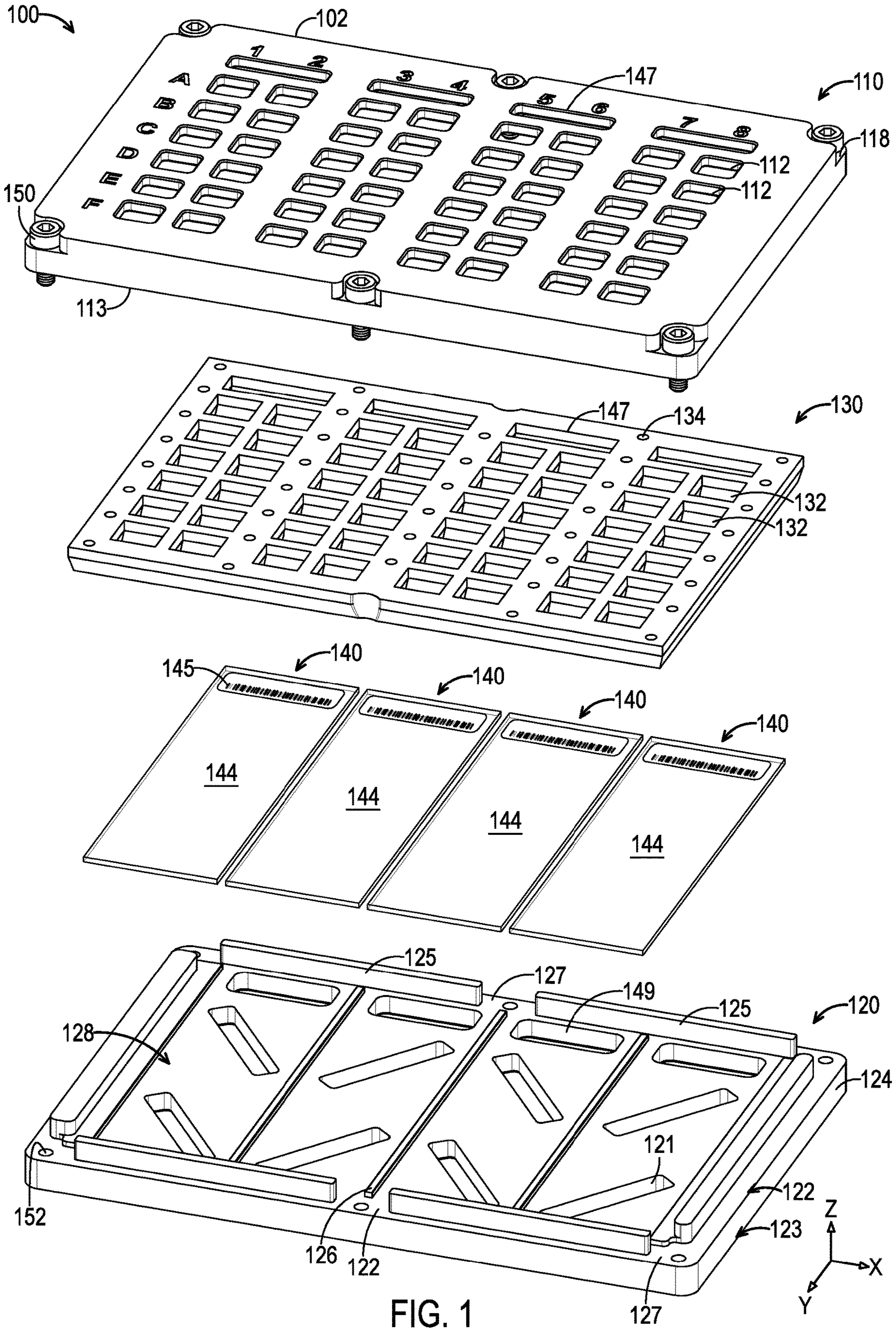
FIG. 1 is an exploded perspective view of a first illustrative array plate in accordance with aspects of the present disclosure.
Figure 2:
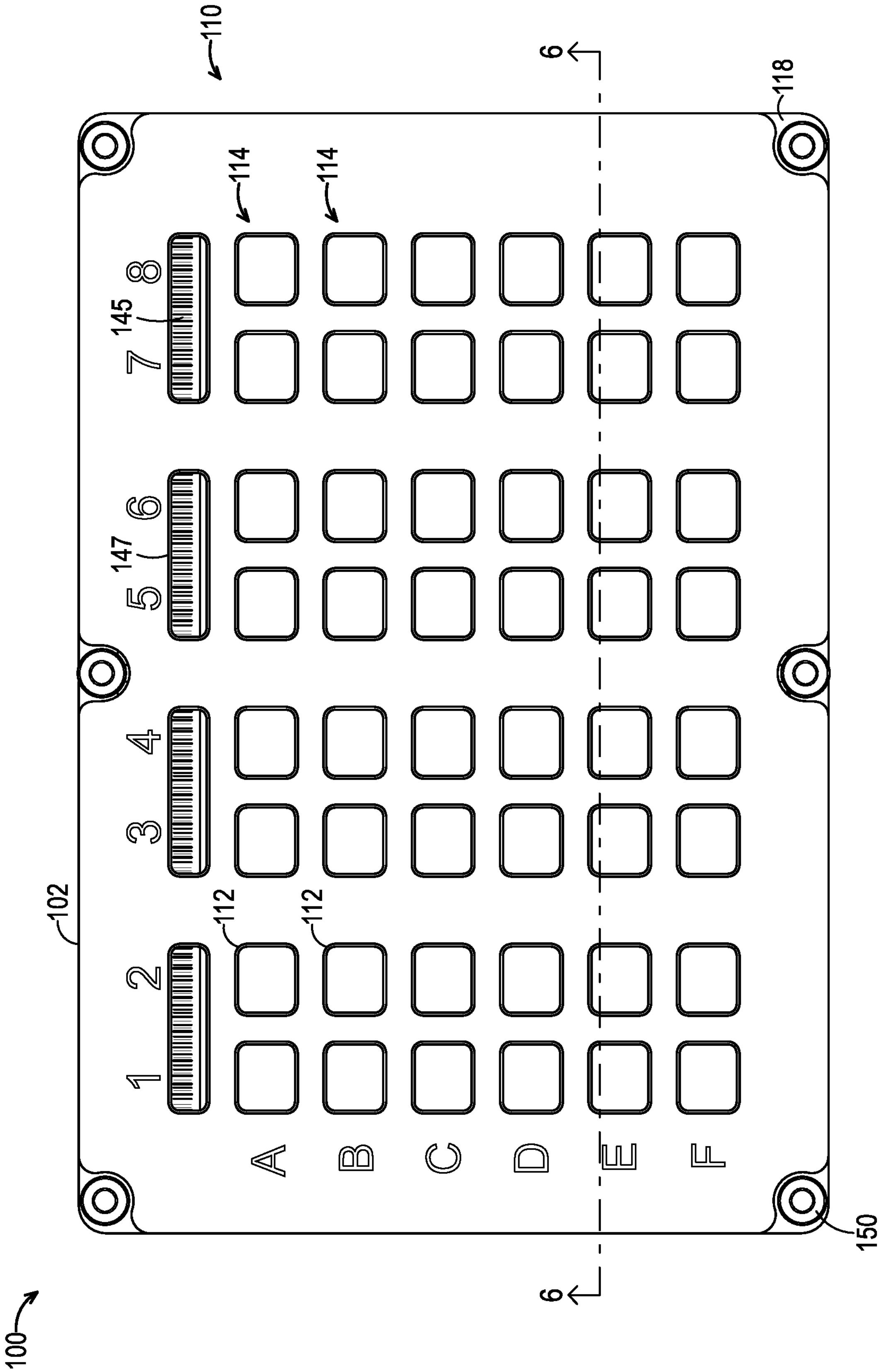
FIG. 2 is a top plan view of the first illustrative array plate of FIG. 1.

Various aspects and examples of hybridization array plates, as well as related methods, are described below and illustrated in the associated drawings. Unless otherwise specified, a hybridization array plate in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

"DNA" means deoxyribonucleic acid.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, an array plate, such as a hybridization plate, in accordance with the present teachings may include a perforated cover plate defining a plurality of first apertures, a supportive base plate defining a planar surface, and a gasket sandwiched between the perforated cover plate and the supportive base plate. While plates according to the present disclosure are referred to throughout as hybridization plates, the plates may be suitable for use in a wide variety of laboratory assays and/or procedures, such as hybridization assays, polymerase chain reactions, gene expression analysis, tissue analysis, and/or the like. Hybridization plates according to the present teachings may additionally and/or alternatively be referred to as array plates, laboratory plates, hybridization cassettes and/or the like. The supportive base plate is configured to support one or more slides suitable for use in laboratory assays, such as hybridization assays, and/or the like. Accordingly, slides installed within the hybridization plate contact the planar surface of the supportive base plate. The gasket defines a plurality of second apertures, which are complementary to the plurality of first apertures, such that the first plurality of apertures and the second plurality of apertures collectively define a plurality of wells when one or more slides are installed within the hybridization plate.

In some examples, hybridization plates in accordance with the present teachings include a plurality of compression screws or fasteners, which are configured to retain the hybridization plate in an assembled configuration. Accordingly, in some examples, the perforated cover plate and supportive base plate each comprise a plurality of through holes, each configured to receive a respective fastener. In some examples, the perforated cover plate and the supportive base plate each comprise at least six through holes and corresponding fasteners, four disposed at corners of the hybridization plate, and two disposed along long edges of the hybridization plate. Tightening the fasteners is configured to compress the gasket between the perforated cover plate and the supportive base plate. When a slide is installed within the hybridization plate, tightening the fasteners compresses the slide between the gasket and the supportive base plate, forming a plurality of water-tight wells having walls formed by the gasket and perforated cover plate and bottoms formed by the slide. Providing at least six fasteners evenly distributes compression about the hybridization plate, reducing leakage along a long axis of the hybridization plate. In some examples, the plurality of fasteners comprise recessed screws, such that a flat foil seal may be applied over the perforated cover plate, sealing the wells of the hybridization plate.

The supportive base plate is configured to evenly distribute pressure across a bottom surface of a slide installed within the hybridization plate. As the fasteners are tightened, compressing the slide between the gasket and the supportive base plate, the supportive base plate applies pressure along the plane defined by the slide, instead of concentrating pressure at edges of the slide. Bowing of the slides relative to the gasket is therefore prevented, reducing leakage.

In some examples, the hybridization plate further comprises walls, ridges, and/or lips defining one or more slide retention recesses, each configured to receive a slide. These walls retain each slide within the hybridization plate, preventing each slide from shifting when compression is applied by tightening the fasteners. Furthermore, because the bottom plate supports the slide within the hybridization plate, set screws are unnecessary. Set screws may induce cracking if overly tightened, resulting in leaks. In some examples, the walls extend from the supportive base plate, such that each recess is defined entirely by the supportive base plate. In some examples, the hybridization plate further comprises a slide support frame configured to be disposed between the supportive base plate and the gasket. In these examples, the slide support frame defines one or more windows, each configured to receive a slide. Accordingly, in these examples, the slide is received by a recess defined collectively by the slide support frame and the supportive base plate.

In some examples, hybridization plates in accordance with the present teachings include a gasket suitable for use with barcode slides, such as slides including a barcode aligned along an edge of the slide. Accordingly, gaskets in accordance with the present teachings may include second apertures corresponding to an array of wells configured to align with a printable region of a barcode slide, and a viewing window configured to align with the barcode of the barcode slide. In some examples, the perforated cover plate includes a complementary array of first apertures and a complementary viewing window, such that the barcode may be scanned when the hybridization plate is in an assembled configuration. In some examples, the supportive bottom plate further comprises a viewing window, such that a barcode disposed on a bottom surface of the slide may be scanned when the hybridization plate is in an assembled configuration.

Hybridization plates according to the present disclosure may have any suitable arrangement and number of slides and wells, such as 4×24, 4×12, 1×48, 4×8, and/or the like, wherein the first number refers to a number of slides per plate and the second number refers to a number of wells per slide.

In some examples, a method of assembly of hybridization plates in accordance with the present teachings includes: inserting slides into recesses formed by the supportive base plate, pressing the gasket into the perforated cover plate, aligning the perforated cover plate and gasket with the supportive base plate and slides, and compressing the hybridization plate by tightening the plurality of fasteners.

In some examples, the method of assembly may include utilizing a gasket application tool to press the gasket into the perforated cover plate. In some examples, the gasket application tool includes a plurality of protrusions and/or castellations extending from a first surface of the gasket application tool and configured to mate with the second apertures of the gasket, and a planar surface defining a second surface of the gasket application tool. In some examples, utilizing the gasket application tool to press the gasket into the perforated cover plate includes applying pressure to the planar surface. In some examples, the perforated cover plate and gasket include one or more mating features configured to retain the gasket within the perforated cover plate, such as pins, holes, metal lips, and/or the like.

In some examples, a method of disassembly of hybridization plates in accordance with the present teachings includes: loosening the plurality of fasteners, removing the perforated cover plate from the supportive base plate, and ejecting the one or more slides from the supportive base plate and/or the perforated cover plate. When disassembling the hybridization plates, the one or more slides may be retained by either the supportive base plate or the perforated cover plate. Accordingly, in some examples the method of disassembly may include using a slide ejector tool to eject slides from either and/or both of the supportive base plate and the perforated cover plate.

In examples wherein the supportive base plate entirely defines the slide retention recesses, the supportive base plate may include one or more apertures extending through the planar surface. Accordingly, a corresponding slide ejection tool may include protrusions configured to extend through the one or more apertures. In examples wherein the hybridization plate includes a slide support frame, a corresponding slide ejection tool may include protrusions configured to extend through the one or more windows. Using the slide ejection tool to eject slides from the supportive base plate includes pressing the slide ejection tool towards the slide such that the protrusions extend through the one or more apertures.

In examples wherein the slide ejection tool is utilized to eject the slides from the perforated cover plate, the slide ejection tool includes one or more protrusions configured to extend through the one or more viewing windows of the perforated cover plate. Accordingly, using the slide ejection tool to eject slides from the perforated cover plate includes pressing the slide ejection tool towards the perforated cover plate, such that the protrusions extend through the one or more viewing windows.

Examples, Components, and Alternatives

The following sections describe selected aspects of illustrative hybridization plates as well as related systems and/or methods. The examples in these sections are intended for illustration and should not be interpreted as limiting the scope of the present disclosure. Each section may include one or more distinct embodiments or examples, and/or contextual or related information, function, and/or structure.

A. First Illustrative Hybridization Plate

As shown in FIGS. 1-12, this section describes a first illustrative hybridization plate (AKA array plate) 100. As depicted in FIGS. 1-6, first illustrative hybridization plate 100 includes a perforated cover plate (AKA top plate) 110 defining a plurality of first apertures 112, a supportive base plate (AKA bottom plate) 120 defining a planar surface 122, and a gasket 130 sandwiched between the perforated cover plate and the supportive base plate. As described above, supportive base plate 120 is configured to support one or more slides 140 suitable for use in laboratory assays. Accordingly, a planar expanse defined by each slide 140 is supported by planar surface 122 when the slides are installed within the first hybridization plate 100. More specifically, slides utilized in laboratory assays such as hybridization assays generally have a bare surface 142, which is free of modification, and a printed surface 144, which has been modified (e.g., to include spots and/or features including DNA oligonucleotides). When slides 140 are installed within hybridization plate 100, bare surface 142 contacts supportive base plate 120, while printed surface 144 contacts gasket 130. Gasket 130 defines a plurality of second apertures 132 complementary to the plurality of first apertures 112, such that the first apertures, the second apertures, and the one or more slides 140 collectively define a plurality of wells 114 when the one or more slides are installed within the first hybridization plate 100.

Figure 21:
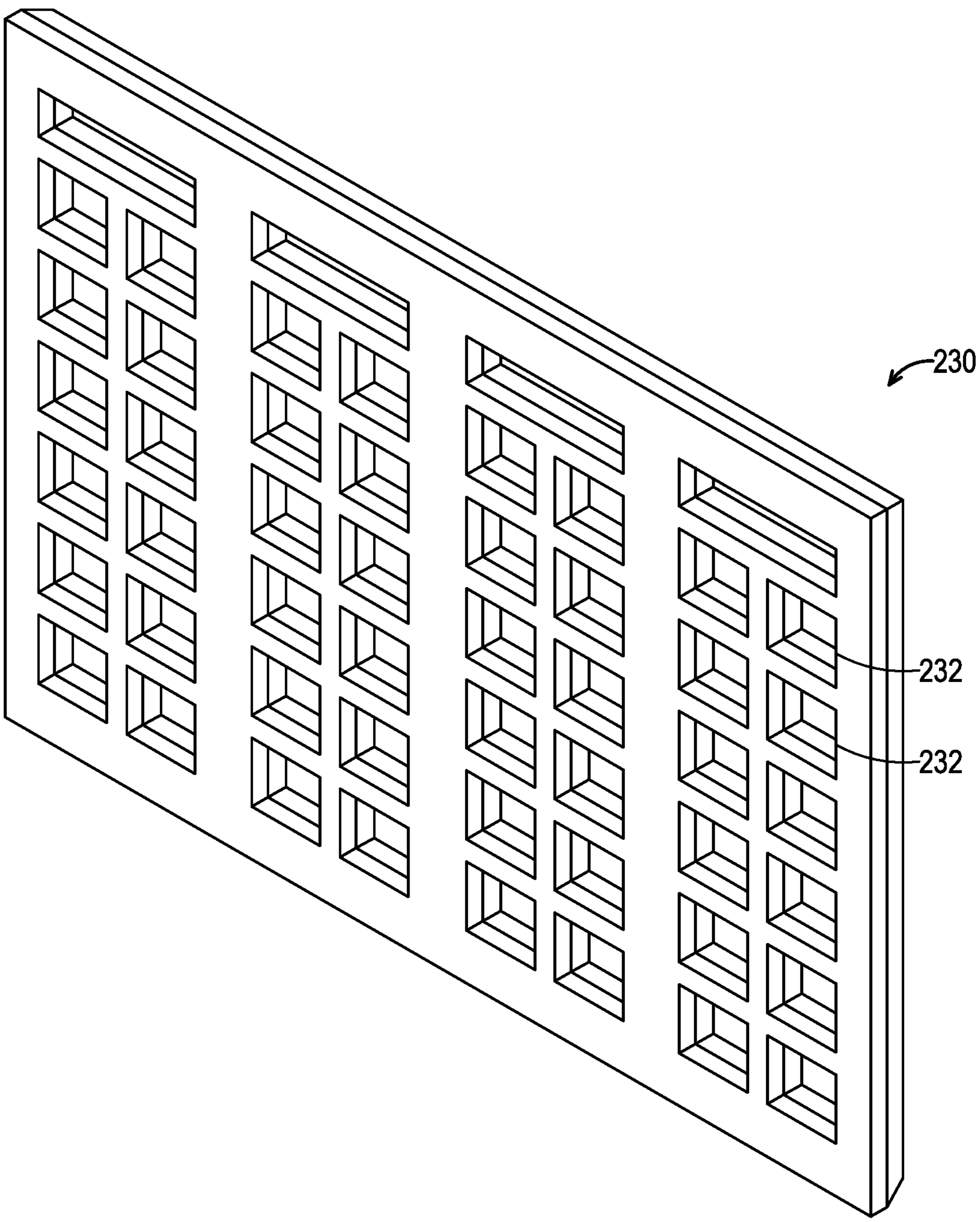
FIG. 21 is a perspective view of an illustrative gasket suitable for inclusion in the second illustrative array plate of FIG. 14.
Figure 22:
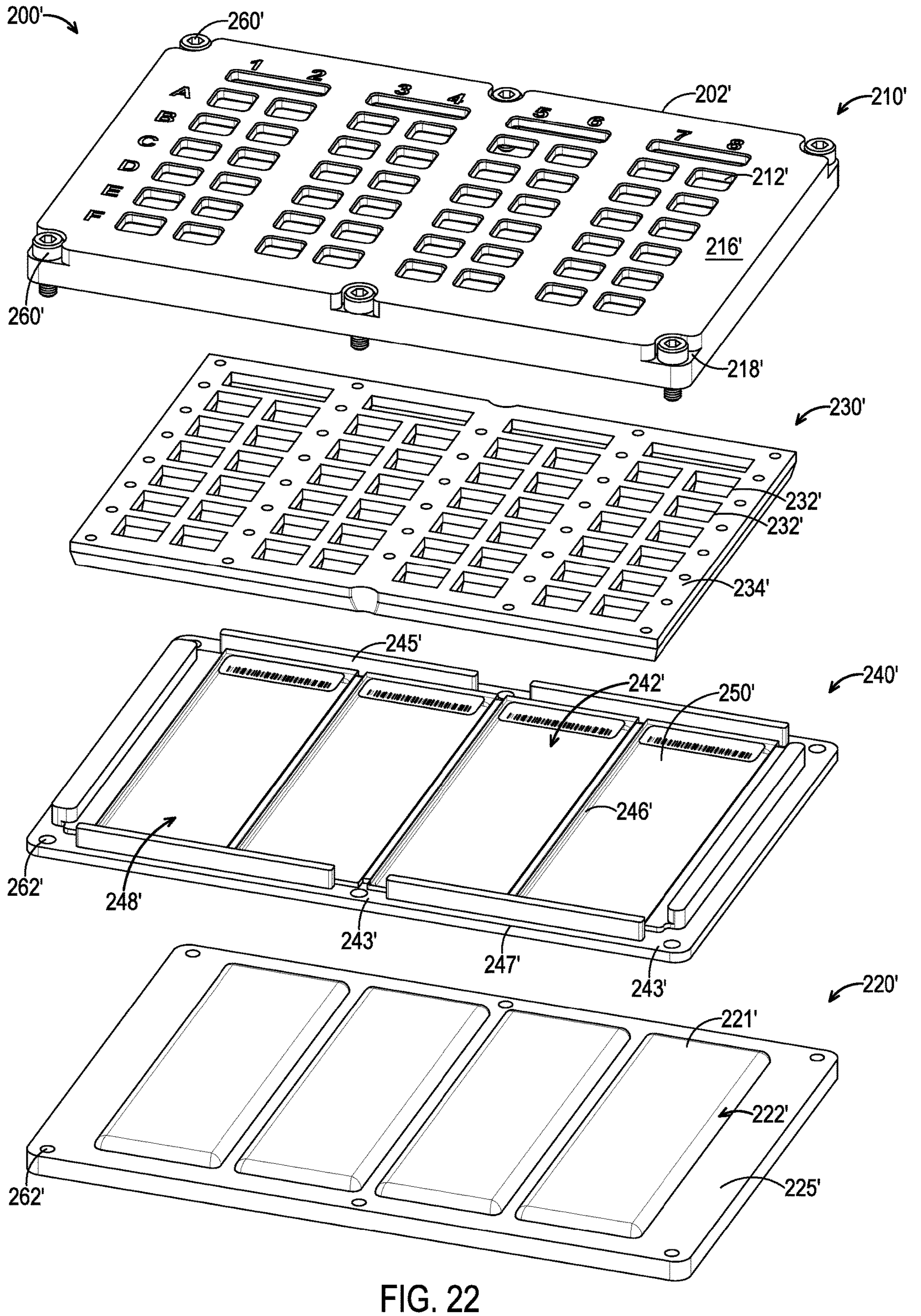
FIG. 22 is an exploded perspective view of a third illustrative array plate in accordance with aspects of the present disclosure.

While FIGS. 1-12 depict a hybridization plate 100 having a 4×12 configuration, having 4 slides, each with 12 wells or subarrays per slide, any suitable number of slides per plate and wells per slide may be utilized, such as such as 4×24 (4 slides, 24 wells per slide), 1×48 (1 slide, 48 wells per slide), 4×8 (4 slides, 8 wells per slide), and/or the like. In some examples, hybridization plates according to the present teachings have from 1 to 4 slides per plate. In some examples, hybridization plates according to the present teaching have from 1 to 96 wells per slide. Illustrative arrangements of wells depicted in FIGS. 21 and 22 are suitable for use in hybridization plate 100.

Hybridization plate 100 includes a plurality of fasteners 150 configured to retain the hybridization plate in an assembled configuration (i.e., with gasket 130 and slide 140 compressed between perforated cover plate 110 and supportive base plate 120). Accordingly, perforated cover plate 110 and supportive base plate 120 each comprise a plurality of through holes 152, each configured to receive a respective fastener 150. Hybridization plate 100 may include any suitable number of through holes 152 and fasteners 150, however, in some examples, hybridization plate 100 includes at least six through holes 152 and at least six fasteners 150. The at least six fasteners and through holes may be distributed such that a fastener 150 and corresponding through hole 152 is disposed at each corner of the hybridization plate, and such that a fastener 150 and corresponding through hole 152 is disposed along each long edge 102 of hybridization plate 100. In some examples, hybridization plate 100 includes greater than six fasteners, such as eight fasteners, ten fasteners, twelve fasteners, and/or the like.

Tightening fasteners 150 compresses gasket 130 between perforated cover plate 110 and supportive base plate 120. When a slide 140 is installed within the hybridization plate, tightening fasteners 150 compresses the slide between the gasket and the supportive base plate, forming a plurality of wells 114 having walls formed by the gasket and perforated cover plate and floors, bottoms, and/or bases formed by the slide. Providing at least six fasteners 150 as described above evenly distributes compression about the hybridization plate, reducing leakage along a long axis of the hybridization plate. In hybridization plates utilizing fewer than six screws, tightening fasteners disposed at corners of the hybridization plates may induce bowing within the hybridization plates, especially when the hybridization plate is constructed using less rigid materials. Bowed hybridization plates may be susceptible to leaking between gasket 130 and one or more slides 140.

Fasteners 150 may comprise any suitable fasteners which may be tightened, compressing hybridization plate 100, such as screws, bolts, brads, and/or the like. However, in some examples, hybridization plates according to the present disclosure are configured to be disassembled underwater. Conventional hybridization plates often utilize thumb screws, which are difficult to turn underwater and impede application of a foil seal. Accordingly, in some examples, fasteners 150 are recessed relative to a top surface 116 of perforated cover plate 110, which facilitates a uniformly flat application of a foil seal over the top surface, sealing wells 114 to prevent evaporation. In some examples, perforated cover plate 110 includes fastener recesses 118 configured to receive fasteners 150, such that when fasteners 150 are tightened, the fasteners are flush with or recessed relative to top surface 116. Fastener recesses 118 may have any suitable depth, but are generally configured to have a depth substantially similar to a height of heads of fasteners 150. In some examples, fasteners 150 comprise recessed hex-head screws, which may be firmly tightened and easily loosened underwater when compared with thumb screws. In some examples, fasteners 150 comprise raised screws, which may extend above top surface 116, such as fasteners included in the example of FIGS. 15-21. Supportive base plate 120 defines a planar surface 122 configured to evenly distribute pressure across a bottom surface of a slide 140 installed within hybridization plate 100. As fasteners 150 are tightened, compressing the slide between the gasket and the supportive base plate, the supportive base plate applies pressure across the plane defined by the slide, instead of concentrating pressure at edges of the slide. Bowing of the slides relative to the gasket is therefore prevented, as compressing the hybridization plate reinforces flatness of the slides.

In the example depicted in FIGS. 1-6 and 10, supportive base plate 120 includes a panel or slab 124 defining planar surface 122. Slab 124 comprises a flat expanse of material configured to support one or more slides 140 from below. Conventional hybridization plates lack material disposed beneath the one or more slides. Accordingly, slides are supported entirely by a frame disposed only at edges of the slides, and are therefore prone to bowing and/or cracking. In contrast, supportive base plate 120 includes a single piece of material configured to both support slides 140 from below and retain slides 140 within the hybridization plate. Slab 124 may have any suitable thickness configured to prevent bowing, such as at least 1× a thickness of the one or more slides, at least 2× a thickness of the one or more slides, at least 5× a thickness of the one or more slides, at least 10× a thickness of the one or more slides and/or the like. Similarly, slab 124 may have any suitable thickness such as at least 1 mm, at least 2 mm, at least 5 mm, and/or the like.

Supportive base plate 120 further comprises peripheral walls 125 extending vertically from slab 124. Peripheral walls 125 retain slides 140 within supportive base plate 120. Peripheral walls 125 are generally aligned with lateral edges of the supportive base plate, but may be slightly inset, facilitating a slidable fit with peripheral walls 115 extending from perforated cover plate 110. In examples wherein hybridization plate 100 is configured for use with a single slide 140, peripheral walls 125 both retain the slide within the supportive base plate and prevent the slide from shifting when compression is applied to the hybridization plate. In some examples, a height of the peripheral walls is substantially similar to an uncompressed thickness of gasket 130, such that a top surface of each peripheral wall contacts a bottom surface of perforated cover plate 110 when the hybridization plate is assembled. In some examples, the height of the peripheral walls is slightly less than an uncompressed thickness of gasket 130, such that gasket 130 is compressed in thickness when hybridization plate 100 is assembled. Accordingly, in some examples, peripheral walls 125 have any suitable height relative to an uncompressed thickness of gasket 130, such as at least 100%, at least 95%, at least 90%, and/or the like. In some examples, peripheral walls 125 may have any suitable height, such as at least 5 mm, at least 8 mm, at least 10 mm, at least 15 mm, at least 20 mm, and/or the like.

In some examples, peripheral walls 125 provide apertures 127 at portions of supportive base plate 120 corresponding to through holes 152 through which fasteners 150 may extend. Specifically, apertures 127 are configured to accommodate recessed fasteners 150 and corresponding fastener recesses 118. Accordingly, in examples wherein the hybridization plate includes six fasteners 150 and corresponding through holes 152, peripheral walls 125 are discontinuous at corners of the supportive base plate, as well as at a point along each long edge 102 of the hybridization plate. While peripheral walls 125 are discontinuous in the example depicted in FIGS. 1-6, thereby forming apertures 127 within gaps between peripheral walls 125, any suitable apertures may be utilized, such as channels, holes, and/or the like. In some examples, peripheral walls 125 include channels such as those depicted in FIG. 7 and included within perforated cover plate 110.

In some examples, such as when hybridization plate has a four-slide configuration, supportive base plate 120 further comprises ridges 126 extending vertically from slab 124. Ridges 126 and peripheral walls 125 collectively define one or more slide retention recesses 128, each configured to receive a slide 140. In use, the one or more slides are seated within the one or more slide retention recesses such that bare surface 142 contacts slab 124. Peripheral walls 125 retain each slide within the hybridization plate, while ridges 126 retain each slide 140 within a respective slide retention recess 128, preventing each slide from shifting when compression is applied by tightening fasteners 150. Accordingly, slide retention recesses 128 have dimensions substantially similar to dimensions of slides 140, such as approximately 75 mm×25 mm×1 mm, 76.2 mm×25.2 mm×1 mm, and/or the like. In some examples, ridges 126 extend generally transverse to a long axis of supportive base plate 120, such that a long axis of each slide 140 is aligned with a short axis of the supportive base plate. However, in some examples, ridges 126 extend along a long axis of the supportive base plate.

Ridges 126 may have any suitable height configured to retain the slides within slide retention recesses 128, such as at least 1× a thickness of the one or more slides, at least 2× a thickness of the one or more slides, at least 3× a thickness of the one or more slides, and/or the like. Accordingly, in some examples, ridges 126 may have a height of at least 1 mm, at least 2 mm, at least 3 mm, at least 5 mm, and/or the like.

Slide retention recesses 128 retain slides 140 during use of the hybridization plate. Accordingly, in some examples, set screws are unnecessary for securing slides within the hybridization plate. Conventional hybridization plates utilize a set screw on a side of each slide, which is tightened to secure the slides in place. However, if the set screws are overtightened, compressing the hybridization plate may cause the slides to be compressed along edges of the slides (i.e., along x- and y-axes of the slide) and from above and below the slide (i.e., along the z-axis of the slide). Applying pressure to the slides from multiple directions may cause the slides to crack, which may result in leaking, loss of sample, and an inability to scan the slide. In contrast, in some examples, hybridization plate 100 does not include set screws, as slides 140 are retained entirely by slide retention recesses 128. Accordingly, no pressure is applied to edges of the slides when the hybridization plate is compressed (i.e., along the x- and y-axes of the slide). In other words, hybridization plate 100 compresses the slide only along the z-axis of the slide.

However, in some examples, hybridization plate 100 includes set screws disposed on a side of each slide. Because slides 140 are supported from below by slab 124, the set screws may be lightly tightened, such that the set screws prevent movement of the slides within slide retention recesses 128 without compressing the slides along the x- or y-axes.

Figure 3:
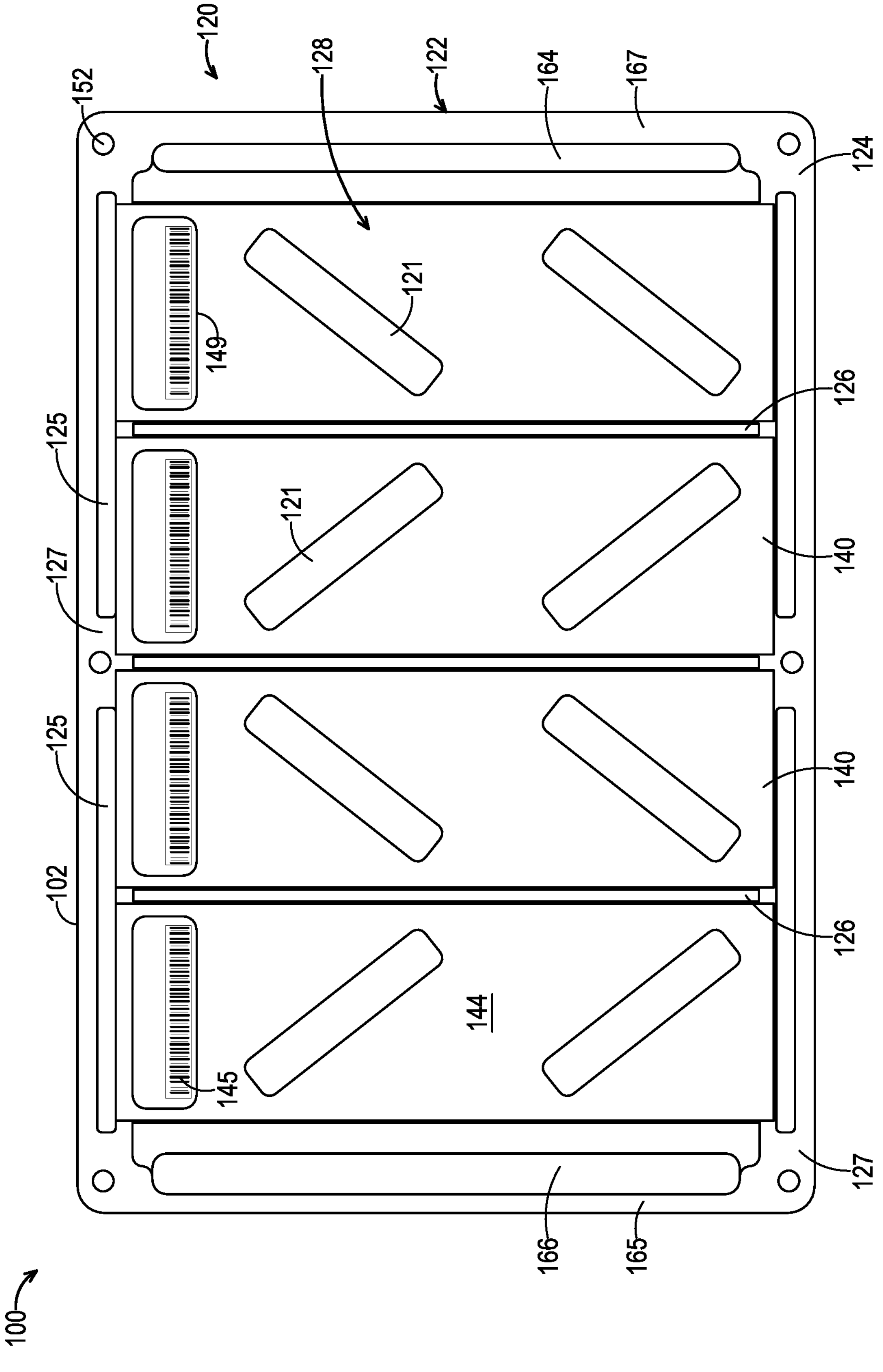
FIG. 3 is a top plan view of a bottom plate suitable for inclusion in the first illustrative array plate of FIG. 1, depicted with installed microarray slides.
Figure 4:
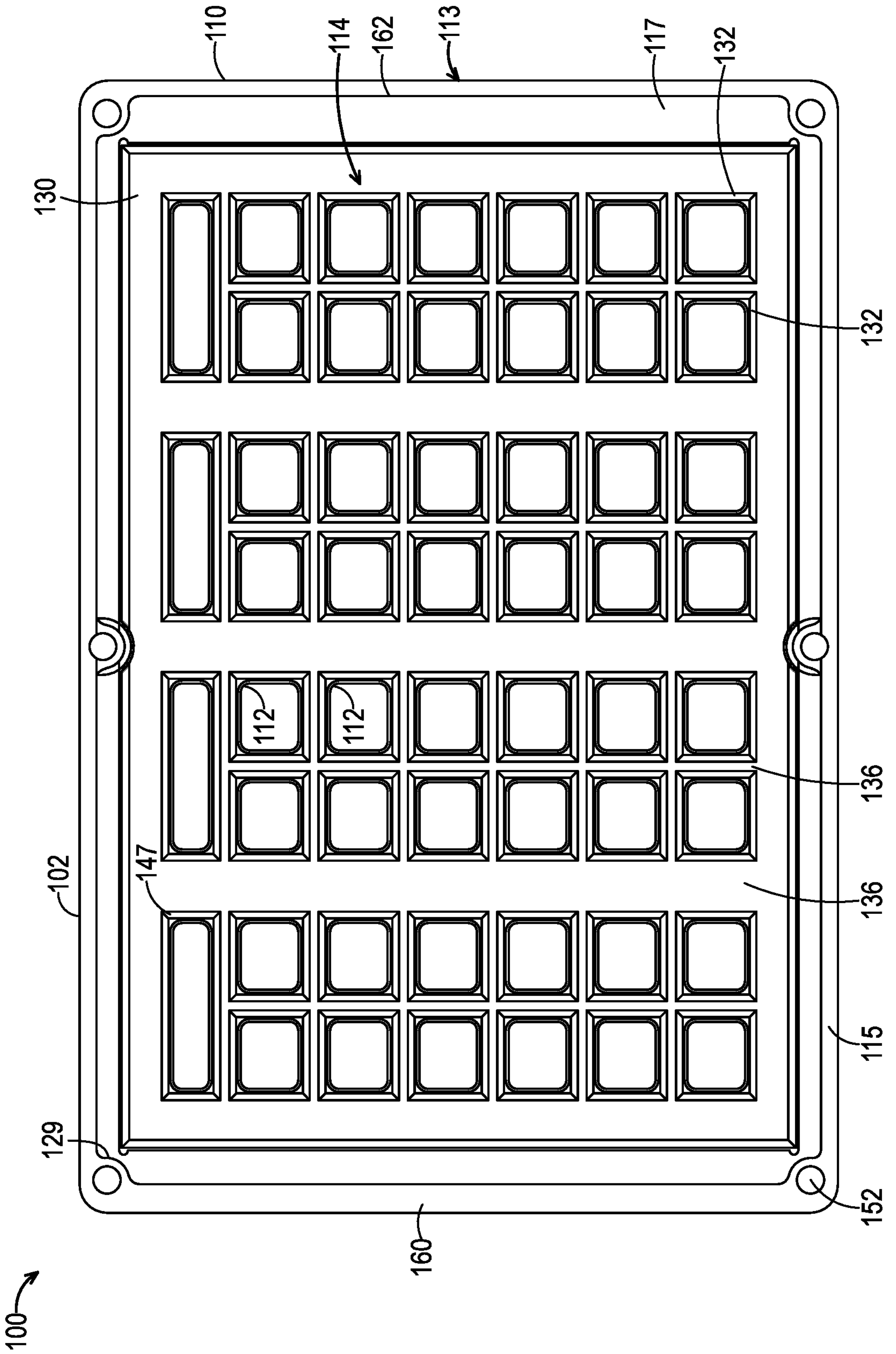
FIG. 4 is a bottom plan view of a top plate suitable for inclusion in the first illustrative array plate of FIG. 1, depicted with an installed gasket.
Figure 5:
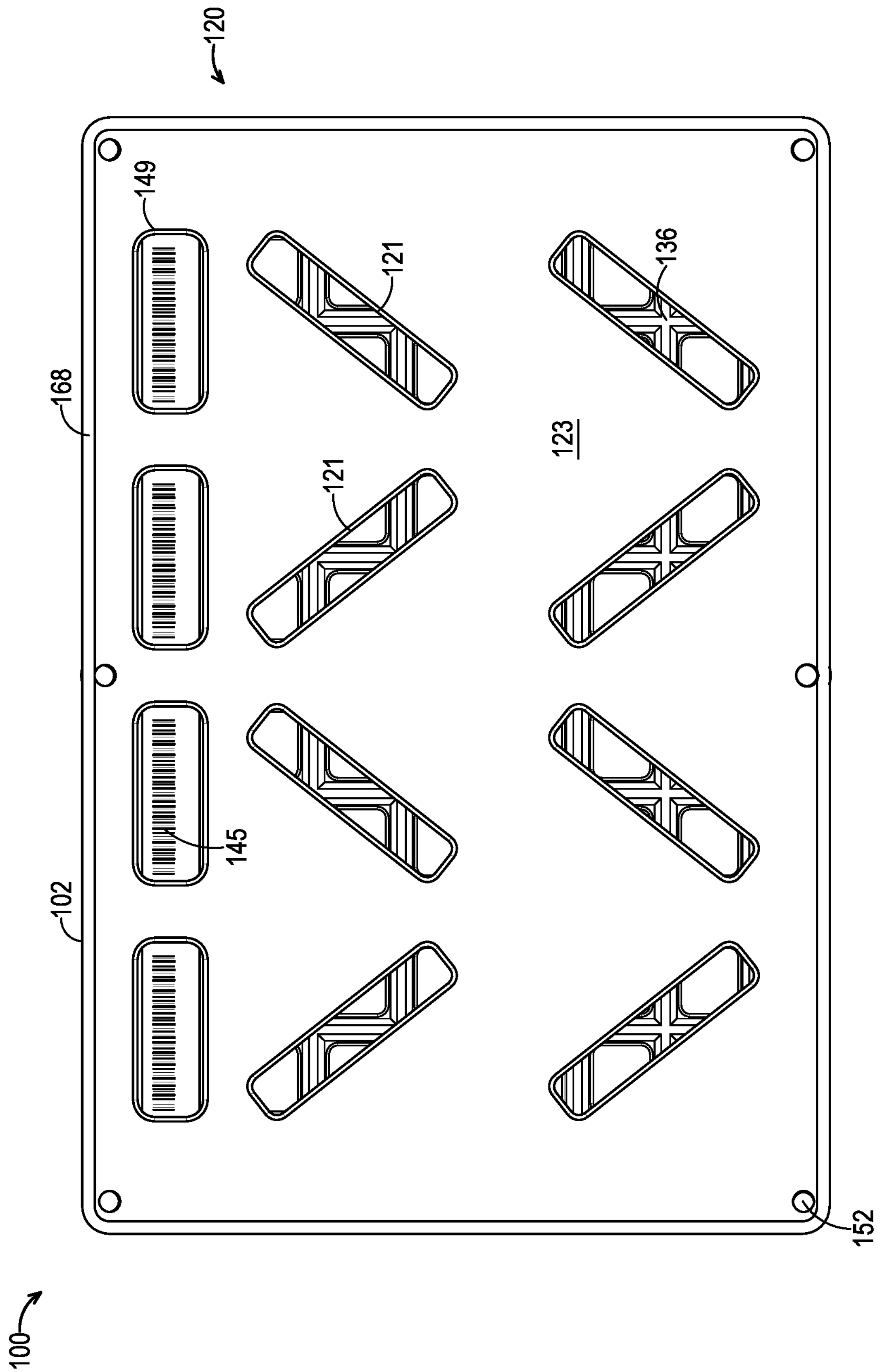
FIG. 5 is a bottom plan view of the first illustrative array plate of FIG. 1.
Figure 6:
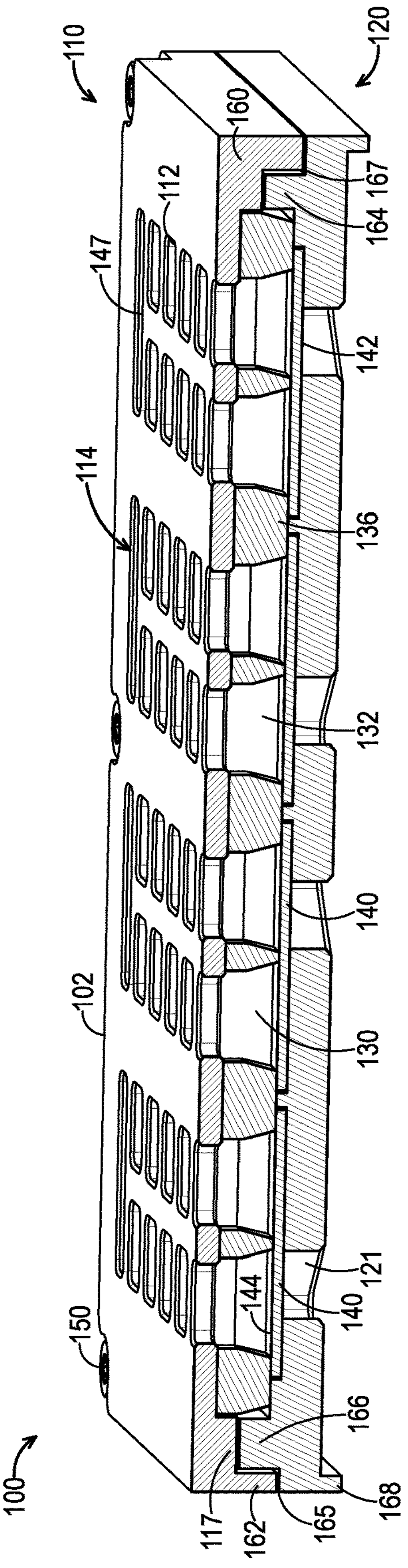
FIG. 6 is a sectional view of the first illustrative array plate of FIG. 1.

In some examples, as depicted in FIGS. 3, 4, and 6, perforated cover plate 110 and supportive base plate 120 have respective peripheral ridges 160, 162, 164, and 166. Peripheral ridges 160, 162, 164, and 166 are sized such that perforated cover plate 110 and supportive base plate 120 may be assembled in a single orientation. Accordingly, perforated cover plate 110 will not align with supportive base plate 120 if rotated 180 degrees from a correct orientation. Peripheral ridges 160, 162, 164, 166 are asymmetric borders extending from short edges of perforated cover plate 110 and supportive base plate 120. As depicted in FIG. 3, perforated cover plate 110 includes a wide ridge 160 disposed at a first edge of the cover plate and a narrow ridge 162 disposed at a second edge of the cover plate. Similarly, as depicted in FIG. 4, supportive base plate 120 includes a narrow ridge 164 disposed at a first edge of the supportive base plate and a wide ridge 166 disposed at a second edge of the supportive base plate. In some examples, narrow ridge 164 and wide ridge 166 form portions of peripheral walls 125. In some examples, ridges 164, 166 are inset slightly from edges of supportive base plate 120, providing recesses complementary to peripheral ridges 160, 162. In other words, ridge 164 provides a wide recess 167 and ridge 166 provides a narrow recess 165. Accordingly, when assembled, a left side of the supportive base plate lines up with a left side of the perforated cover plate because narrow recess 165 fits with narrow ridge 162. Similarly, a right side of the supportive base plate lines up with a right side of the perforated cover plate because wide recess 167 accommodates wide ridge 160. FIG. 6 depicts a cross-sectional view of assembled hybridization plate 100. As depicted, wide ridge 160 mates with narrow ridge 164 and wide recess 167, while narrow ridge 162 mates with wide ridge 166 and narrow recess 165.

Furthermore, as is best seen in FIG. 6, in some examples, supportive base plate 120 includes a peripheral rim 168 extending from a bottom surface 123 of the supportive base plate. Peripheral rim is suitable for use with a variety of shakers commonly used in laboratory experiments. In contrast, conventional hybridization plates lack a slab defining a planar surface, such as slab 124. Accordingly, conventional hybridization plates do not fit with many commonly used shakers, and must be incubated on flat-bottom plate shakers or custom plate shakers. Hybridization plates 100 are usable with a wide variety of plate shakers, such as those suitable for use with 96-well microplates.

Figure 7:
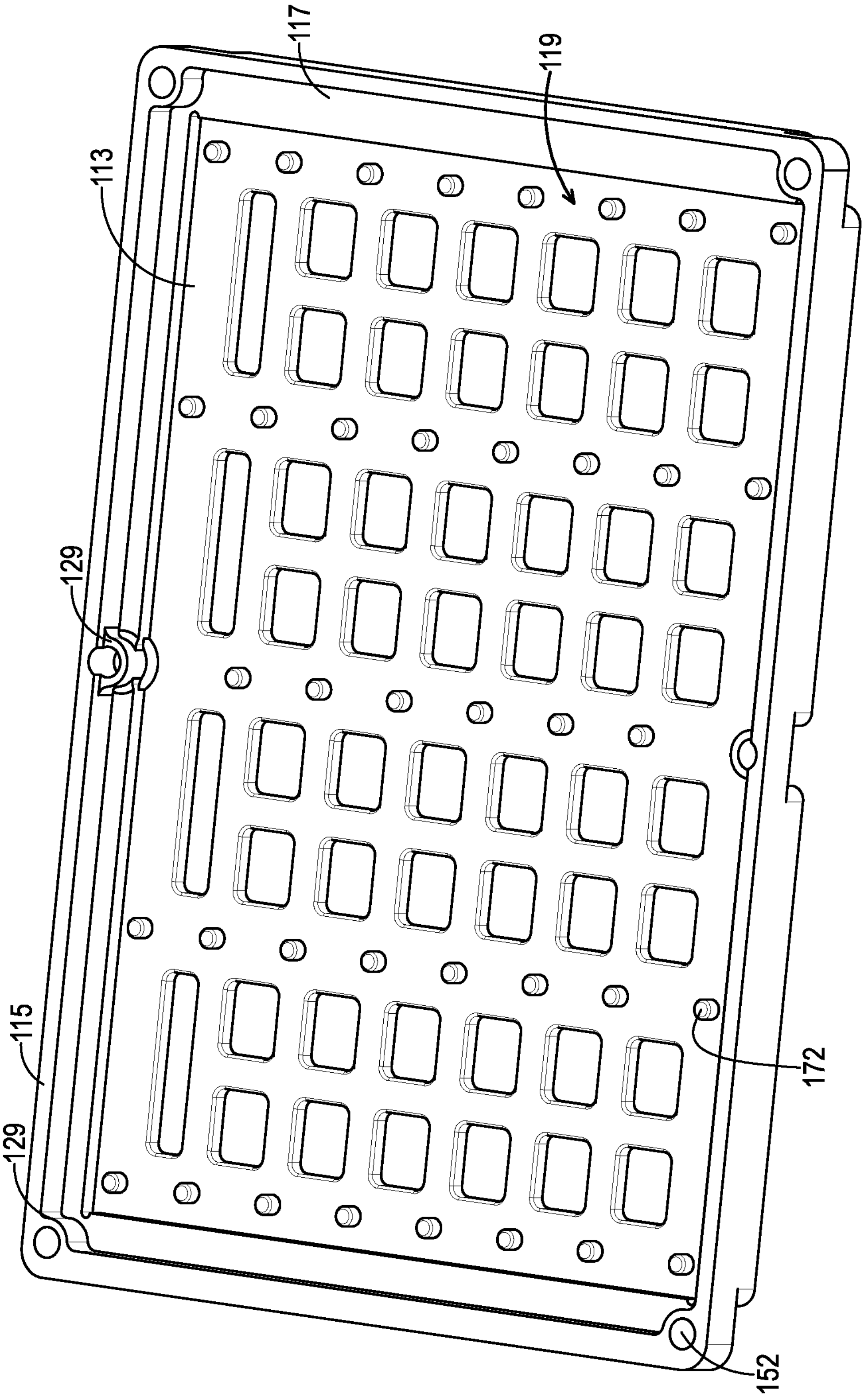
FIG. 7 is a perspective view of an interior surface of an illustrative top plate suitable for inclusion in the first illustrative array plate of FIG. 1.
Figure 8:
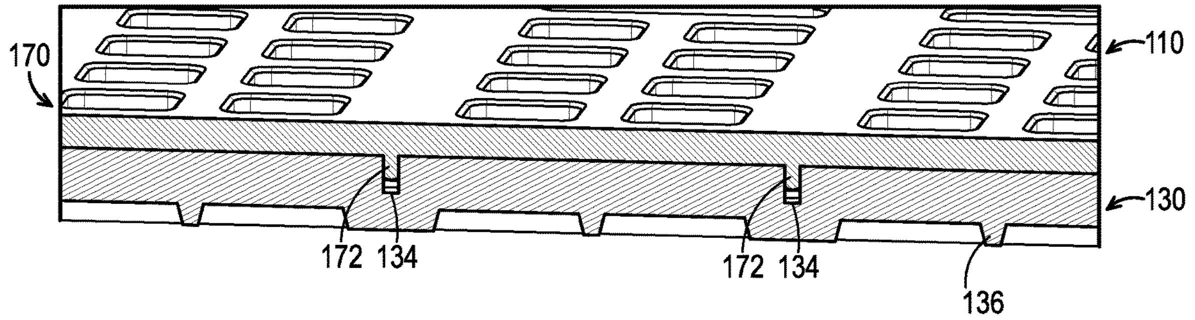
FIG. 8 is a sectional view of the top plate of FIG. 7, depicted with an installed gasket.
Figure 9:
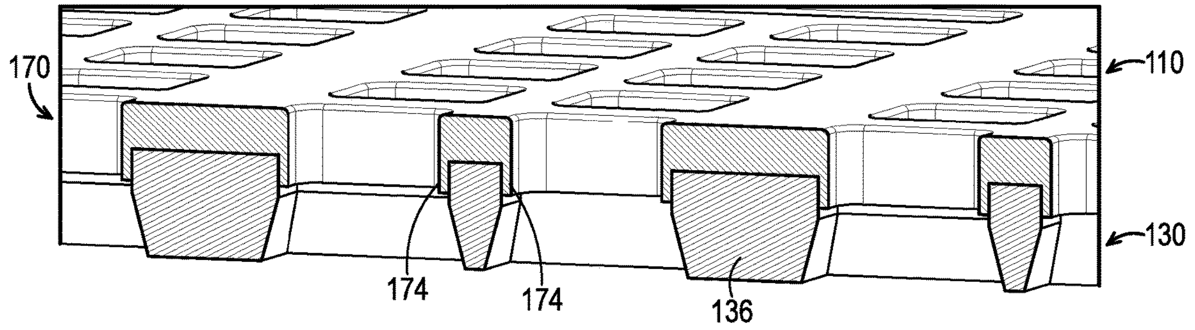
FIG. 9 is a sectional view of a second illustrative top plate and gasket suitable for inclusion in the first illustrative array plate of FIG. 1.

Turning now to FIGS. 7-9, in some examples, perforated cover plate 110 includes a peripheral wall 115 extending from lateral edges of the perforated cover plate. Peripheral wall 115 is configured to mate with peripheral wall 125 in a sliding fit. Accordingly, peripheral wall 115 has a thickness corresponding to an inset width of peripheral wall 125. In some examples, peripheral wall 115 incorporates peripheral ridges 160, 162, such that the thickness of peripheral wall varies accordingly. While in the example depicted in FIGS. 1-11, peripheral wall 125 is inset relative to peripheral wall 115, in some examples, peripheral wall 115 may be inset relative to peripheral wall 125. Peripheral wall 115 and peripheral wall 125 mate in a sliding fit, such that a top edge of peripheral wall 125 contacts a bottom surface 113 of perforated cover plate 110 and a bottom edge of peripheral wall 115 contacts a top surface of supportive base plate 120. Accordingly, in some examples, a height of peripheral wall 115 is substantially similar to the height of peripheral wall 125. In some examples, as depicted in FIG. 7, perforated cover plate 110 includes a rim 117 defining a recess 119 configured to receive gasket 130. Rim 117 may extend from perforated cover plate 110, extending into a cavity defined by peripheral wall 115. Accordingly, in some examples, a height of peripheral wall 115 may be substantially similar to a height of peripheral wall 125 plus a height of rim 117. In some examples, peripheral wall 125 includes convexities 129 disposed at corners of the peripheral wall. Convexities 129 correspond to fastener recesses 118. In other words, peripheral wall 125 bulges at convexities 129, forming a bottom surface of fastener recesses 118.

Rim 117 may collectively retain gasket 130 along with gasket retention mechanisms 170. Gasket retention mechanisms 170 may collectively comprise features included within perforated cover plate 110 and gasket 130 configured to hold the gasket in place so that it does not fall out of perforated cover plate when the perforated cover plate and gasket are turned over during assembly. As depicted in FIG. 7, in some examples, perforated cover plate 110 includes pins 172 extending from a bottom surface 113 of perforated cover plate 110. As depicted in FIG. 8, pins 172 are configured to mate with apertures or holes 134 extending at least partially through gasket 130. Pins 172 may be disposed in any suitable location, such as at regions of perforated cover plate 110 corresponding to edges of slides 140. In some examples, as depicted in FIG. 9, perforated cover plate 110 includes lips 174 extending from edges of the first apertures, the lips 174 configured to receive edges of second apertures 132 of gasket 130. However, insertion of a gasket into lips 174 may be more difficult than mating pins 172 with holes 134, as gasket walls 136 are pressed into recesses formed by lips 174. If the gasket walls are not seated properly, the gasket may bulge out and cause a leak due to contact between a non-uniform surface and the slides. In contrast, coupling the gasket to the perforated cover plate using pins minimizes bulging should any pin not find a mating hole.

Figure 10:
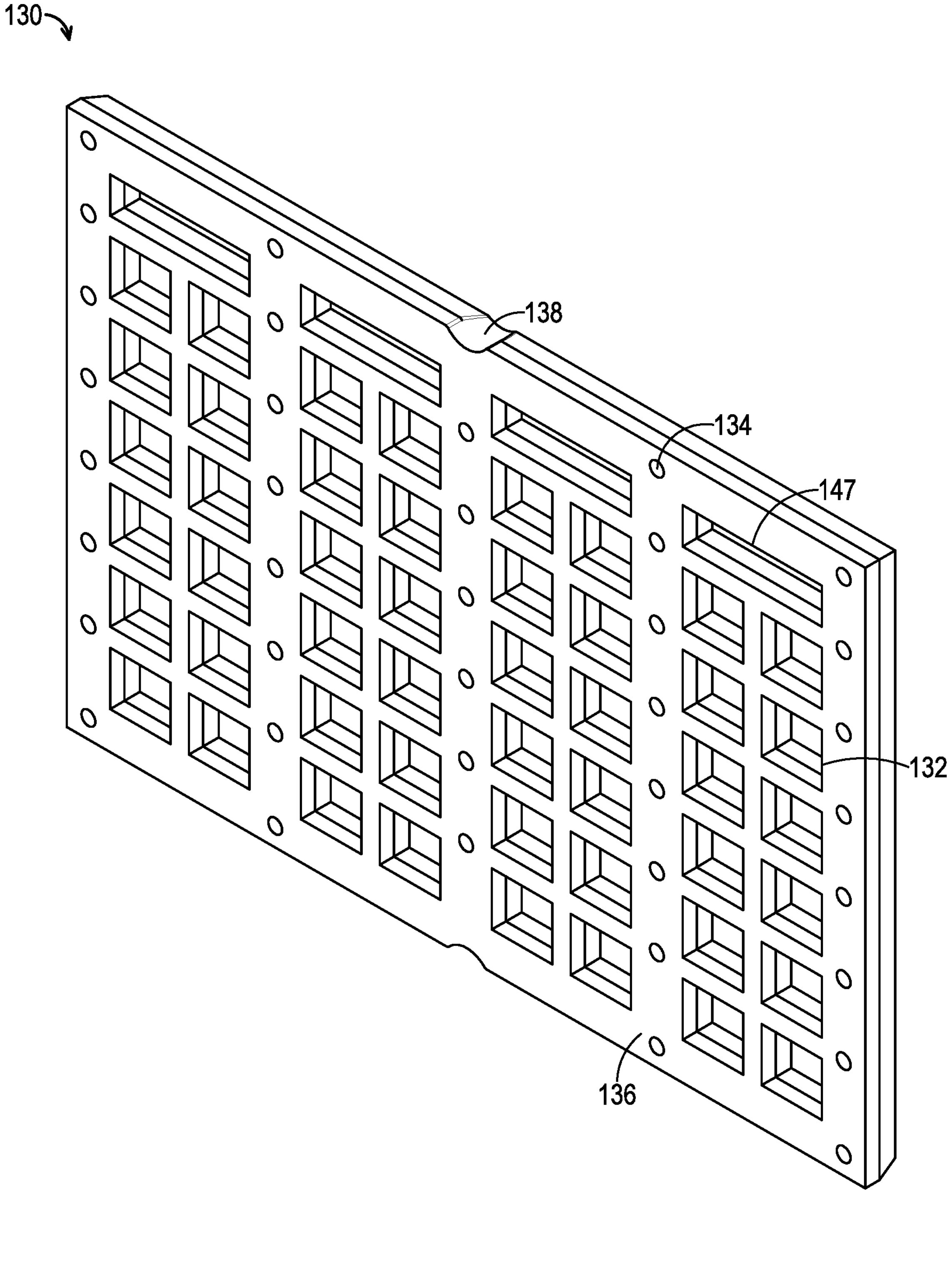
FIG. 10 is a gasket suitable for inclusion in the first illustrative array plate of FIG. 1.

FIG. 10 depicts a gasket 130 including apertures or holes 134 configured to receive pins 172 as depicted in FIG. 8. Accordingly, the holes 134 are disposed between second apertures 132 (i.e., on gasket walls 136). Gasket 130 further includes notches 138 disposed at long edges of the gasket, which are configured to accommodate recessed fasteners 150 when the hybridization plate is assembled. In examples wherein hybridization plate 100 includes raised fasteners, gasket 130 may have substantially straight long edges (i.e., long edges lacking notches). Similarly, in examples wherein perforated cover plate 110 includes lips 174 extending from edges of the first apertures, as depicted in FIG. 9, gasket 130 may have a substantially smooth top surface (i.e., may be free from holes 134).

Perforated cover plate 110 and gasket 130 each include respective first apertures 112 and second apertures 132, which collectively form wells 114 when the hybridization plate is assembled and compressed. In some examples, perforated cover plate 110 and gasket 130 include a layout of apertures suitable for use with barcode slides, such as slides including a barcode 145 aligned along an edge of the slide. Barcodes facilitate better data tracking, as slides can be scanned prior to sample application, such that samples can be correctly matched to each slide's data after microarray fluorescence scanning. Conventional hybridization plate layouts do not take advantage of the printable region of a barcoded slide, as depicted in prior art FIG. 11. The printable region is a region of a slide including printed DNA features, while regions outside of the printable material remain plain glass.

Figure 11:
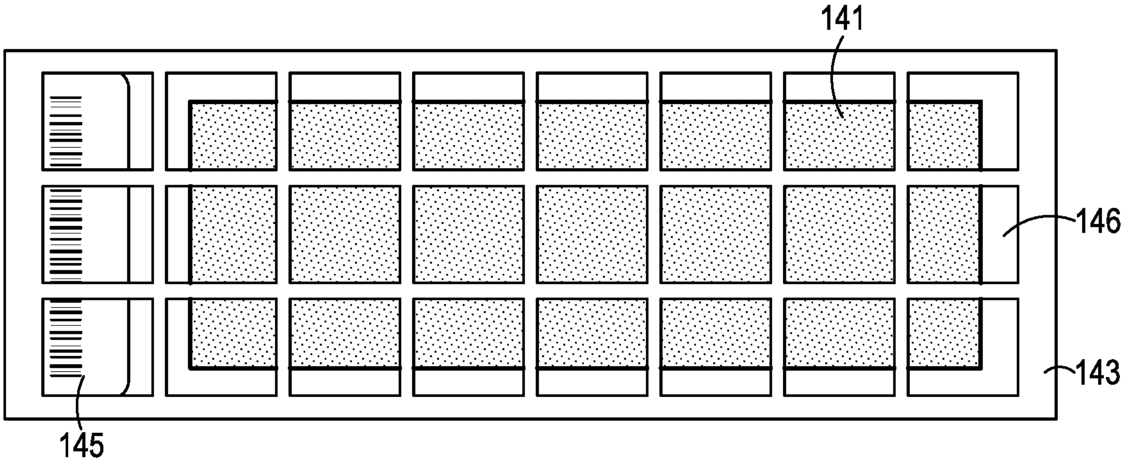
FIG. 11 (PRIOR ART)
FIG. 11 is a schematic view of a prior art gasket installed over a microarray slide.
Figure 12:
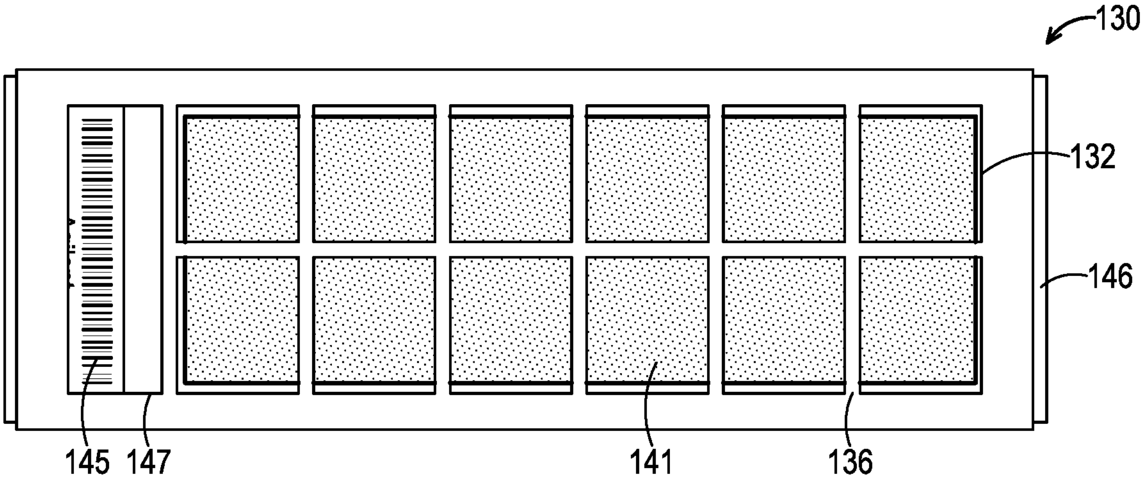
FIG. 12 is a schematic view of a portion of a gasket in accordance with aspects of the present disclosure, installed over a microarray slide.

FIGS. 11 and 12 depict the printable region 141 of a barcoded slide 146. FIG. 11 depicts a conventional gasket 143 overlapped with a barcoded slide. Several wells provided by the conventional gasket are not ideal for use. Specifically, the leftmost column of wells does not overlap any printable region of the slide, while wells of the top row, the bottom row, and the rightmost column only partially overlap the printable region. Wells overlapping with the barcode are not usable for samples, and the barcode area is associated with significant leakage. Furthermore, the gasket and corresponding perforated cover plate wells overlap the barcode, preventing the barcode from being scanned while the hybridization plate is assembled.

In contrast, as depicted in FIG. 12, a perforated cover plate 110 and gasket 130 in accordance with the present teachings may include first and second apertures 112, 132 corresponding to an array of wells 114 configured to align with a printable region of a barcode slide 146, and a viewing window 147 configured to align with barcode 145. Furthermore, in the layout depicted in FIG. 12, utilization of the printable area is maximized so that more samples and more data per sample can be analyzed on a single slide than with conventional gaskets. Wells 114 depicted in FIG. 11 facilitate 3 mm of space between subarrays printed on the barcode slide 146. As subarrays are generally offset from gasket walls 136 by 1 mm, gasket walls included in the present 4×12 layout generally have a thickness of approximately 1 mm, such as from 0.9 mm to 1.1 mm, from 0.8 mm to 1.2 mm, and/or the like. However, gasket walls 136 may have any suitable thickness depending on a selected layout, such as from 0.5 mm to 1 mm, from 0.75 mm to 1.25 mm, from 1 mm to 2 mm, from 1 mm to 5 mm, and/or the like. In contrast, conventional microarray slides typically result in at least 5 mm of space between subarrays. Accordingly, less space between subarrays facilitates increased usable printed area per well and, accordingly, increased features per sample when compared with conventional gaskets. Similarly, less space between subarrays facilitates an increase in a number of samples per slide when compared with conventional gaskets.

In some examples, as depicted in FIG. 9, gasket walls 136 are wider at a top of the gasket and narrower than at a bottom of the gasket. Accordingly, in some example, second apertures 132 are narrower at the top of the gasket and wider at the bottom of the gasket (i.e., regions adjacent slides 140). Accordingly, a greater fraction of a printed region of slides 140 may be utilized than when gaskets 130 have substantially vertical walls.

As perforated cover plate 110 and gasket 130 collectively define a viewing window 147, barcode 145 may be scanned while the hybridization plate is in an assembled configuration. In some examples, supportive bottom plate 120 further comprises a viewing window 149, such that a barcode disposed on a bottom surface of the slide may be scanned when the hybridization plate is in an assembled configuration.

Wells 114 may have any suitable shape when viewed from above, such as substantially square, substantially circular, substantially rhomboidal, substantially ovular, irregular, and/or the like. However, a shape of the wells generally corresponds with array uniformity. Accordingly, shapes having a width substantially similar to a length are generally more suitable for wells 114 than elongate shapes. Elongate wells may result in a non-uniform mixing pattern. Specifically, "bubble mixing," as utilized in some conventional hybridization methods, utilizes an oblong, rectangular gasket, resulting in a non-uniform mixing pattern. Accordingly, in some examples, wells 114 are substantially square, substantially rectangular, substantially circular, and/or the like.

Figure 13:
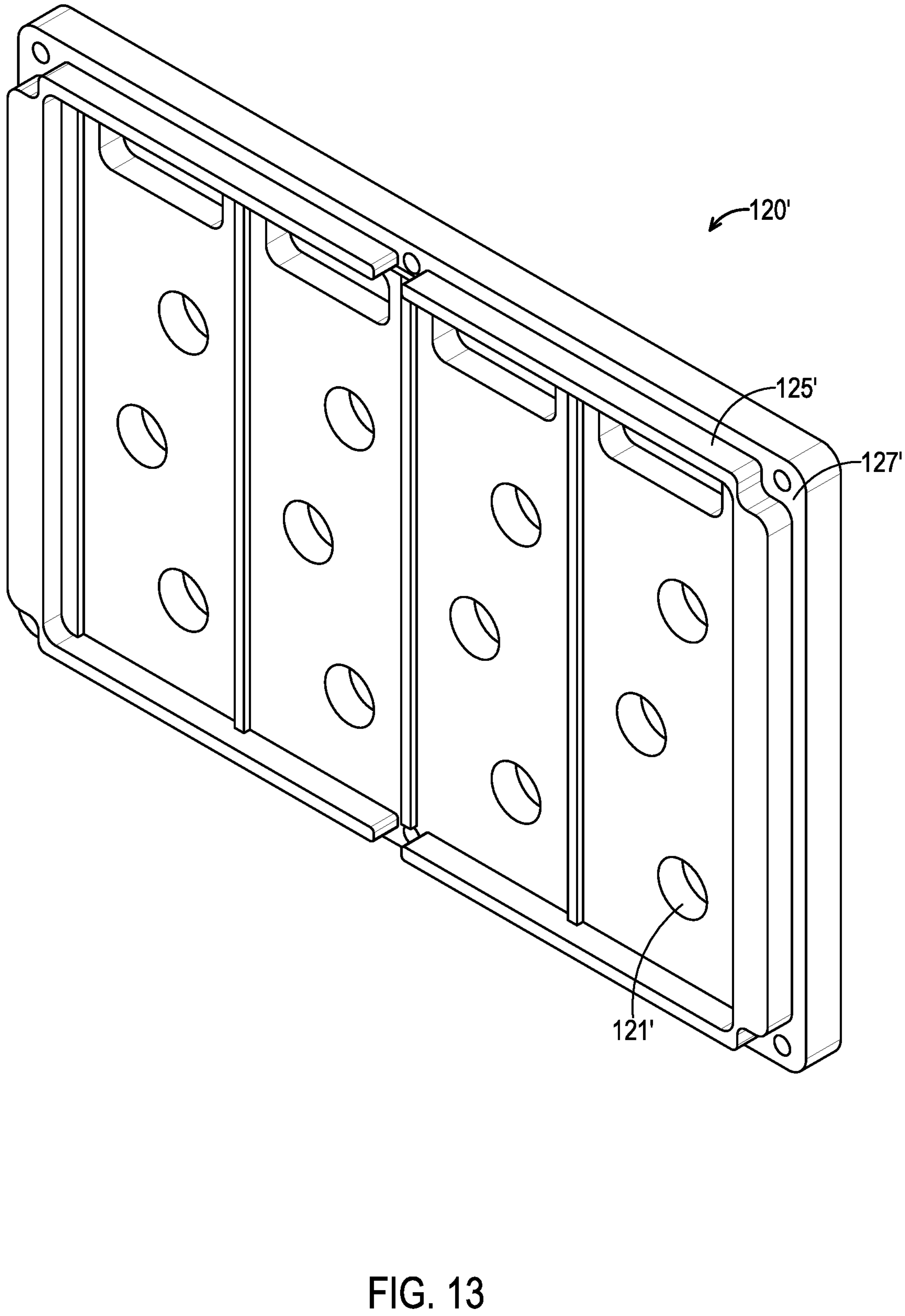
FIG. 13 is a perspective view of a second illustrative bottom plate suitable for inclusion in the first illustrative array plate of FIG. 1.
Figure 14:
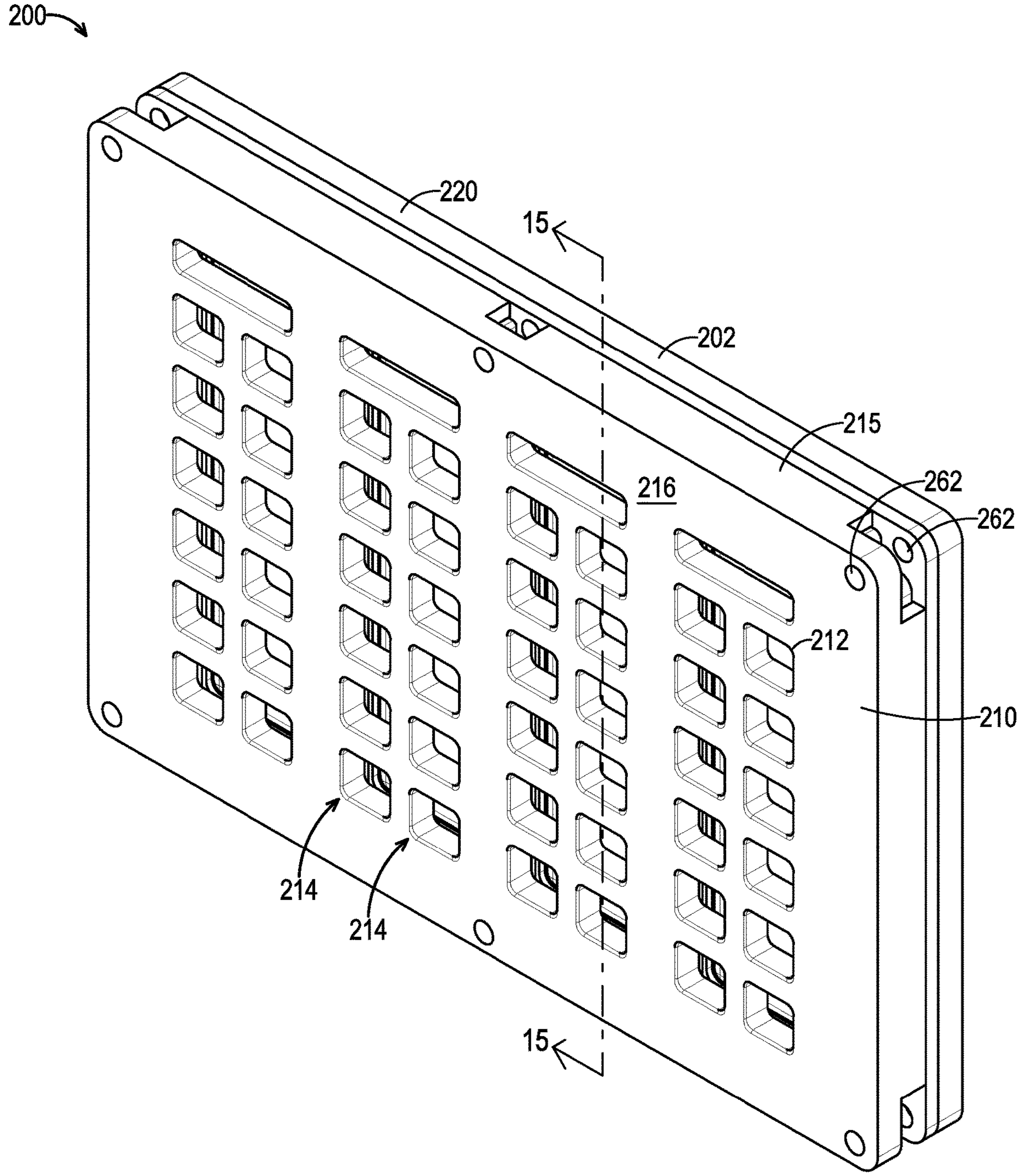
FIG. 14 is a perspective view of a second illustrative array plate in accordance with aspects of the present disclosure.
Figure 15:
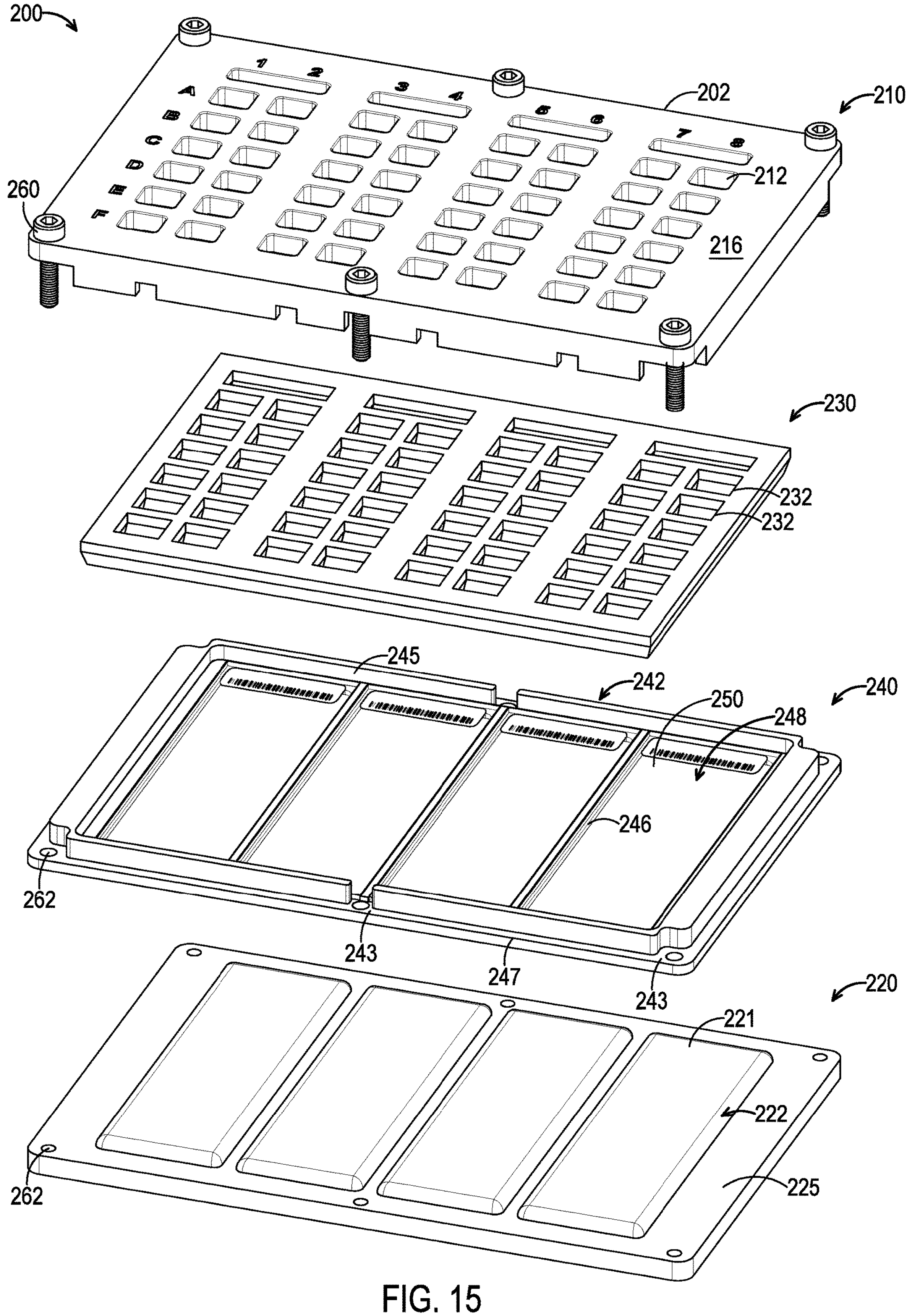
FIG. 15 is an exploded perspective view of the second illustrative array plate of FIG. 14.

Turning now to FIG. 13, an alternative supportive base plate 120' is shown and described. Alternative supportive base plate 120' is substantially identical to supportive base plate 120, except as otherwise described. First, apertures 121, 121' extending through slab 124 differ in shape. While base plate 120 includes substantially rectangular apertures, disposed at alternating angles transverse to edges of the hybridization plate, supportive base plate 120' includes substantially circular apertures. Apertures 121 and 121' are configured such that slides may be removed from the hybridization plate by extending a tool and/or finger through the apertures. In some examples, apertures 121 and 121' are configured to receive protrusions of a slide ejection tool 700, 800, as described below with respect to method 300. Accordingly, apertures 121 and 121' may have any suitable size, shape, and/or distribution. In some examples, apertures 121 and 121' are substantially rectangular, substantially oblong, substantially circular, substantially ovular, substantially irregular, and/or the like. In some examples, apertures 121 and 121' are distributed such that at least one aperture is disposed beneath each slide 140. In some examples, apertures 121 and 121' are distributed such that at least two apertures are disposed beneath each slide, such that each slide is supported by at least two protrusions when ejected. In some examples, apertures 121 and 121' are distributed such that apertures corresponding to each slide are substantially aligned with each other along the long axis of the hybridization plate (i.e., forming one or more rows of apertures).

Second, supportive base plate 120' is not configured to accommodate recessed fasteners, such as fasteners 150. Peripheral wall 125' includes apertures 127' large enough to accommodate for raised fasteners, but not for recessed fasteners and corresponding fastener recesses. Accordingly, supportive base plate 120' is configured for use with perforated cover plates lacking fastener recesses, such as perforated cover plate 210, described below.

Hybridization plates 100 in accordance with the present teachings may comprise any suitable materials. Perforated cover plate 110 and/or supportive base plate 120 may comprise any suitable rigid material, such as metals (e.g., stainless steel, aluminum, titanium, etc.), plastic (e.g., polycarbonate, polyurethane, etc.), and/or the like. However, more rigid materials are more suitable to prevent bowing of the hybridization plate than comparatively flexible materials. Specifically, stainless steel is highly reusable after many washes, is firm, and resists bowing. Accordingly, in some examples, perforated cover plate 110 and/or supportive base plate 120 comprise stainless steel. However, in some examples, perforated cover plate 110 and/or supportive base plate 120 comprise anodized aluminum. Anodized aluminum is more flexible than stainless steel.

Accordingly, a thick supportive base plate mitigates leakage associated with increased flexibility. In some examples, perforated cover plate 110 and/or supportive base plate 120 comprise a firm, rigid plastic. Perforated cover plate 110 and supportive base plate 120 may comprise the same material or may comprise different materials. Gasket 130 may comprise any suitable resilient material, such as silicone, rubber, thermoplastic elastomers, and/or the like.

B. Second Illustrative Hybridization Plate

As shown in FIGS. 14-25, this section describes a second illustrative hybridization plate (AKA array plate) 200. Second illustrative hybridization plate 200 is substantially similar to first illustrative hybridization plate 100, except as otherwise described. As depicted in FIGS. 14-25, second illustrative hybridization plate 200 includes a perforated cover plate (AKA top plate) 210 defining a plurality of first apertures 212, a supportive base plate (AKA bottom plate) 220 defining one or more planar support surfaces 222, a gasket 230, and a slide support frame 240. Gasket 230 and slide support frame 240 are sandwiched between perforated cover plate 210 and supportive base plate 220 such that gasket 230 is between perforated cover plate 210 and slide support frame 240, and such that slide support frame 240 is between gasket 230 and supportive base plate 220.

Supportive base plate 220 is configured to support one or more slides 250 suitable for use in laboratory assays. Accordingly, a planar expanse defined by each slide 250 is supported by a respective planar support surface 222 when the slides are installed within the second hybridization plate 200. More specifically, a bare surface 252 of slide 250 contacts planar support surface 222, while a printed surface 254 of slide 250 contacts gasket 230. Gasket 230 defines a plurality of second apertures 232 complementary to the plurality of first apertures 212, such that the first apertures, the second apertures, and the one or more slides 250 collectively define a plurality of wells 214 when the one or more slides are installed within the second hybridization plate 200.

Perforated cover plate 210, gasket 230, and slides 250 are substantially similar to perforated cover plate 110, gasket 130, and slides 140 except as otherwise described. Accordingly, any and/or all features of perforated cover plate 110, gasket 130, and slides 140 described above with respect to hybridization plate 100 may be incorporated into perforated cover plate 210, gasket 230, and slides 250.

Hybridization plate 200 includes a plurality of fasteners 260 configured to retain the hybridization plate in an assembled configuration (i.e., with gasket 230, slide 250, and slide support frame 240 compressed between perforated cover plate 210 and supportive base plate 220). Accordingly, perforated cover plate 210, supportive base plate 220, and slide support frame 240 each comprise a plurality of through holes 262, each configured to receive a respective fastener 260. Hybridization plate 200 may include any suitable number of through holes 262 and fasteners 260, however, in some examples, hybridization plate 200 includes at least six through holes 262 and at least six fasteners 260. Through holes 262 and fasteners 260 may be distributed such that a fastener 260 and corresponding through hole 262 is disposed at each corner of the hybridization plate, and such that a fastener 260 and corresponding through hole 262 is disposed along each long edge 202 of hybridization plate 200. In some examples, hybridization plate 200 includes greater than six fasteners, such as eight fasteners, ten fasteners, twelve fasteners, and/or the like.

Tightening fasteners 260 compresses gasket 230 between perforated cover plate 210 and supportive base plate 220 and slide support frame 240. When a slide 250 is installed within the hybridization plate, tightening fasteners 260 compresses the slide between the gasket and the supportive base plate, forming a plurality of wells 114 having walls formed by the gasket and perforated cover plate and floors, bottoms, and/or bases formed by the slide. Providing at least six fasteners 260 as described above evenly distributes compression about the hybridization plate, reducing leakage along a long axis of the hybridization plate. In hybridization plates utilizing fewer than six screws, tightening fasteners disposed at corners of the hybridization plates may induce bowing within the hybridization plates, especially when the hybridization plate is constructed using less rigid materials. Bowed hybridization plates may be susceptible to leaking between gasket 230 and one or more slides 250.

Fasteners 260 are substantially similar to fasteners 150. Accordingly, fasteners 260 may comprise any suitable fasteners which may be tightened, compressing hybridization plate 200, such as screws, bolts, brads, and/or the like. However, in the example depicted in FIGS. 14-21, fasteners 260 are raised relative to a top surface 216 of perforated cover plate 210. Accordingly, in some examples, perforated cover plate 210 lacks fastener recesses, such as fastener recesses 118, described above. In some examples, fasteners 260 are recessed relative to a top surface 216 of perforated cover plate 210, which facilitates a uniformly flat application of a foil seal over the top surface, sealing wells 214 to prevent evaporation. In some examples, such as in the example depicted below in FIGS. 22-23, perforated cover plate 210 includes fastener recesses 218 configured to receive fasteners 260, such that when fasteners 260 are tightened, the fasteners are flush with or recessed relative to top surface 216. Fastener recesses 218 may have any suitable depth, but are generally configured to have a depth substantially similar to a height of heads of fasteners 260. In some examples, fasteners 260 comprise recessed hex-head screws.

Supportive base plate 220 defines one or more planar support surfaces 222 configured to evenly distribute pressure across a bottom surface of respective one or more slides 250 installed within hybridization plate 200. As fasteners 260 are tightened, compressing the slide between the gasket and the supportive base plate, the respective planar surfaces apply pressure across the plane defined by each slide, instead of concentrating pressure at edges of the slide. Bowing of the slides relative to the gasket is therefore prevented, as compressing the hybridization plate reinforces flatness of the slides.

In the example depicted in FIGS. 14-25, supportive base plate 220 includes one or more platforms 221 defining one or more planar support surfaces 222, each configured to support a slide 250 from below. In the example depicted in FIGS. 14-21, hybridization plate 200 is configured to retain four slides. Accordingly, the example depicted in FIGS. 14-21 includes four platforms 221 and four planar support surfaces 222. However, any suitable number of slides per plate and corresponding suitable number of planar support surfaces may be utilized, such as from 1 to 4 slides and planar support surfaces. In some examples, platforms 221 have dimensions substantially similar to dimensions of slides 250, such as approximately 75 mm×25 mm×1 mm. Platforms 221 may be spaced apart by any suitable distance, such as from 0.5 mm to 1 mm, from 1 mm to 2 mmm, from 2 mm to 5 mm, and/or the like. Platforms 221 may have any suitable height, such as at least 1 mm, at least 2 mm, at least 3 mm, at least 5 mm, and/or the like. In some examples, supportive base plate 220 includes a peripheral rim as described above with respect to hybridization plate 100. In some examples, the platforms 221 have beveled edges.

Conventional hybridization plates lack material disposed beneath the one or more slides. Accordingly, slides are supported entirely by a frame disposed only at edges of the slides, such as slide support frame 240, and are therefore prone to bowing and/or cracking. In contrast, supportive base plate 120 augments the function of slide support frame 240, such that slides 250 are supported across an expanse defined by each slide. Supportive base plate 220 may have any suitable thickness configured to prevent bowing, such as at least 2× a thickness of the one or more slides, at least 5× a thickness of the one or more slides, at least 10× a thickness of the one or more slides and/or the like. Similarly, supportive base plate 220 may have any suitable thickness such as at least 1 mm, at least 2 mm, at least 5 mm, and/or the like.

In some examples, supportive base plate 220 further comprises a peripheral rim 225. Peripheral rim 225 extends around edges of platforms 221. Peripheral rim 225 is configured to support slide support frame 240. Slide support frame 240 defines one or more windows 242, each corresponding to a slide 250 and a corresponding platform 221. Accordingly, when slide support frame 240 is supported by supportive base plate 220, platforms 221 extend at least partially into windows 242.

Slide support frame 240 generally comprises a ladder-shaped grid including a plurality of rungs 246 extending between a pair of rails 247. Slide support frame 240 further includes peripheral walls 245 extending vertically around a perimeter of slide support frame 240. In some examples, slide support frame 240 comprises a pair of rungs 246 and a pair of rails 247, such that slide support frame defines a rectangular opening configured to receive a single slide. Slide support frame 240 further comprises corresponding flanges 244 extending laterally from rungs 246 and rails 247. When a slide 250 is received by a window 242, flanges 244 support edges of the slide 250, while platform 221 supports the slide from below. Accordingly, in these examples, the slide is received by a recess defined collectively by slide support frame 240 and supportive base plate 220.

Peripheral walls 245 are generally aligned with lateral edges of the supportive base plate, but may be slightly inset, facilitating a slidable fit with peripheral walls 215 extending from perforated cover plate 210. In examples wherein hybridization plate 200 is configured for use with a single slide 250, peripheral walls 245 both retain the slide within the hybridization plate and prevent the slide from shifting when compression is applied to the hybridization plate. In some examples, a height of the peripheral walls is substantially similar to an uncompressed thickness of gasket 230, such that a top surface of each peripheral wall contacts a bottom surface of perforated cover plate 210 when the hybridization plate is assembled. In some examples, the height of the peripheral walls is slightly less than an uncompressed thickness of gasket 230, such that gasket 230 is compressed in thickness when hybridization plate 200 is assembled. In some examples, a height of the peripheral walls is configured to compensate for a height of platforms 221. Accordingly, in some examples, a height of the peripheral walls is slightly greater than an uncompressed thickness of gasket 230. Accordingly, in some examples, peripheral walls 245 have any suitable height relative to an uncompressed thickness of gasket 230, such as at least 105%, at least 100%, at least 95%, at least 90%, and/or the like. In some examples, peripheral walls 245 may have any suitable height, such as at least 5 mm, at least 8 mm, at least 10 mm, at least 15 mm, at least 20 mm, and/or the like.

In some examples, peripheral walls 245 provide apertures 243 at portions of slide support frame 240 corresponding to through holes 262 through which fasteners 260 may extend. Accordingly, in examples wherein the hybridization plate includes six fasteners 260 and corresponding through holes 262, peripheral walls 245 are discontinuous at corners of the slide support frame. Apertures 243 facilitate passage of fasteners 260 through through holes 262 provided in rungs 246 and rails 247. Supportive base plate 220 further comprises through holes 262 disposed directly below through holes provided in the slide support frame. Any suitable apertures may be utilized, such as gaps, channels, holes, and/or the like. In the example depicted in FIGS. 13-20, supportive base plate 220 comprises gaps at long edges of supportive base plate 220 and channels at corners of supportive base plate 220.

In some examples, such as when hybridization plate has a four-slide configuration, slide support frame 240 further comprises ridges 249 extending vertically from rungs 246. Ridges 249, peripheral walls 245, and platforms 221 collectively define one or more slide retention recesses 248, each configured to receive a slide 250. Peripheral walls 245 retain each slide within the hybridization plate, while ridges 249 retain each slide 250 within a respective slide retention recess 248, preventing each slide from shifting when compression is applied by tightening fasteners 260. Accordingly, slide retention recesses 248 have dimensions substantially similar to dimensions of slides 250, such as approximately 75 mm×25 mm×1 mm. In some examples, rungs extend generally transverse to a long axis of slide support frame 240, such that slides 250 are aligned such that a long axis of each slide is aligned with a short axis of the hybridization plate. However, in some examples, rungs 246 and corresponding ridges 249 extend along a long axis of the supportive base plate.

Ridges 249 may have any suitable height configured to retain the slides within slide retention recesses 248, such as at least 1× a thickness of the one or more slides, at least 2× a thickness of the one or more slides, at least 3× a thickness of the one or more slides, and/or the like. Accordingly, in some examples, ridges 249 may have a height of at least 1 mm, at least 2 mm, at least 3 mm, at least 5 mm, and/or the like. In some examples, ridges 249 have a height substantially similar to the height of platforms 221. In some examples, ridges 249 have a same height as a thickness of the one or more slides, such that a surface provided by the ridges and adjacent slides is substantially flat, facilitating even compression of a gasket supported by the ridges and adjacent slides.

Slide retention recesses 248 retain slides 250 during use of the hybridization plate. Accordingly, in some examples, set screws are unnecessary for securing slides within the hybridization plate. However, in some examples, hybridization plate 200 includes set screws disposed on a side of each slide. Because slides 250 are supported from below by platform 221, the set screws may be lightly tightened, such that the set screws prevent movement of the slides within slide retention recesses 248 without compressing the slides along the x- or y-axes.

In some examples, perforated cover plate 210 and slide support frame 240 have respective peripheral ridges substantially identical to peripheral ridges 160, 162, 164, and 166 described above with respect to hybridization plate 100. In other words, in some examples, perforated cover plate 210 and slide support frame 240 have asymmetric borders. In some examples, peripheral ridges included in hybridization plate 200 extend from peripheral walls 215, 245 extending from perforated cover plate 210 and slide support frame 240, respectively.

Figure 16:
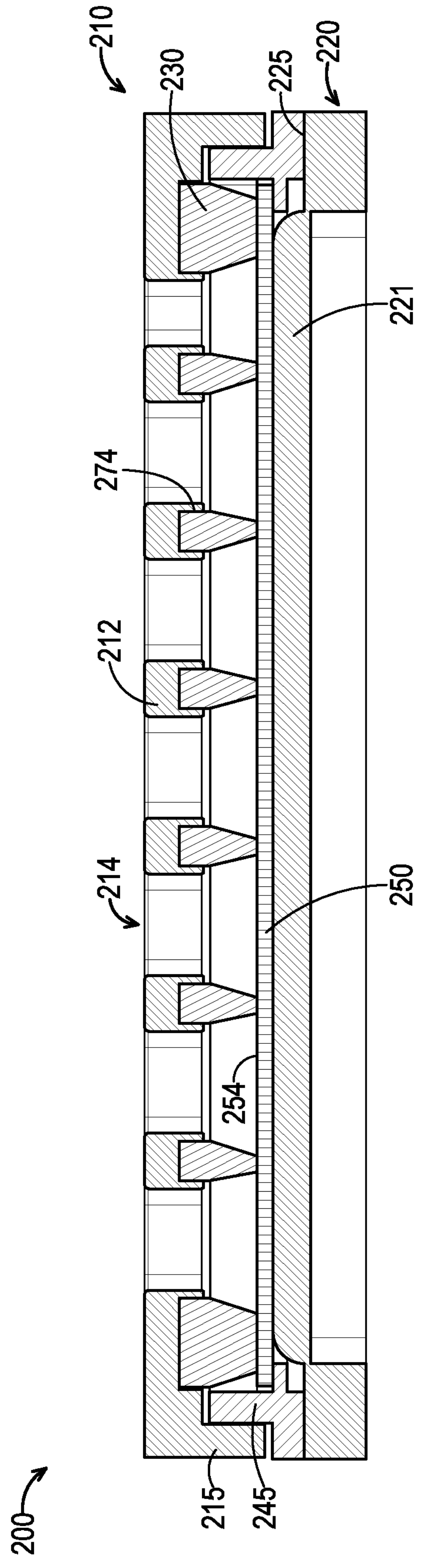
FIG. 16 is a sectional view of the second illustrative array plate of FIG. 14.
Figure 17:
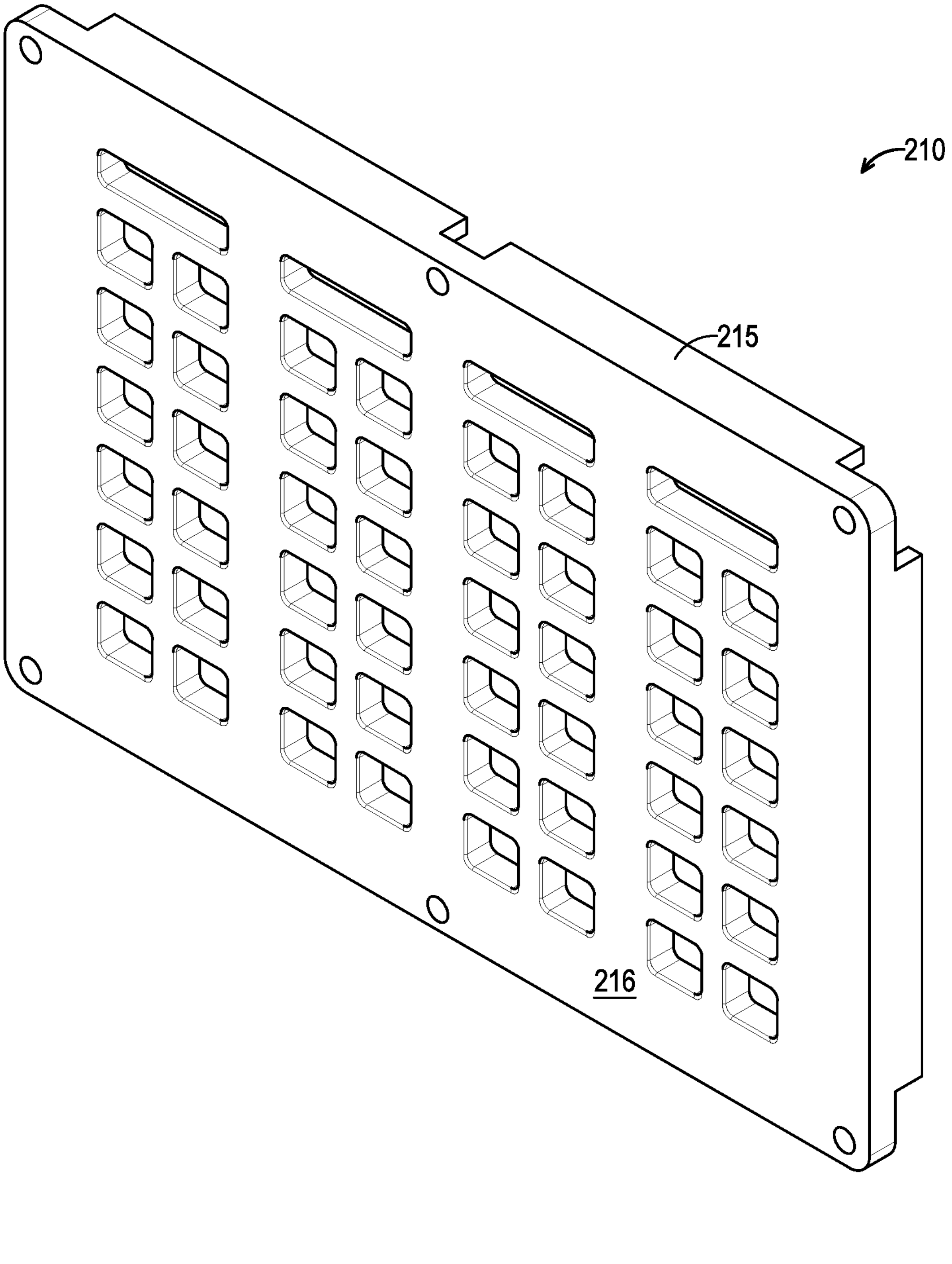
FIG. 17 is a perspective view of a top plate suitable for inclusion in the second illustrative array plate of FIG. 14.
Figure 18:
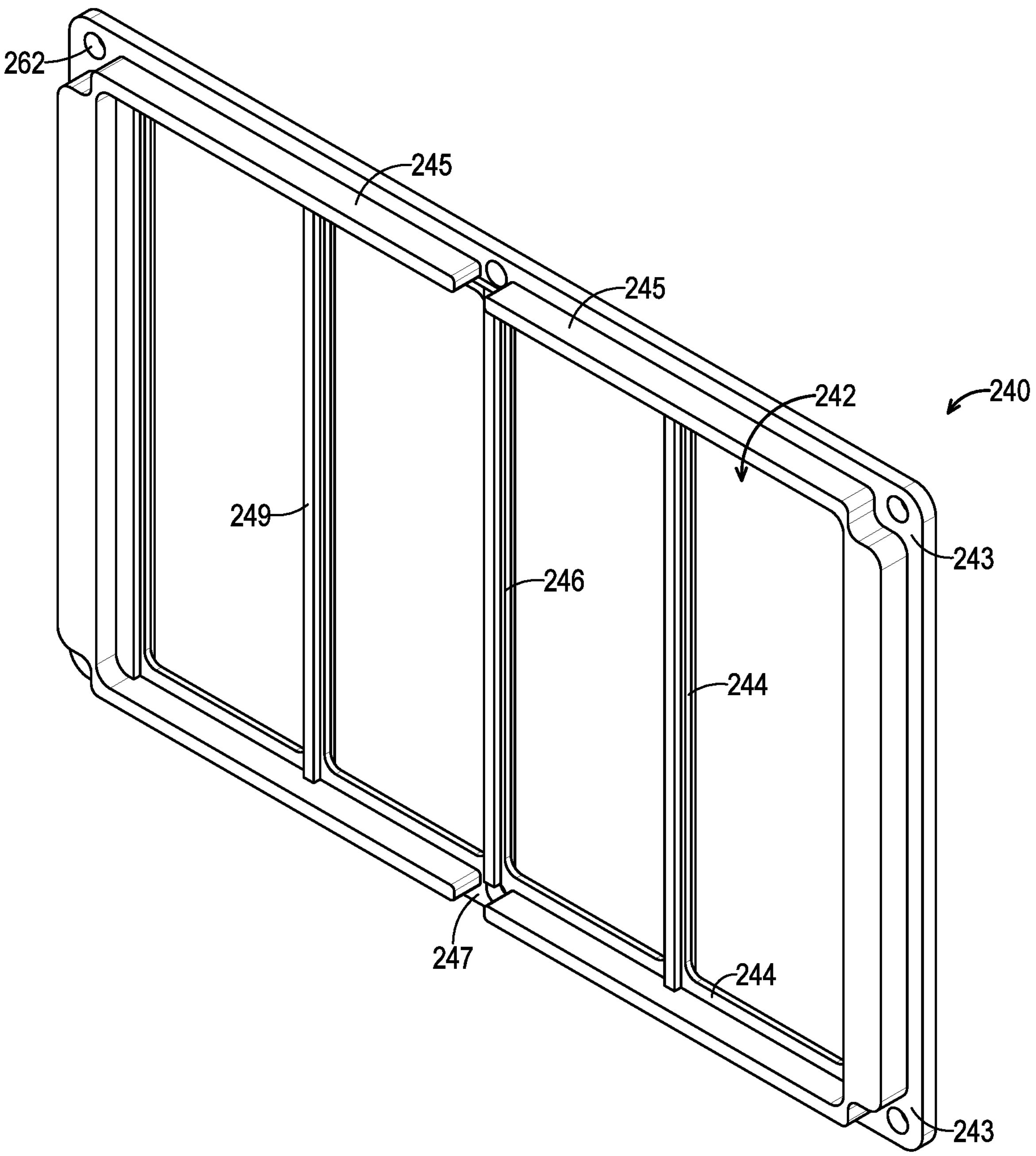
FIG. 18 is a perspective view of a slide support frame suitable for inclusion in the second illustrative array plate of FIG. 14.
Figure 19:
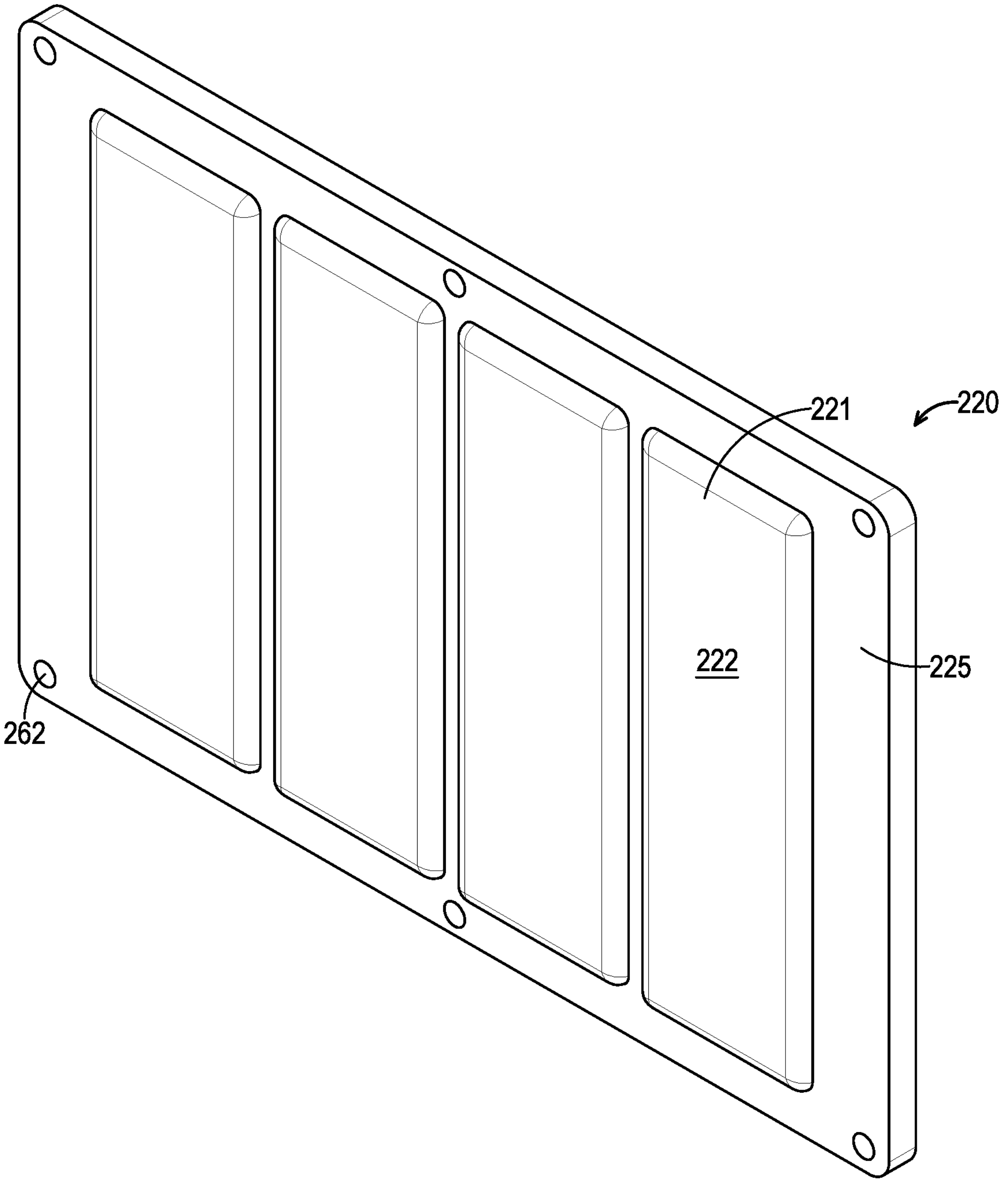
FIG. 19 is a perspective view of a bottom plate suitable for inclusion in the second illustrative array plate of FIG. 14.
Figure 20:
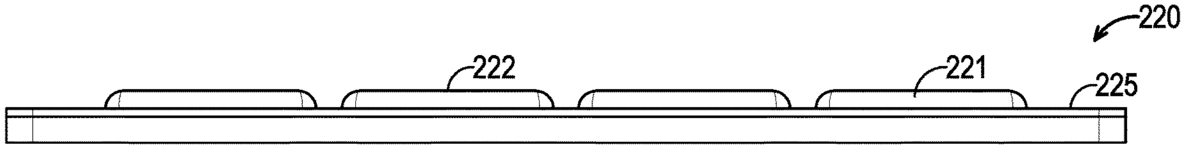
FIG. 20 is a front elevation view of the bottom plate of FIG. 14.

As depicted in FIG. 16, perforated cover plate 210 includes gasket retention mechanisms 270. Gasket retention mechanisms 270 may collectively comprise features included within perforated cover plate 210 and gasket 230 configured to hold the gasket in place so that it does not fall out of perforated cover plate when the perforated cover plate and gasket are turned over during assembly. As depicted in FIG. 16, perforated cover plate 110 includes lips 174 extending from edges of the first apertures, the lips 174 configured to receive edges of second apertures 132 of gasket 130. However, in some examples, perforated cover plate 210 includes pins and gasket 270 includes corresponding holes configured to receive the pins, retaining the gasket within the perforated cover plate.

As depicted in FIG. 21, gasket 230 is substantially similar to gasket 130 except as otherwise described. First, gasket 230 includes a substantially smooth top surface, which is free from holes or apertures within the gasket structure. While gasket 230 defines second apertures 232, walls between the apertures are free from discontinuities or surface disruptions. However, in examples wherein perforated cover plate 210 includes pins, gasket 270 may include corresponding holes configured to receive the pins. Second, gasket 230 includes substantially straight long edges, which are configured to mate with a perforated cover plate 210 which is configured to accommodate raised fasteners. However, in examples wherein hybridization plate includes recessed fasteners, gasket 230 may include notches within long edges.

Hybridization plates 200 in accordance with the present teachings may comprise any suitable materials, as described above with respect to hybridization plate 100. Perforated cover plate 210, slide support frame 240, and/or supportive base plate 220 may comprise any suitable rigid material, such as metals (e.g., stainless steel, aluminum, titanium, etc.), plastic (e.g., polycarbonate, polyurethane, etc.), and/or the like. However, more rigid materials are more suitable to prevent bowing of the hybridization plate than comparatively flexible materials. Specifically, stainless steel is highly reusable after many washes, is firm, and resists bowing. Accordingly, in some examples, perforated cover plate 210, slide support frame 240, and/or supportive base plate 220 comprise stainless steel. However, in some examples, perforated cover plate 210, slide support frame 240, and/or supportive base plate 220 comprise anodized aluminum. Anodized aluminum is more flexible than stainless steel. Accordingly, a thick supportive base plate mitigates leakage associated with increased flexibility. In some examples, perforated cover plate 210, slide support frame 240, and/or supportive base plate 220 comprise a firm, rigid plastic. Perforated cover plate 210, slide support frame 240, and/or supportive base plate 220 may comprise the same materials or may comprise different materials. Gasket 230 may comprise any suitable resilient material, such as silicone, rubber, thermoplastic elastomers, and/or the like.

Figure 23:
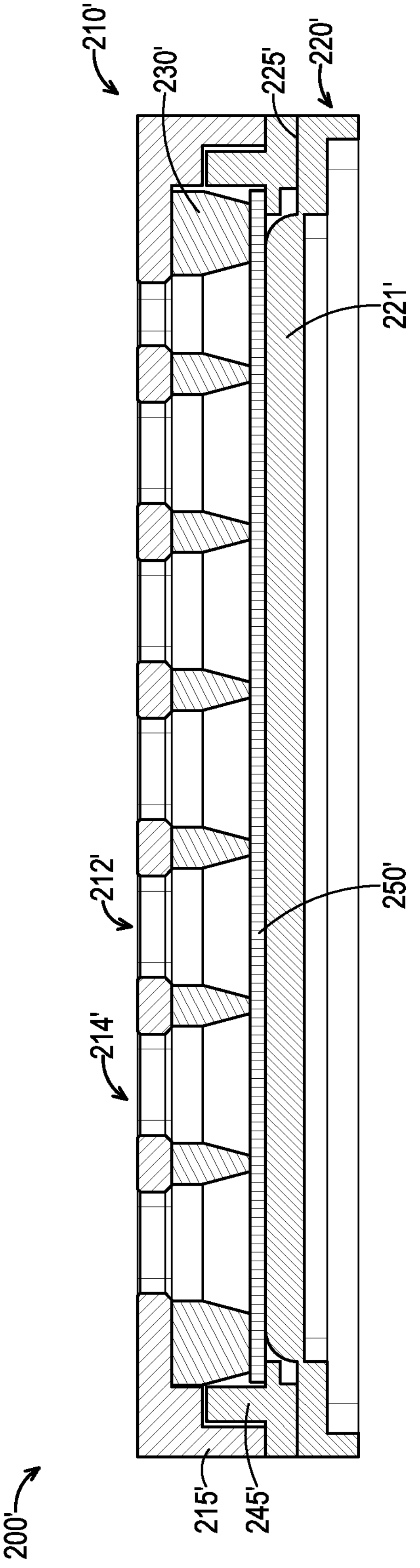
FIG. 23 is a sectional view of the third illustrative array plate of FIG. 22.

FIGS. 22-23 depicts a third illustrative hybridization plate 200'. Hybridization plate 200' is substantially similar to hybridization plate 200, except as otherwise described. As depicted in FIGS. 22-23, hybridization plate 200' includes a perforated cover plate (AKA top plate) 210' defining a plurality of first apertures 212', a supportive base plate (AKA bottom plate) 220' defining one or more planar support surfaces 222', a gasket 230', and a slide support frame 240'. Gasket 230' and slide support frame 240' are sandwiched between perforated cover plate 210' and supportive base plate 220' such that gasket 230' is between perforated cover plate 210' and slide support frame 240', and such that slide support frame 240' is between gasket 230' and supportive base plate 220'.

Hybridization plate 200' includes a perforated cover plate 210' and gasket 230' substantially identical to perforated cover plate 110 and gasket 130. However, hybridization plate 200' includes a supportive base plate 220' and slide support frame 240' as described above with respect to hybridization plate 200.

Similar to hybridization plates 100 and 200, hybridization plate 200' includes a plurality of fasteners 260' configured to retain the hybridization plate in an assembled configuration (i.e., with gasket 230' and slides 250' compressed between perforated cover plate 210' and supportive base plate 220'). Accordingly, perforated cover plate 210' and supportive base plate 220' each comprise a plurality of through holes 262', each configured to receive a respective fastener 260'. Hybridization plate 200' may include any suitable number of through holes 262' and fasteners 260', such as at least six through holes and corresponding fasteners, as described above. Fasteners 260' may comprise any suitable fasteners which may be tightened, compressing hybridization plate 200', such as screws, bolts, brads, and/or the like.

In contrast to fasteners 260 of hybridization plate 200, fasteners 260' are recessed relative to a top surface 216' of perforated cover plate 210', which facilitates a uniformly flat application of a foil seal over the top surface, sealing wells 214' to prevent evaporation. Accordingly, in some examples, perforated cover plate 210' includes fastener recesses 218' configured to receive fasteners 260', such that when fasteners 260' are tightened, the fasteners are flush with or recessed relative to top surface 216'. Fastener recesses 218' may have any suitable depth, but are generally configured to have a depth substantially similar to a height of heads of fasteners 260'. Platforms 221' of supportive base plate 220' define one or more planar support surfaces 222' configured to evenly distribute pressure across a bottom surface of a slide 250' installed within hybridization plate 200'. As fasteners 260' are tightened, compressing the slide between the gasket and the supportive base plate, the supportive base plate applies pressure across the plane defined by the slide, instead of concentrating pressure at edges of the slide.

As described above with respect to hybridization plate 200, supportive base plate 220' comprises a peripheral rim 225' configured to support slide support frame 240', which defines one or more windows 242', each corresponding to a slide 250' and a corresponding platform 221'. Accordingly, when slide support frame 240' is supported by supportive base plate 220', platforms 221' extend at least partially into windows 242'. Slide support frame 240' generally comprises a ladder-shaped grid including a plurality of rungs 246' extending between a pair of rails 247'. Slide support frame 240' further includes peripheral walls 245' extending vertically around a perimeter of slide support frame 240', the peripheral walls at least partially defining slide retention recesses 248' as described above with respect to FIGS. 14-21. Peripheral walls 245' are generally aligned with lateral edges of the supportive base plate, but may be slightly inset, facilitating a slidable fit with peripheral walls 215' extending from perforated cover plate 210'.

Peripheral walls 245' provide apertures 243' at portions of slide support frame 240' corresponding to through holes 262' through which fasteners 260' may extend. Specifically, apertures 243' are configured to accommodate recessed fasteners 260' and corresponding fastener recesses 218'. Accordingly, in examples wherein the hybridization plate includes six recessed fasteners 260' and corresponding through holes 262', peripheral walls 245' are discontinuous at corners of the supportive base plate, as well as at a point along each long edge 202' of the hybridization plate. However, any suitable apertures may be utilized, such as gaps, channels, holes, and/or the like.

Gasket 230' includes apertures or holes 234' configured to receive pins of a gasket retention mechanism, such as gasket retention mechanisms 170, as described above with respect to hybridization plate 100. Gasket 230' further includes notches 238' disposed at long edges of the gasket, which are configured to accommodate recessed fasteners 260' when the hybridization plate is assembled.

While FIGS. 14-23 depict hybridization plates 200, 200' having a 4×12 configuration, having 4 slides, each with 12 wells or subarrays per slide, any suitable number of slides per plate and wells per slide may be utilized, such as such as 4×24 (4 slides, 24 wells per slide), 1×48 (1 slide, 48 wells per slide), 4×8 (4 slides, 8 wells per slide), and/or the like.

Figure 24:
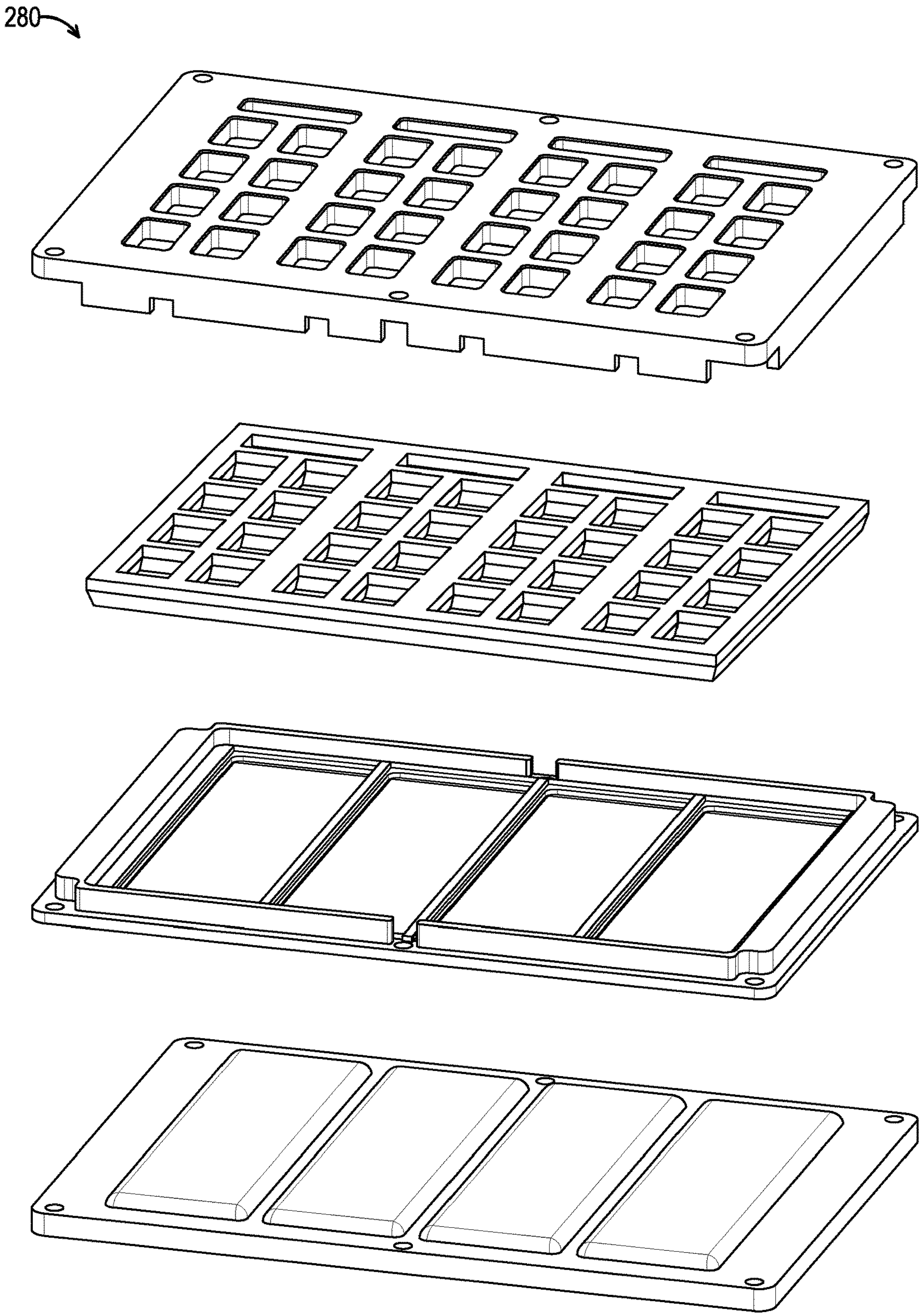
FIG. 24 is an exploded perspective view of a fourth illustrative array plate including eight wells per microarray slide.
Figure 25:
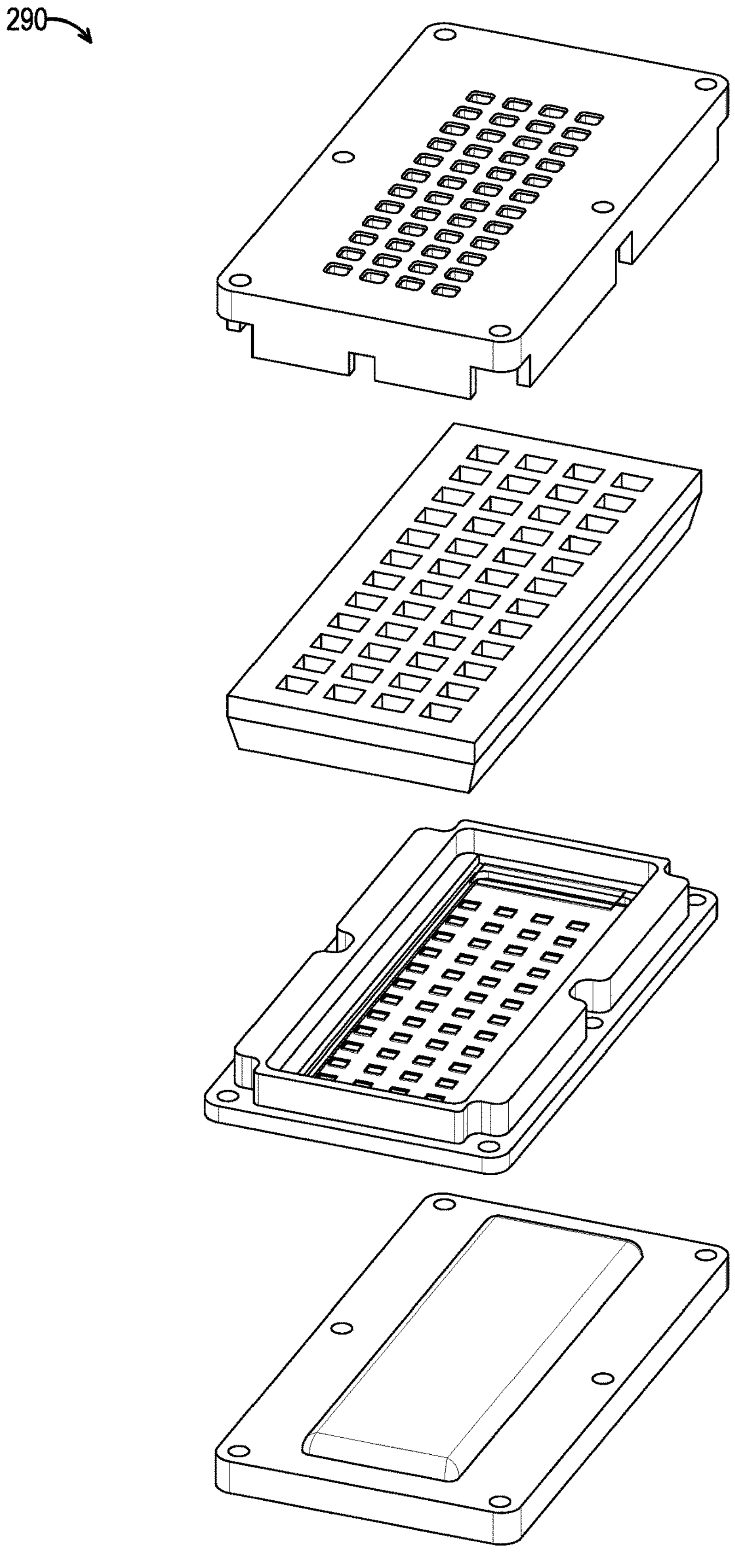
FIG. 25 is an exploded perspective view of a fifth illustrative array plate including forty-eight wells per microarray slide.
Figure 26:
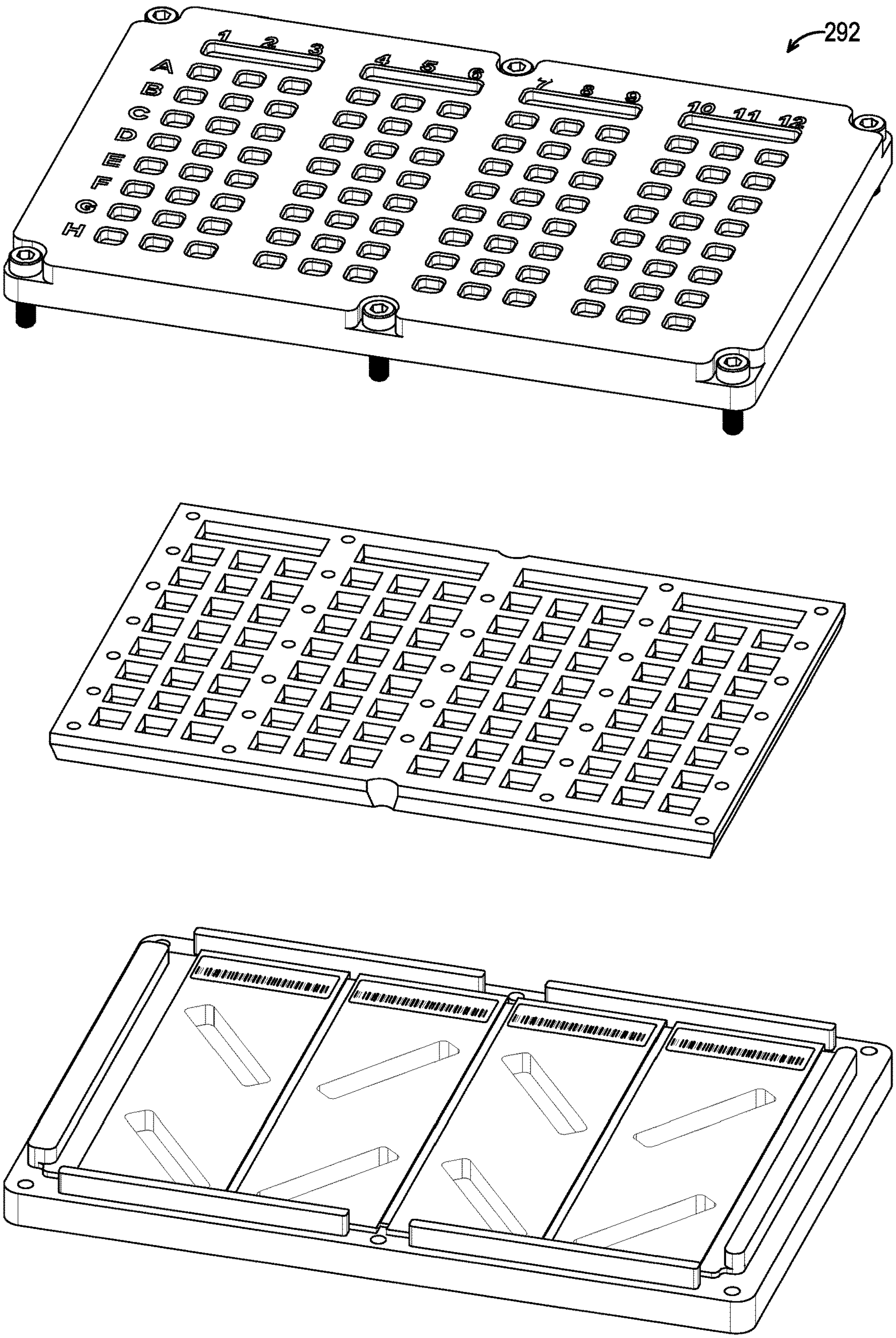
FIG. 26 is an exploded perspective view of a sixth illustrative array plate including twenty-four wells per microarray slide.
Figure 27:
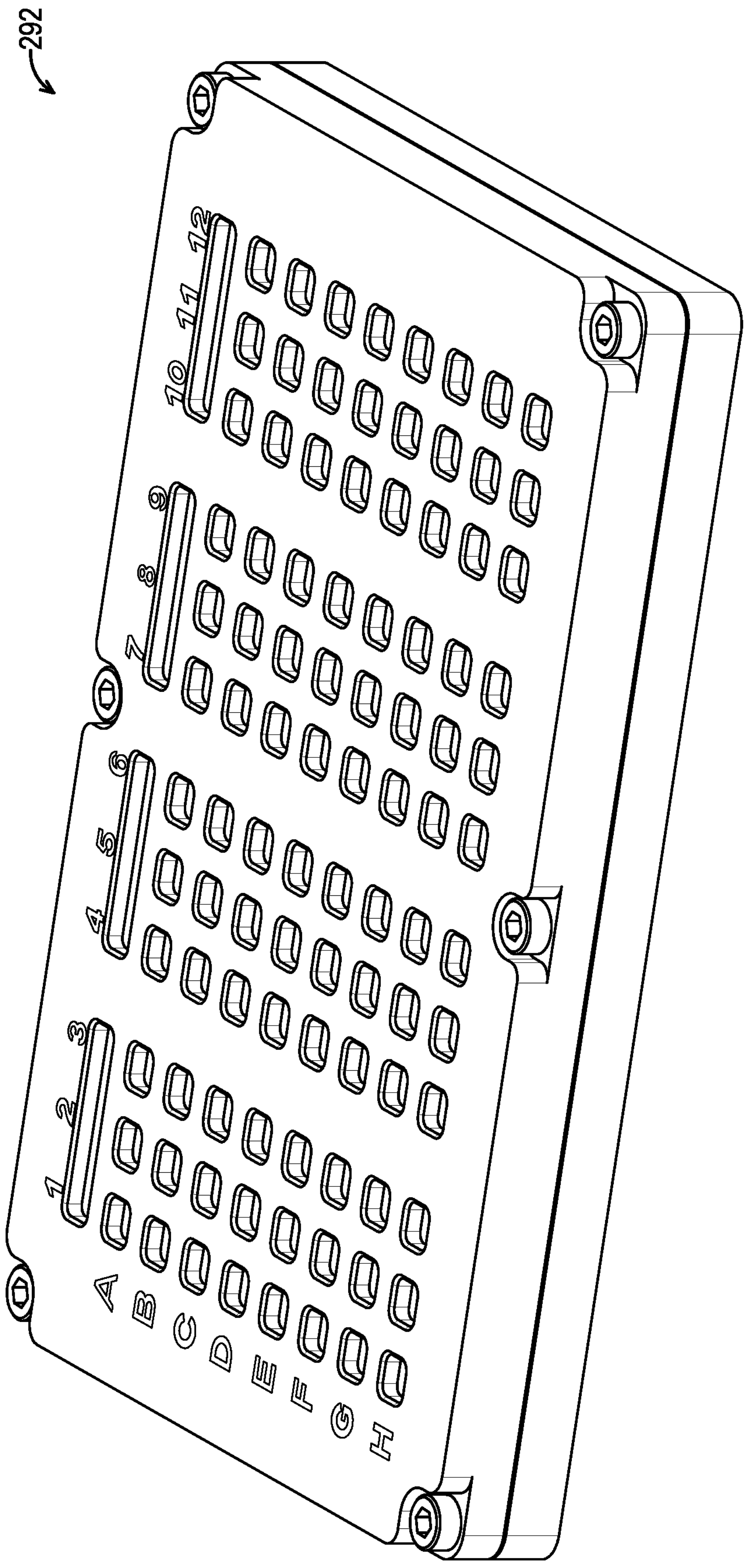
FIG. 27 is a perspective view of the sixth illustrative array plate of FIG. 26
Figure 28:
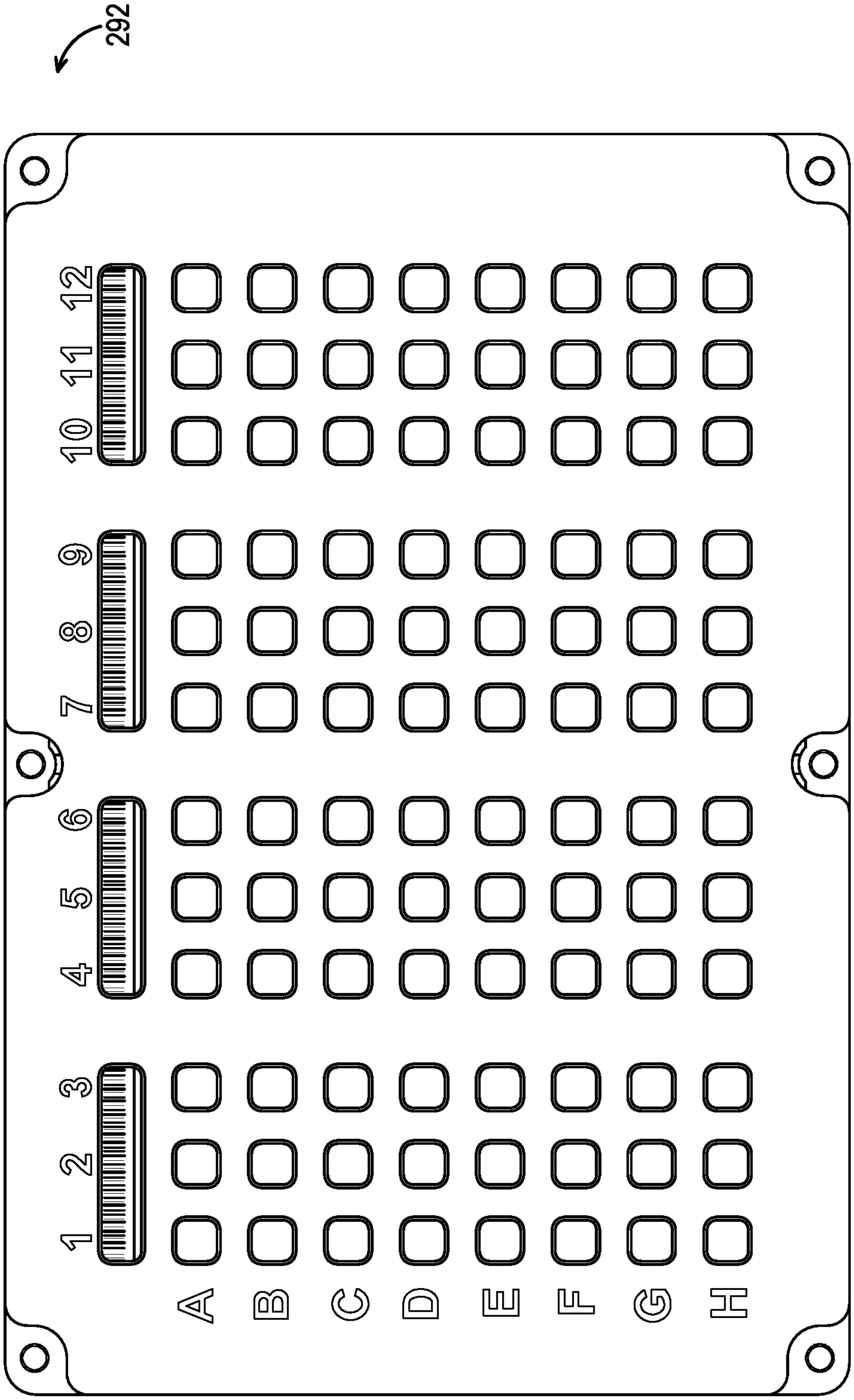
FIG. 28 is a top plan view of the sixth illustrative array plate of FIG. 26.

FIGS. 24 and 25 depict illustrative hybridization plates 280, 290 having alternative arrangements of wells and/or slides. Hybridization plates 280 and 290 are substantially identical to hybridization plate 200, except for a number of slides and/or wells. In the hybridization plate depicted in FIG. 24, hybridization plate 280 has four slides, each with eight wells per slide. In the hybridization plate depicted in FIG. 25, hybridization plate 290 has one slide, with 48 wells. In the hybridization plate depicted in FIGS. 26-28, hybridization plate 292 has four slides, each with 24 wells per slide. In some examples, hybridization plates according to the present teachings have from 1 to 4 slides per plate. In some examples, hybridization plates according to the present teaching have from 1 to 96 wells per slide. Illustrative arrangements of wells depicted in FIGS. 24-28 are suitable for use in hybridization plates 100, 200, and 200'.

C. Illustrative Method of Assembly

Figure 29:
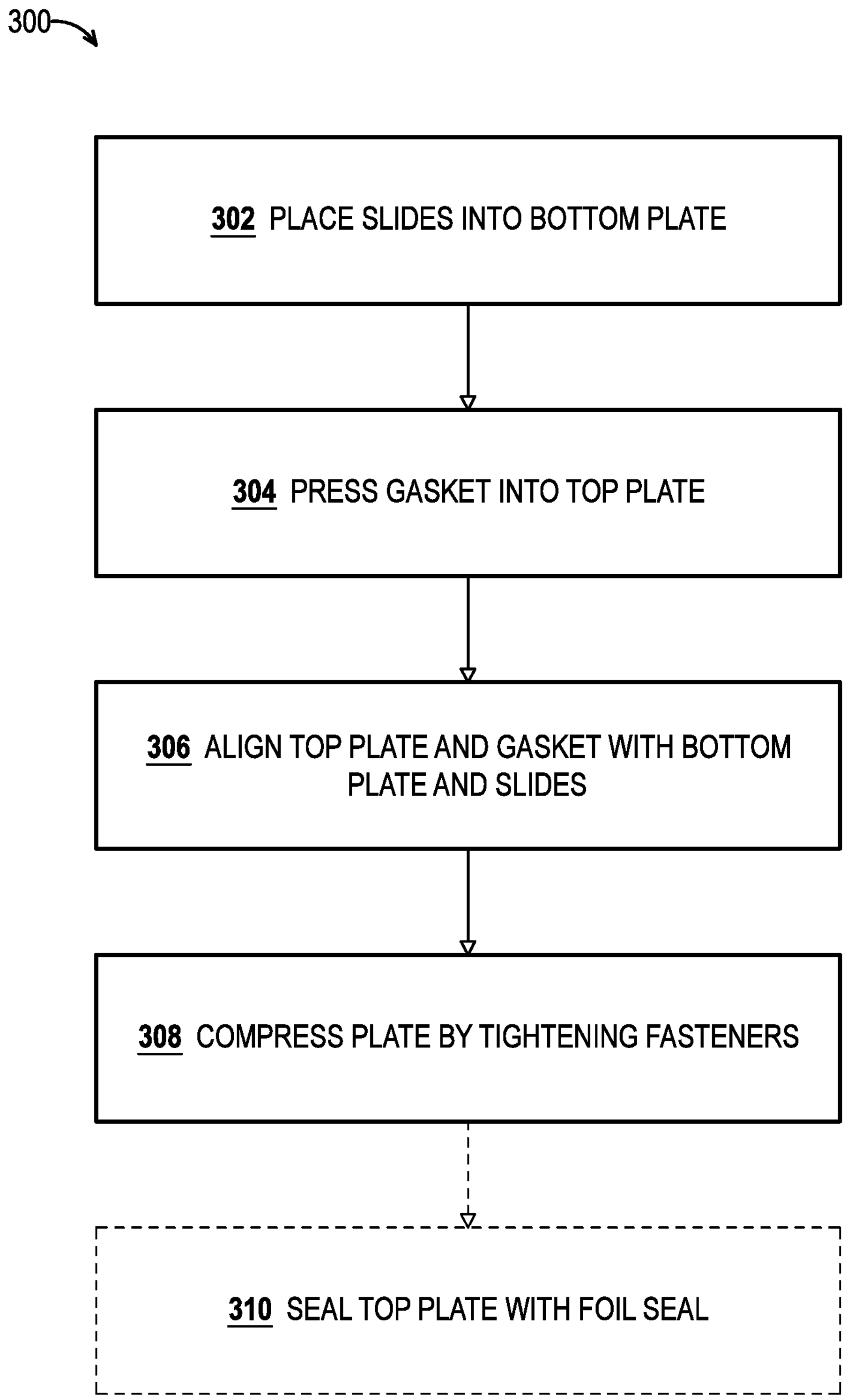
FIG. 29 is a flow chart depicting steps of an illustrative method for assembling an array plate in accordance with the present teachings.

This section describes steps of an illustrative method 300 for assembling a hybridization plate; see FIG. 29. Aspects of hybridization plate 100 and hybridization plate 200 may be utilized in the method steps described below. Where appropriate, reference may be made to components and systems that may be used in carrying out each step. These references are for illustration, and are not intended to limit the possible ways of carrying out any particular step of the method.

FIG. 29 is a flowchart illustrating steps performed in an illustrative method, and may not recite the complete process or all steps of the method. Although various steps of method 300 are described below and depicted in FIG. 29, the steps need not necessarily all be performed, and in some cases may be performed simultaneously or in a different order than the order shown.

Step 302 of method 300 includes placing one or more slides into a bottom plate of a hybridization plate. In some examples, the bottom plate is a supportive base plate similar to supportive base plate 120. In some examples, the bottom plate is both a slide support frame and supportive base plate similar to slide support frame 240 and supportive base plate 220, as described above. Placing one or more slides into the bottom plate of the hybridization plate includes orienting the one or more slides such that a bare or blank surface of the one or more slides is contacting the bottom plate of the hybridization plate. In some examples, placing one or more slides into a bottom plate of a hybridization plate includes placing the one or more slides into a slide support recess, such that the slide is retained by walls forming the slide support recesses, such as peripheral walls 125, 245, and ridges 126, 249. In some examples, the one or more slides comprise four slides. In some examples, placing one or more slides into a bottom plate of a hybridization plate includes utilizing set screws to secure the one or more slides into the bottom plate.

In some examples, step 302 further comprises preparing slides, such as by printing features or spots onto a slide to form a microarray slide. In these examples, one side of each slide is blank, and one side of each slide is "printed."

Step 304 of method 300 includes pressing a gasket into a top plate of a hybridization plate. In some examples, the top plate is a perforated cover plate similar to perforated cover plate 110, 210. Pressing the gasket into the top plate includes aligning gasket walls of the gasket with one or more recesses defined by the top plate. In some examples, the one or more recesses include lips extending from the top plate, such as lips 174. In some examples, the one or more recesses includes an aperture defined by a rim, such as rim 117. Pressing the gasket into the top plate includes ensuring that gasket walls are flush against the top plate so that the gasket walls are flat against the slides once assembled. If the walls are not pressed in fully, a leak may occur due to non-uniformity in gasket height. In some examples, pressing the gasket into the top plate includes inserting pins extending from the top plate into holes provided by the gasket, such as pins 172 and holes 134 described above.

In some examples, pressing a gasket into a top plate of a hybridization plate includes utilizing a gasket applicator tool according to aspects of the present teachings. FIGS. 29-33 depict a first gasket applicator tool 400 and a second gasket applicator tool 500, suitable for applying gaskets according to the present disclosure. Gasket applicator tools 400, 500 mate with a bottom portion of the gasket and may be utilized to evenly distribute force across the bottom of the gasket as the gasket is pressed into an underside of the top plate.

Figure 30:
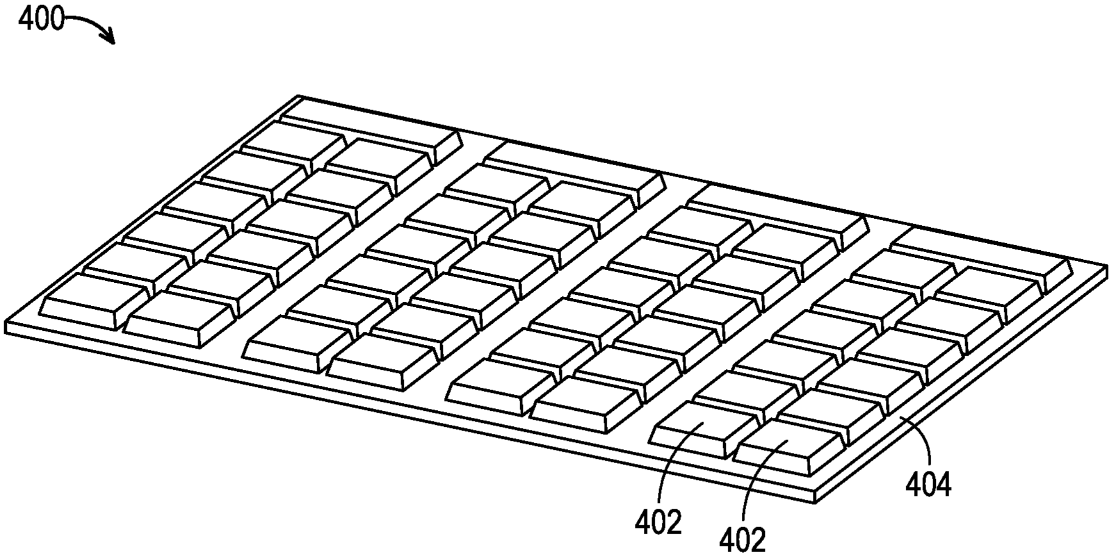
FIG. 30 is a perspective view of a first gasket application tool suitable for use in the method of FIG. 29.
Figure 31:
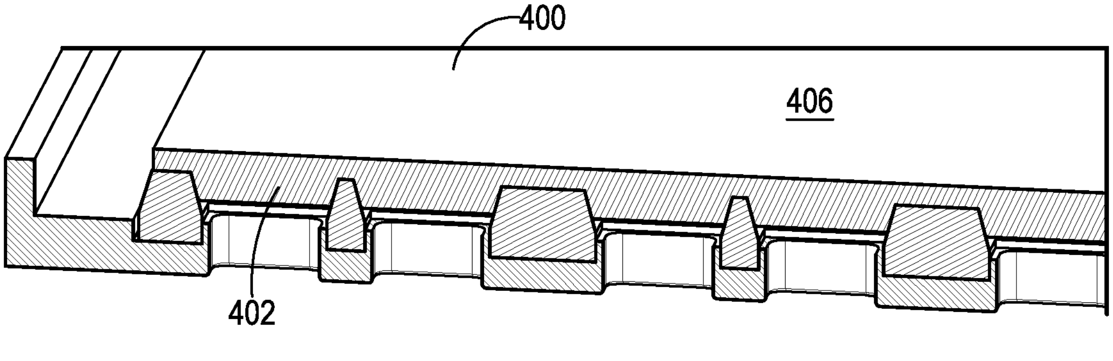
FIG. 31 is a sectional view of the first gasket application tool of FIG. 30, coupled to a gasket in accordance with the present teachings.

FIGS. 30-31 depict a first gasket applicator tool 400. Gasket applicator tool 400 includes a plurality of platforms 402 extending from a planar expanse 404. Platforms 402 are arranged in an array similar to arrays described above with respect to gasket 130. Accordingly, in the example depicted in FIGS. 30-31, platforms 402 are arranged in four groups, each corresponding to a slide. Each group of platforms 402 includes twelve smaller platforms, corresponding to wells defined by the gasket and one larger platform, corresponding to a barcode viewing window. Platforms 402 are configured to be inserted into apertures defined by the gasket, such as second apertures 132.

FIG. 31 depicts a sectional view of a gasket application tool 400, in use. Platforms 402 are inserted into apertures of the gasket, holding the gasket in place as it is pressed into the top plate. Accordingly, in some examples, pressing the gasket into the top plate includes mating gasket application tool 400 with the gasket, aligning the gasket with the top plate, and applying pressure to a surface 406 defined by an underside of the tool, opposite platforms 402. Pressure may be applied using any suitable method, such as a roller, gloved hand, and/or the like.

Figure 32:
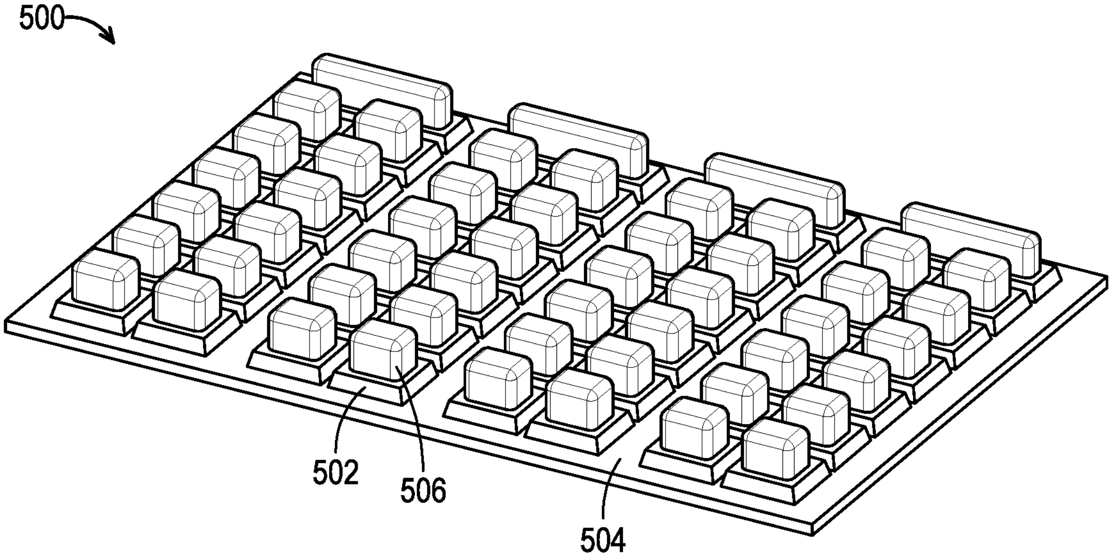
FIG. 32 is a perspective view of a second gasket application tool suitable for use in the method of FIG. 29.
Figure 33:
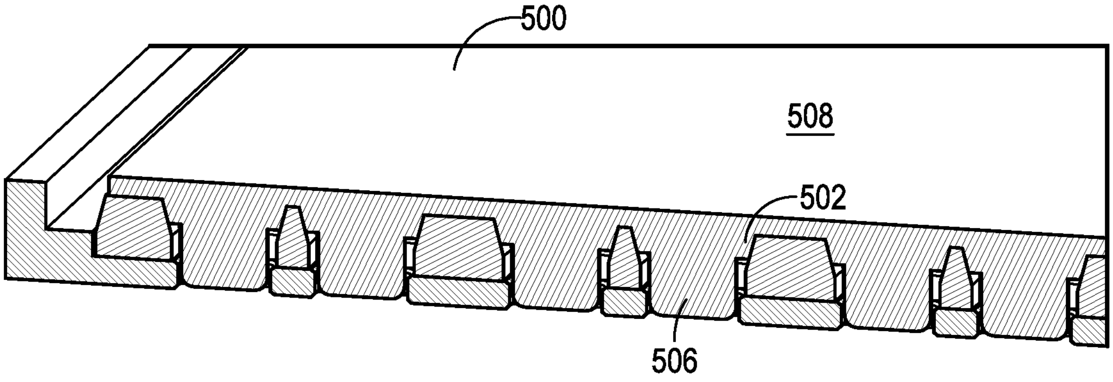
FIG. 33 is a sectional view of the second gasket application tool of FIG. 32, coupled to a gasket in accordance with the present teachings.
Figure 34:
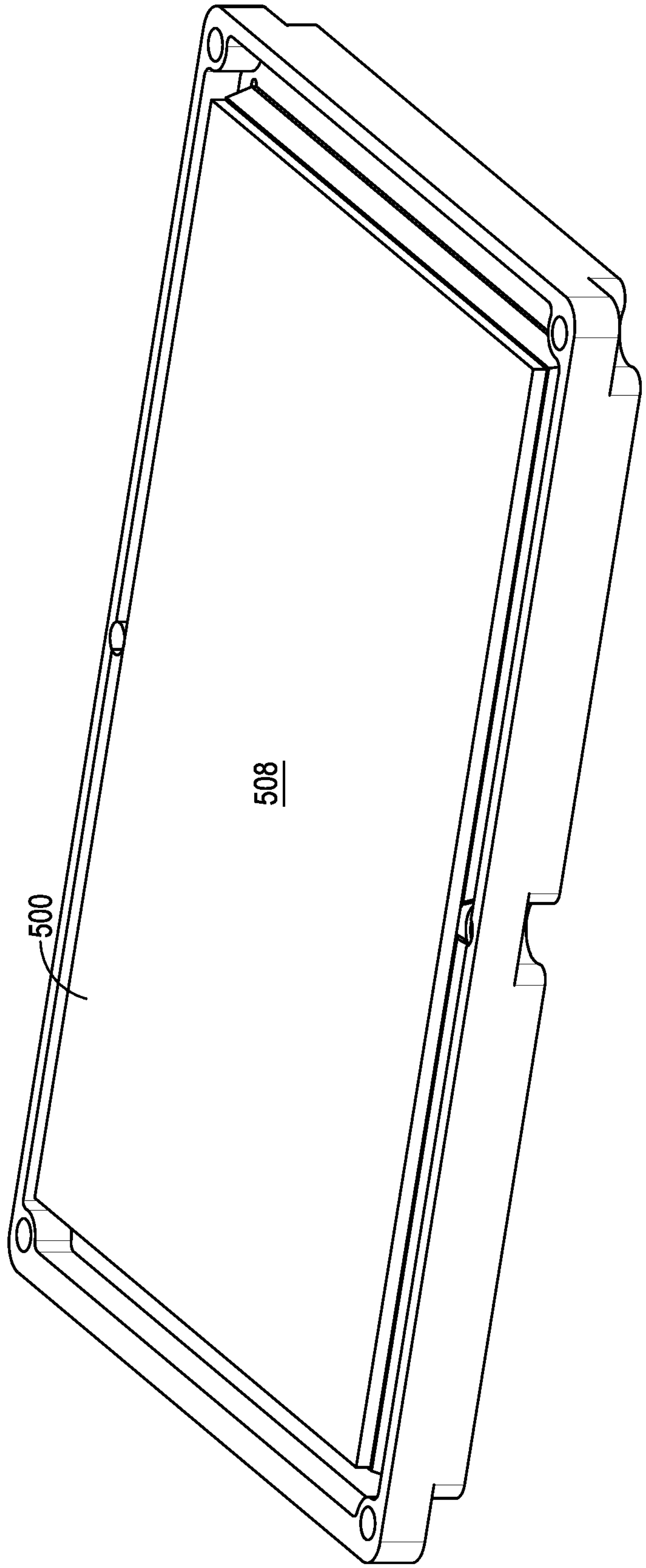
FIG. 34 is a perspective view of the second gasket application tool of FIG. 33, received by a top plate in accordance with the present teachings.

FIGS. 32-34 depict a second gasket applicator tool 500. Similar to gasket applicator tool 400, gasket applicator tool 500 includes a plurality of platforms 502 extending from a planar expanse 504. However, gasket applicator tool 500 further includes a plurality of castellations 506, with a single castellation extending from each platform. In some examples, such as in the example depicted in FIGS. 31 and 33, and in gaskets 130, 230, the gasket has walls which have a greater thickness at a top of the gasket than at a bottom of the gasket. In other words, wells defined by the gasket have a greater width at a bottom of the wells than at the top. Accordingly, in some examples, the platforms 502 have a first width and length corresponding to dimensions of the wells at a bottom of the gasket, and the castellations 506 have a second width and length corresponding to dimensions of the wells at a top of the gasket. In some examples, castellations 506 extend into apertures defined by the top plate when the gasket is installed. Accordingly, in these examples, the castellations may help guide the gasket into position. In these examples, pressing the gasket into the top plate includes mating gasket application tool 500 with the gasket, aligning the gasket with the top plate by aligning castellations 506 with apertures defined by the top plate, and applying pressure to a surface 508 defined by an underside of the tool, opposite platforms 502 and castellations 506. Pressure may be applied using any suitable method, such as a roller, gloved hand, and/or the like.

Utilizing gasket application tool 400 and/or 500 to apply and/or press the gasket into the top plate minimizes contact between a user's hands and an active surface of the gasket that will contact the slide. Furthermore, this method allows for even application of pressure across the gasket to seat the gasket easily into the top plate, without leaving individual gasket walls unseated, raised, and subject to causing leaks. Finally, this method is significantly faster at pressing in the gasket than doing so by hand.

Step 306 of method 300 includes aligning the top plate and gasket with the bottom plate and slides. Aligning the top plate and gasket with the bottom plate and slides causes the gasket to contact the slides, forming a plurality of wells. In some examples, aligning the top plate and gasket with the bottom plate and slides includes slidably receiving peripheral walls extending from the bottom plate into a recess defined by peripheral walls extending from the top plate. In some examples, aligning the top plate and gasket with the bottom plate and slides includes aligning asymmetric ridges extending from the top plate with complementary asymmetric ridges extending from the bottom plate. Accordingly, in some examples, the top plate and the bottom plate can be assembled in a single orientation relative to each other.

Step 308 of method 300 includes compressing the hybridization plate by tightening fasteners extending through the hybridization plate. Tightening the fasteners compresses the hybridization plate. More specifically, tightening the fasteners compresses the gasket between the top plate and the bottom plate, and each slide between the gasket and the bottom plate, forming a plurality of water-tight wells.

In some examples, step 380 includes inserting one or more fasteners through one or more through holes configured to receive the one or more fasteners. In some examples, the top plate, the bottom plate, and an optional slide support frame each include superimposed through holes, such that a single fastener may be inserted through the top plate, the bottom plate, and the optional slide support frame. The hybridization plate may include any suitable number of through holes and fasteners, however, in some examples, the hybridization plate includes at least six through holes and at least six fasteners. The at least six fasteners and through holes may be distributed such that a fastener and corresponding through hole is disposed at each corner of the hybridization plate, and such that a fastener and corresponding through hole is disposed along each long edge of the hybridization plate. In some examples, the hybridization plate includes greater than six fasteners, such as eight fasteners, ten fasteners, twelve fasteners, and/or the like. Providing at least six fasteners evenly distributes compression about the hybridization plate, reducing leakage along a long axis of the hybridization plate.

The fasteners may comprise any suitable fasteners which may be tightened, such as screws, bolts, brads, and/or the like. However, in some examples, hybridization plates according to the present disclosure are configured to be disassembled underwater. Accordingly, in some examples, the fasteners comprise hex-head screws, which may be firmly tightened and easily loosened underwater when compared with thumb screws. In some examples, tightening the fasteners includes utilizing a hex wrench to tighten the fasteners. In some examples, the fasteners are recessed relative to a top surface of the top plate, to facilitate the application of a foil seal in a later step.

In some examples, step 310 of method 300 optionally includes sealing the top plate using a foil seal, thereby preventing evaporation of samples. In some examples, step 310 includes loading samples into each well prior to sealing the top plate using a foil seal. In some examples, step 310 includes scanning a barcode included on a slide prior to applying the foil seal. In some examples, step 310 includes scanning a barcode included on a slide after applying the foil seal, by scanning the barcode through a viewing window included in the bottom plate.

D. Illustrative Method of Disassembly

Figure 35:
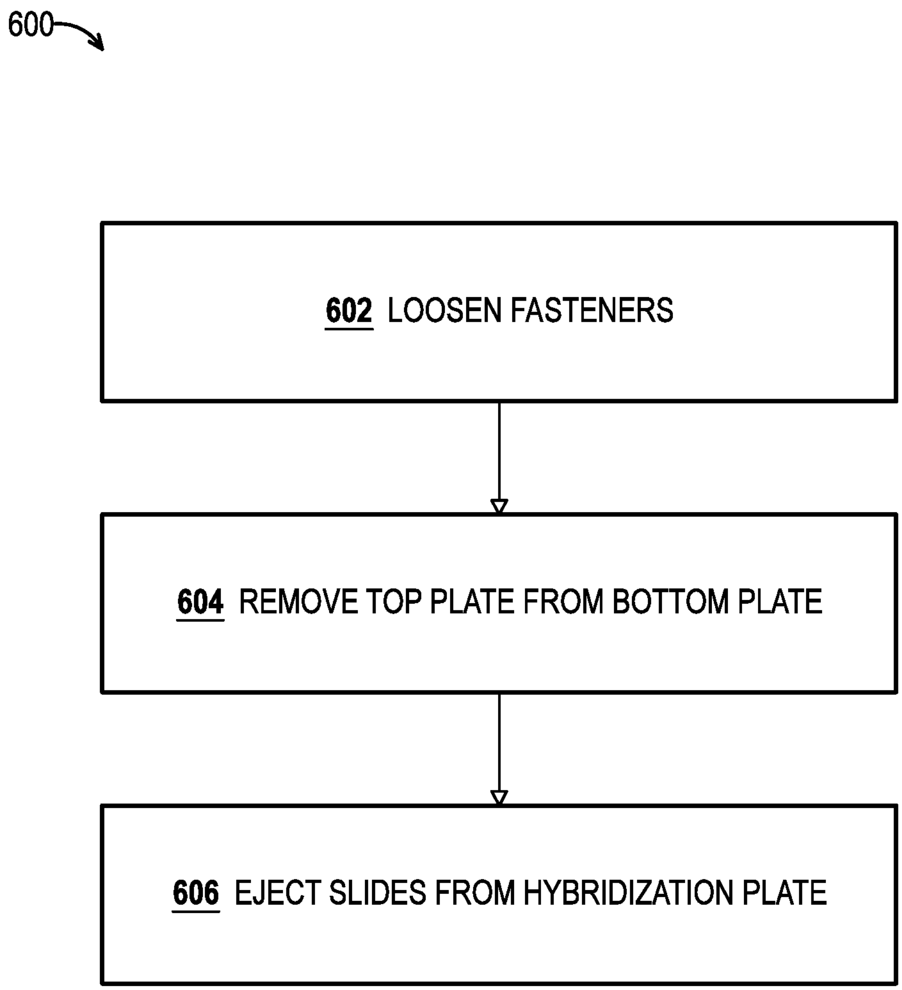
FIG. 35 is a flow chart depicting steps of an illustrative method for disassembling an array plate in accordance with the present teachings.

This section describes steps of an illustrative method 600 for disassembling a hybridization plate; see FIG. 35. Aspects of hybridization plates 100 and 200 may be utilized in the method steps described below. Where appropriate, reference may be made to components and systems that may be used in carrying out each step. These references are for illustration, and are not intended to limit the possible ways of carrying out any particular step of the method.

FIG. 35 is a flowchart illustrating steps performed in an illustrative method, and may not recite the complete process or all steps of the method. Although various steps of method 600 are described below and depicted in FIG. 35, the steps need not necessarily all be performed, and in some cases may be performed simultaneously or in a different order than the order shown.

Step 602 of method 600 includes loosening fasteners coupling a top plate of the hybridization plate to a bottom plate of the hybridization plate. In some examples, the top plate is a perforated cover plate similar to perforated cover plate 110, 210. In some examples, the bottom plate is a supportive base plate similar to supportive base plate 120. In some examples, the bottom plate is both a slide support frame and supportive base plate similar to slide support frame 240 and supportive base plate 220, as described above. In some examples, loosening the fasteners includes removing the fasteners from corresponding through holes extending through the top plate and the bottom plate. The fasteners may comprise any suitable fasteners which may be tightened, such as screws, bolts, brads, and/or the like.

In some examples, step 602 is performed underwater. Accordingly, in some examples, the fasteners are configured to be easily turned underwater. In some examples, the fasteners are hex screws, and loosening the fasteners includes unscrewing the hex screws using a hex wrench. In some examples, the fasteners are recessed, to facilitate the application of a foil seal to the top plate.

Step 604 of method 600 includes removing the top plate from the bottom plate. In some examples, peripheral walls extending from the top plate are mated to peripheral walls extending from the bottom plate. Accordingly, in some examples, removing the top plate from the bottom plate includes sliding peripheral walls extending from the top plate against peripheral walls extending from the bottom plate.

Step 606 of method 600 includes ejecting slides from the hybridization plate. As described in more detail above, slides utilized in hybridization assays generally include active, or printed, regions including DNA microarrays. When disassembling the hybridization plate, it is important to not to touch the active regions of each slide. Accordingly, ejecting slides from the hybridization plate includes poking the slides from the bottom, through apertures provided in the bottom plate. These manipulations are often difficult to perform without touching the microarray surface on the slide.

Accordingly, in some examples, ejecting slides from the hybridization plate includes utilizing a slide ejection tool according to the present teachings to push slides out of the bottom plate. FIGS. 36-39 depict a first slide ejection tool 700 and a second slide ejection tool 800, suitable for ejecting slides according to the present disclosure. Slide ejection tools 700 and 800 include protrusions configured to mate with apertures provided by the bottom plate, such that mating the slide ejection tool with the bottom plate pushes on a bottom surface of one or more slides. In some examples, utilizing a slide ejection tool includes pushing one or more protrusions of the slide ejection tool through one or more respective apertures formed by the bottom plate, such that each protrusion contacts the bottom surface of a slide. Pushing slides out of the plate from the bottom facilitates picking up the slides at edges of the slides, such that a printed side of the slide remains untouched.

Figure 36:
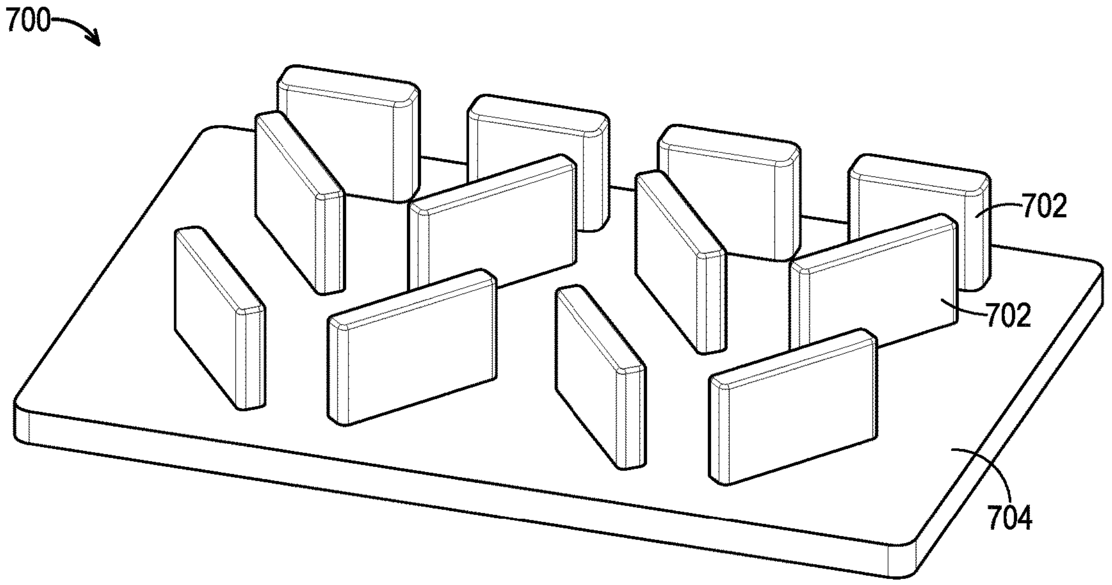
FIG. 36 is a perspective view of a first illustrative slide ejection tool suitable for use in the method of FIG. 35.
Figure 37:
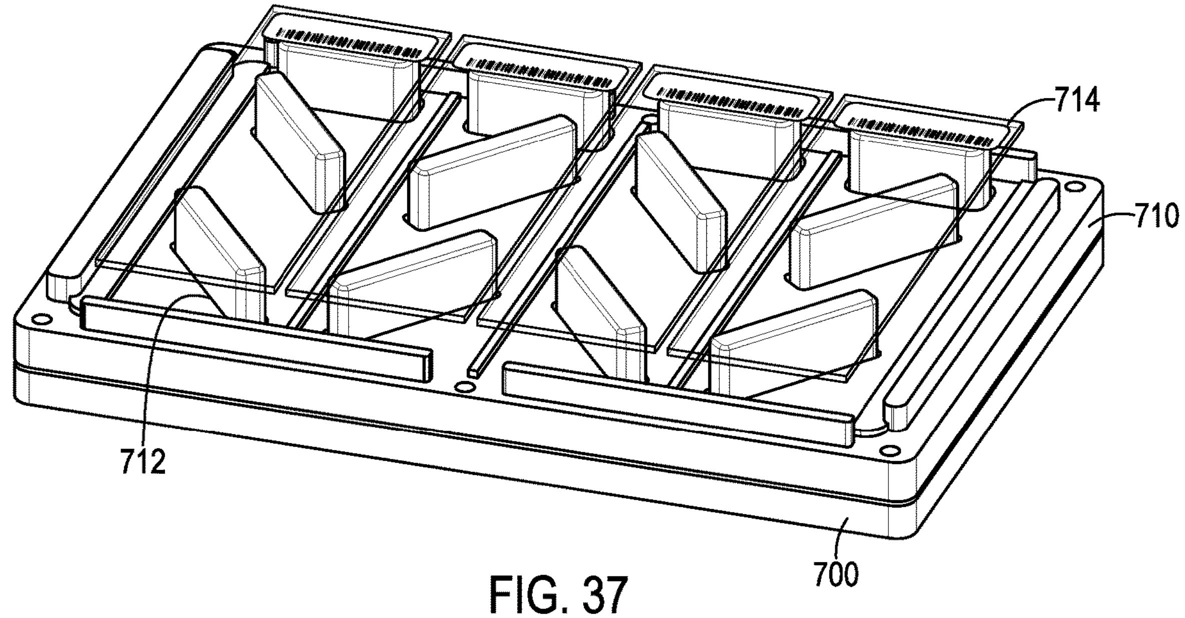
FIG. 37 is a perspective view of the first illustrative slide ejection tool of FIG. 36, ejecting slides from a bottom plate in accordance with the present teachings.

FIGS. 36-37 depict a first slide ejection tool (AKA slide ejector) 700. Slide ejection tool 700 is configured to eject slides from hybridization plates having bottom plates substantially similar to supportive base plate 120. Slide ejection tool 700 includes one or more protrusions 702 extending from a planar base 704. In some examples, each of the one or more protrusions 702 is configured to correspond to a slide received by the bottom plate. In some examples, the bottom plate includes one or more apertures defined by the bottom plate. Accordingly, each of the one or more protrusions 702 is configured to extend through a respective one of the one or more apertures, mating the first slide ejection tool with the bottom plate. In some examples, slide ejection tool 700 includes two or more protrusions corresponding to each slide, such that, in use, each slide is supported by at least two protrusions. In some examples, a protrusion of the one or more protrusions is configured to extend through a viewing window provided in the bottom plate.

Protrusions 702 may have any suitable shape, size, and/or distribution. In some examples, protrusions 702 are substantially rectangular, oblong, circular, ovular, irregular, and/or the like. In some examples, protrusions 702 are distributed such that protrusions corresponding to each slide are substantially aligned with each other along the long axis of the hybridization plate (i.e., forming one or more rows of protrusions). In the example depicted in FIGS. 36 and 37, slide ejection tool 700 includes a pair of elongate protrusions per slide, each pair oriented at alternating acute angles relative to a long axis of the slide ejection tool. However, a slide ejection tool suitable for use with supportive base plate 120' may include three cylindrical protrusions per slide.

FIG. 37 depicts first slide ejection tool 700 mated with a bottom plate 710. Bottom plate 710 is substantially identical to supportive base plate 120. Accordingly, protrusions 702 extend through respective apertures 712 formed in bottom plate 710. As depicted in FIG. 34, protrusions 702 support a slide 714 when slide ejection tool 700 is mated with bottom plate 710. Protrusions 702 may have any suitable height, but generally have a height greater than a thickness of bottom plate 710, such as at least 5 mm, at least 10 mm, at least 15 mm, and/or the like.

Figure 38:
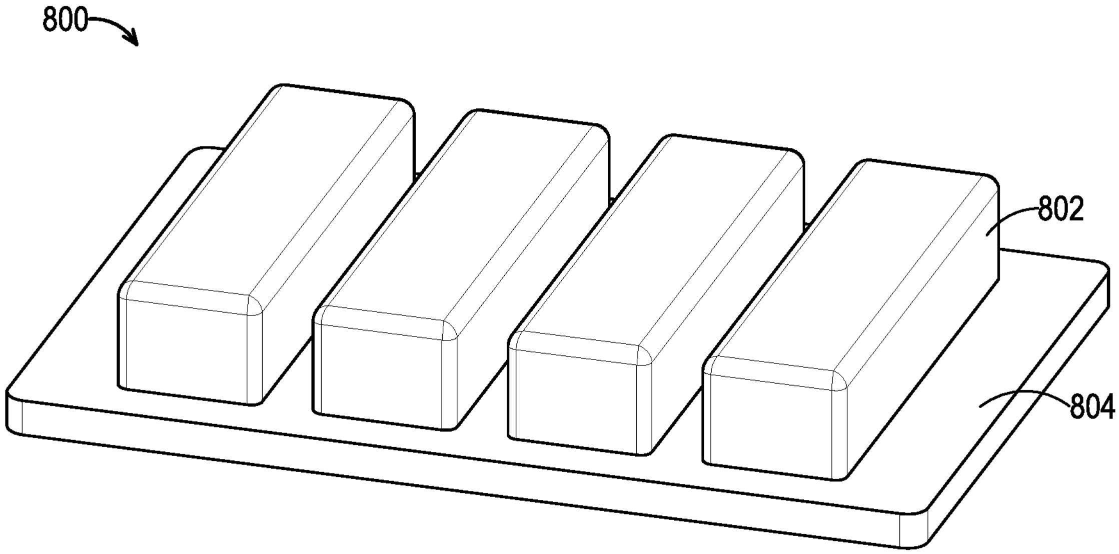
FIG. 38 is a perspective view of a second illustrative slide ejection tool suitable for use in the method of FIG. 35.
Figure 39:
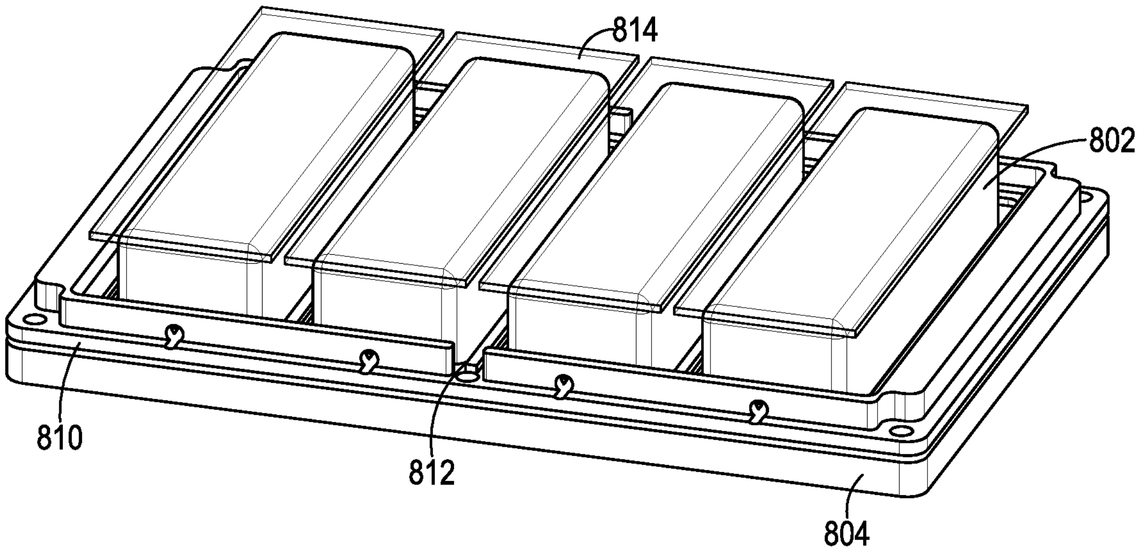
FIG. 39 is a perspective view of the second illustrative slide ejection tool of FIG. 38, ejecting slides from a bottom plate in accordance with the present teachings.

FIGS. 38-39 depict a second slide ejection tool (AKA slide ejector) 800. Slide ejection tool 800 is configured to eject slides from hybridization plates having bottom plates including a slide support frame similar to slide support frame 240, as described above. Slide ejection tool 800 includes one or more protrusions 802 extending from a planar base 804. Generally, each protrusion 802 corresponds to a slide received by the bottom plate, such that each of the one or more protrusions is configured to extend through a respective window defined by the slide support frame. Accordingly, in some examples, utilizing a slide ejection tool according to the present teachings to push slides out of the bottom plate further comprises removing a supportive base plate from the hybridization plate, such that the slides are retained by a slide support frame similar to slide support frame 240. Utilizing slide ejection tool 800 includes pushing the one or more protrusions 802 through the respective windows, such that at least one protrusion supports a respective slide.

Protrusions 802 may have any suitable shape and/or size complementary to windows defined by the slide support frame. Accordingly, protrusions 802 are generally similar in shape and slightly smaller in dimension than the slides. In some examples, each protrusion 802 comprises a rectangular prism configured to extend through a respective window. Accordingly, each protrusion 802 defines a support surface 806 configured to support a slide from below. However, a protrusion having any suitable shape defining a support surface may be utilized, such as cylindrical, triangular prism, rectangular prism, octagonal prism, and/or the like.

FIG. 39 depicts second slide ejection tool 800 mated with a slide support frame 810. Slide support frame 810 is substantially identical to slide support frame 240. Accordingly, protrusions 802 extend through respective windows 812 formed by slide support frame 810. As depicted in FIG. 39, protrusions 802 support a slide 814 when slide ejection tool 800 is mated with slide support frame 810. Protrusions 802 may have any suitable height, but generally have a height greater than a thickness of slide support frame 810, such as at least 5 mm, at least 10 mm, at least 15 mm, and/or the like.

Figure 40:
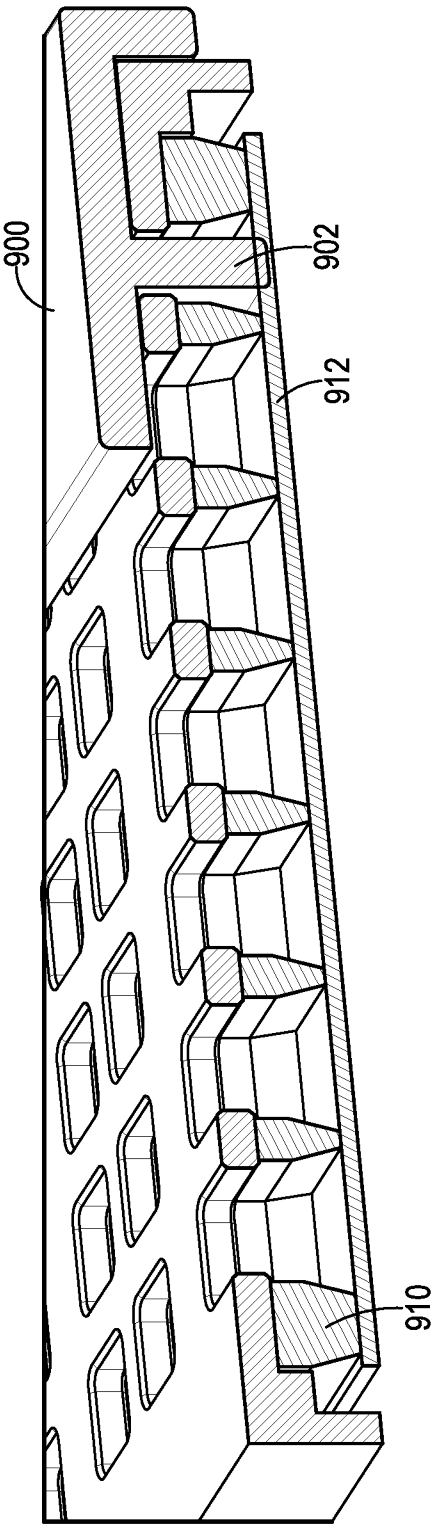
FIG. 40 is a sectional view of a third illustrative slide ejection tool, ejecting slides from a gasket in accordance with the present teachings.

Furthermore, in some examples, slides may stick to the gasket. In some examples, ejecting slides from the hybridization plate includes poking the slide out of the gasket by pressing on the barcode of a barcoded microarray slide. In some examples, ejecting slides from the hybridization plate includes utilizing a slide ejector, such as slide ejector 900, to remove slides from the gasket. As depicted in FIG. 40, slide ejector 900 comprises a protrusion 902 configured to extend through a viewing window provided by a gasket 910. As described above with respect to gaskets 130, 230, top plates and gaskets according to the present teachings include a viewing window configured to expose a barcode of a barcoded microarray slide. Accordingly, protrusion 902 is configured to eject the slide by pressing on the barcode, protecting the printed region of the slide. When protrusion 902 extends through the viewing window, the protrusion contacts the barcode of slide 912, ejecting the slide from the gasket. In some examples, step 606 includes utilizing a slide ejector to eject a slide from a gasket by pressing on the barcode of a barcoded microarray slide.

In some examples, one or more slides stick to the gasket, while one or more slides remain within the bottom plate. Accordingly, in some examples, ejecting slides from the hybridization plate includes ejecting one or more slides from the gasket and ejecting one or more slides from the bottom plate.

E. Illustrative Combinations and Additional Examples

This section describes additional aspects and features of hybridization plates, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An array plate comprising:

a perforated cover plate defining a plurality of first apertures;

a supportive base plate defining a planar surface; and a gasket sandwiched between the perforated cover plate and the supportive plate and defining a plurality of second apertures, such that the plurality of first apertures and the plurality of second apertures collectively define a plurality of wells.

A1. The array plate of paragraph A0, wherein the perforated cover plate and the supportive base plate each comprise one or more through holes, each configured to receive a fastener.

A1.1. The array plate of paragraph A1, further comprising at least one fastener extending through each through hole of the one or more through holes.

A1.2. The array plate of paragraph A1, wherein the perforated cover plate and the supportive base plate each comprise at least four through holes disposed at corners of the array plate.

A1.2.1. The array plate of paragraph A1.2, wherein each through hole is configured to receive a respective fastener.

A1.3. The array plate of any of paragraphs A1 through A1.2, wherein each of the perforated cover plate and the supportive base plate each comprise at least six through holes distributed around a periphery of the array plate.

A1.3.1 The array plate of paragraph A1.3, wherein each through hole is configured to receive a respective fastener.

A1.4. The array plate of paragraph A1.3 or paragraph A1.3.1, wherein the perforated cover plate and the supportive base plate each comprise at least four through holes disposed at corners of the hybridization plate and at least two through holes disposed at long edges of the array plate.

A1.5. The array plate of any of paragraphs A1 through A1.4, wherein the fastener is a hex screw.

A1.6. The array plate of paragraph A1.5, wherein the hex screw is configured to be recessed relative to a top surface of the perforated cover plate.

A2. The array plate of A0 through A1.6, wherein the supportive base plate includes a slab defining the planar surface.

A2.1. The array plate of paragraph A2, further comprising one or more peripheral walls extending vertically from slab, such that the one or more peripheral walls are configured to retain a slide within the supportive base plate.

A2.1.1. The array plate of paragraph A2.1, wherein the one or more peripheral walls comprise at least four walls arranged around a perimeter of the supportive base plate.

A2.1.2. The array plate of paragraph A2.1 or A2.1.1, wherein the one or more peripheral walls are inset from lateral edges of the supportive base plate.

A2.1.3. The array plate of any of paragraphs A2.1 through A2.1.2, wherein the peripheral walls have at least one discontinuity corresponding with the at least one through hole.

A2.1.3. The array plate of any of paragraphs A2.1 through A2.1.3, wherein the peripheral walls extending from the slab are configured to mate with corresponding peripheral walls extending from the perforated cover plate.

A2.2. The array plate of any of paragraphs A2.1 through A2.1.3, further comprising one or more ridges extending vertically from the slab, such that the one or more ridges and the one or more peripheral walls collectively define one or more slide retention recesses configured to retain a slide.

A2.2.1. The array plate of paragraph A2.2, wherein the one or more ridges extend transverse to a long axis of the supportive base plate.

A2.3. The array plate of any of paragraphs A2.1 through A2.2.1, further comprising asymmetrical peripheral ridges extending from the perforated cover plate and the supportive base plate, wherein the asymmetrical peripheral ridges are configured to fit together such that the array plate is configured to be assembled in a single orientation.

A2.3.1. The array plate of paragraph A2.3, wherein the perforated cover plate and the supportive base plate each comprise two respective asymmetrical peripheral ridges.

A2.3.2. The array plate of paragraph A2.3.1, wherein each of the perforated cover plate and the supportive base plate comprises a wide asymmetrical peripheral ridge and a narrow asymmetrical peripheral ridge.

A2.3.3. The array plate of paragraph A2.3.2, wherein the wide asymmetrical peripheral ridge of the perforated cover plate provides a wide recess, and wherein the narrow asymmetrical peripheral ridge of the perforated cover plate provides a narrow recess; and wherein the wide asymmetrical peripheral ridge of the supportive base plate is received by the wide recess and the narrow asymmetrical peripheral ridge of the supportive base plate is received by the narrow recess when the array plate is in an assembled configuration.

A2.3.4. The array plate of any of paragraphs A2.3 through A2.3.3, wherein the asymmetrical peripheral ridges of the supportive base plate comprise an increase in thickness of the peripheral walls.

A2.4. The array plate of any of paragraphs A2 through A2.3.4, further comprising one or more apertures extending through the slab.

A2.4.1. The array plate of paragraph A2.4, further comprising at least one aperture corresponding to each/a slide retention recess.

A2.4.2. The array plate of paragraph A2.4.1, further comprising at least two apertures corresponding to each/the slide retention recess.

A3. The array plate of any of paragraphs A0 through A2.3.4, wherein the supportive base plate includes one or more platforms, each defining a respective planar surface configured to support a single slide.

A3.1. The array plate of paragraph A3, further comprising a slide support frame sandwiched between the gasket and the supportive base plate, the slide support frame comprising a plurality of rails extending between a pair of rungs and defining one or more windows, each configured to receive a slide.

A3.1.1. The array plate of paragraph A3.1, further comprising a flange extending laterally from each rung and each rail, such that the flanges are configured to support the slide.

A3.2. The array plate of paragraph A3.1, wherein the supportive base plate further comprises a peripheral rim configured to support the slide support frame.

A3.3. The array plate of any of paragraphs A3.1 through A3.2, further comprising one or more peripheral walls extending vertically from the slide support frame, such that the one or more peripheral walls are configured to retain a slide within the supportive base plate.

A3.3.1. The array plate of paragraph A3.3, wherein the one or more peripheral walls comprise at least four walls arranged around a perimeter of the slide support frame.

A3.3.2. The array plate of any of paragraphs A3.3 through A3.3.1, wherein the peripheral walls have at least one discontinuity corresponding with each of the one or more apertures.

A3.3.3. The array plate of any of paragraphs A3.3 through A3.1.2, wherein the peripheral walls extending from the slab are configured to mate with corresponding peripheral walls extending from the perforated cover plate.

A3.4. The array plate of any of paragraphs A3.1 through A3.3.3, further comprising one or more ridges extending vertically from the rails, such that the one or more ridges and the one or more peripheral walls collectively define one or more windows to retain a slide.

A3.4.1. The array plate of paragraph A3.4, wherein the one or more ridges, the one or more peripheral walls, and at least one of the one or more platforms collectively define a slide retention recess.

A3.4.2. The array plate of paragraph A3.4.1, wherein the one or more ridges extend transverse to a long axis of the slide support frame.

A4. The array plate of any of paragraphs A0 through A3.X, wherein the perforated cover plate includes a plurality of pins extending from an inner surface, wherein the gasket includes a plurality of holes corresponding to the plurality of pins, and wherein the plurality of pins are configured to mate with the plurality of holes to retain the gasket within the perforated cover plate.

A4.1. The array plate of any of paragraphs A0 through A3.X, wherein the perforated cover plate includes a plurality of gasket retention lips extending from edges of the first apertures, wherein the plurality of gasket retention lips are configured to receive walls of the gasket in a friction fit.

A5. The array plate of any of paragraphs A0 through A4.1, wherein the first apertures and the second apertures define an array of wells configured to align with a printable region of a barcode slide, and a viewing window configured to align with a barcode of a barcode slide.

A6. The array plate of any of paragraphs A0 through A5, wherein the wells have a substantially square profile.

A7. The array plate of any of paragraphs A0 through A6, further comprising a peripheral rim extending from a bottom surface of the supportive base plate, such that the array plate is compatible with a variety of shakers.

A8. The array plate of any of paragraphs A0 through A7, wherein the supportive base plate and the perforated cover plate each comprise stainless steel.

A8.1. The array plate of any of paragraphs A0 through A8, wherein the gasket comprises silicone.

A9. The array plate of any of paragraphs A0 through A8.1, wherein the array plate is configured to retain four slides, and wherein the perforated cover plate and the gasket collectively define twelve wells per slide.

A9.1. The array plate of any of paragraphs A0 through A9, wherein the array plate is configured to retain four slides, and wherein the perforated cover plate and the gasket collectively define eight wells per slide.

A9.2. The array plate of any of paragraphs A0 through A9.1, wherein the array plate is configured to retain one slide, and wherein the perforated cover plate and the gasket collectively define forty-eight wells per slide.

B0. An array plate comprising:

a perforated cover plate defining a plurality of first apertures;

a supportive base plate defining a planar surface;

a gasket disposed between the perforated cover plate and the supportive plate and defining a plurality of second apertures, such that the first plurality of apertures and the second plurality of apertures collectively define a plurality of wells; and one or more slides sandwiched between the gasket and the planar surface, such that the planar surface supports the one or more slides.

B1. The array plate of paragraph B0, wherein the perforated cover plate and the supportive base plate each comprise one or more through holes, each configured to receive a fastener.

B 1.1. The array plate of paragraph B1, further comprising at least one fastener extending through each of the one or more through holes.

B1.2. The array plate of paragraph B1, wherein the perforated cover plate and the supportive base plate each comprise at least four through holes disposed at corners of the array plate.

B1.2.1. The array plate of paragraph B1.2, wherein each through hole is configured to receive a respective fastener.

B1.3. The array plate of any of paragraphs B1 through B1.2, wherein each of the perforated cover plate and the supportive base plate each comprise at least six through holes distributed around a periphery of the array plate.

B1.3.1 The array plate of paragraph B1.3, wherein each through hole is configured to receive a respective fastener.

B1.4. The array plate of paragraph B1.3 or B1.3.1, wherein the perforated cover plate and the supportive base plate each comprise at least four through holes disposed at corners of the array plate and at least two through holes disposed at long edges of the array plate.

B1.5. The array plate of any of paragraphs B1 through B1.4, wherein the fastener is a hex screw.

B1.6. The array plate of paragraph B1.5, wherein the hex screw is configured to be recessed relative to a top surface of the perforated cover plate.

B1.7. The array plate of any of paragraphs B1 through B1.6, wherein tightening the fastener is configured to compress the slide between the gasket and the supportive base plate.

B2 The array plate of B0 through B1.6, wherein the supportive base plate includes a slab defining the planar surface.

B2.1. The array plate of paragraph B2, further comprising one or more peripheral walls extending vertically from slab, such that the one or more peripheral walls are configured to retain the one or more slides within the supportive base plate.

B2.1.1. The array plate of paragraph B2.1, wherein the one or more peripheral walls comprise at least four walls arranged around a perimeter of the supportive base plate.

B2.1.2. The array plate of paragraph B2.1 or B2.1.1, wherein the one or more peripheral walls are inset from lateral edges of the supportive base plate.

B2.1.3. The array plate of any of paragraphs B2.1 through B2.1.2, wherein the peripheral walls have at least one discontinuity corresponding with at least one through hole of the one or more through holes.

B2.1.3. The array plate of any of paragraphs B2.1 through B2.1.3, wherein the peripheral walls extending from the slab are configured to mate with corresponding peripheral walls extending from the perforated cover plate.

B2.2. The array plate of any of paragraphs B2.1 through B2.1.3, further comprising one or more ridges extending vertically from the slab, such that the one or more ridges and the one or more peripheral walls collectively define one or more slide retention recesses configured to retain the one or more slides.

B2.2.1. The array plate of paragraph B2.2, wherein the one or more ridges extend transverse to a long axis of the supportive base plate.

B2.3. The array plate of any of paragraphs B2.1 through B2.2.1, further comprising asymmetrical peripheral ridges extending from the perforated cover plate and the supportive base plate, wherein the asymmetrical peripheral ridges are configured to fit together such that the array plate is configured to be assembled in a single orientation.

B2.3.1. The array plate of paragraph B2.3, wherein the perforated cover plate and the supportive base plate each comprise two respective asymmetrical peripheral ridges.

B2.3.2. The array plate of paragraph B2.3.1, wherein each of the perforated cover plate and the supportive base plate comprises a wide asymmetrical peripheral ridge and a narrow asymmetrical peripheral ridge.

B2.3.3. The array plate of paragraph B2.3.2, wherein the wide asymmetrical peripheral ridge of the perforated cover plate provides a wide recess, and wherein the narrow asymmetrical peripheral ridge of the perforated cover plate provides a narrow recess; and wherein the wide asymmetrical peripheral ridge of the supportive base plate is received by the wide recess and the narrow asymmetrical peripheral ridge of the supportive base plate is received by the narrow recess when the array plate is in an assembled configuration.

B2.3.4. The array plate of any of paragraphs B2.3 through B2.3.3, wherein the asymmetrical peripheral ridges of the supportive base plate comprise an increase in thickness of the peripheral walls.

B2.4. The array plate of any of paragraphs B2 through B2.3.4, further comprising one or more apertures extending through the slab.

B2.4.1. The array plate of paragraph B2.4, further comprising at least one aperture corresponding to each/a slide retention recess.

B2.4.2. The array plate of paragraph B2.4.1, further comprising at least two apertures corresponding to each/the slide retention recess.

B3. The array plate of any of paragraphs B0 through B2.3.4, wherein the supportive base plate includes one or more platforms, each defining a respective planar surface configured to support a single slide of the one or more slides.

B3.1. The array plate of paragraph B3, further comprising a slide support frame sandwiched between the gasket and the supportive base plate, the slide support frame comprising a plurality of rails extending between a pair of rungs and defining one or more windows, each configured to receive a slide of the one or more slides.

B3.1.1. The array plate of paragraph B3.1, further comprising a flange extending laterally from each rung and each rail, such that the flanges are configured to support a slide of the one or more slides.

B3.2. The array plate of paragraph B3.1, wherein the supportive base plate further comprises a peripheral rim configured to support the slide support frame.

B3.3. The array plate of any of paragraphs B3.1 through B3.2, further comprising one or more peripheral walls extending vertically from the slide support frame, such that the one or more peripheral walls are configured to retain the one or more slides within the supportive base plate.

B3.3.1. The array plate of paragraph B3.3, wherein the one or more peripheral walls comprise at least four walls arranged around a perimeter of the slide support frame.

B3.3.2. The array plate of any of paragraphs B3.3 through B3.3.1, wherein the peripheral walls have at least one discontinuity corresponding with at least one through hole of the one or more through holes.

B3.3.3. The array plate of any of paragraphs B3.3 through B3.1.2, wherein the peripheral walls extending from the slab are configured to mate with corresponding peripheral walls extending from the perforated cover plate.

B3.4. The array plate of any of paragraphs B3.1 through B3.3.3, further comprising one or more ridges extending vertically from the rails, such that the one or more ridges and the one or more peripheral walls collectively define one or more windows, each configured to retain a respective slide.

B3.4.1. The array plate of paragraph B3.4, wherein the one or more ridges, the one or more peripheral walls, and at least one platform of the one or more platforms collectively define a slide retention recess.

B3.4.2. The array plate of paragraph B3.4.1, wherein the one or more ridges extend transverse to a long axis of the slide support frame.

B4. The array plate of any of paragraphs B0 through B3.4.2, wherein the perforated cover plate includes a plurality of pins extending from an inner surface, wherein the gasket includes a plurality of holes corresponding to the plurality of pins, and wherein the plurality of pins are configured to mate with the plurality of holes to retain the gasket within the perforated cover plate.

B4.1. The array plate of any of paragraphs B0 through B3.4.2, wherein the perforated cover plate includes a plurality of gasket retention lips extending from edges of the first apertures, wherein the plurality of gasket retention lips are configured to receive walls of the gasket in a friction fit.

B5. The array plate of any of paragraphs B0 through B4.1, wherein at least one slide of the one or more slides is a barcode slide; and wherein the first apertures and the second apertures define an array of wells configured to align with a printable region of the barcode slide, and a viewing window configured to align with a barcode of the barcode slide.

B6. The array plate of any of paragraphs B0 through B5, wherein the wells have a substantially square profile.

B7 The array plate of any of paragraphs B0 through B6, further comprising a peripheral rim extending from a bottom surface of the supportive base plate, such that the hybridization plate is compatible with a variety of shakers.

B8. The array plate of any of paragraphs B0 through B7, wherein the supportive base plate and the perforated cover plate each comprise stainless steel.

B8.1. The array plate of any of paragraphs B0 through B8, wherein the gasket comprises silicone.

B9. The array plate of any of paragraphs B0 through B8.1, wherein the array plate is configured to retain four slides, and wherein the perforated cover plate and the gasket collectively define twelve wells per slide.

B9.1. The array plate of any of paragraphs B0 through B9, wherein the array plate is configured to retain four slides, and wherein the perforated cover plate and the gasket collectively define eight wells per slide.

B9.2. The array plate of any of paragraphs B0 through B9.1, wherein the hybridization plate is configured to retain one slide, and wherein the perforated cover plate and the gasket collectively define forty-eight wells per slide.

C0. A method of assembling an array plate, the method comprising:

placing one or more slides into a bottom plate of the array plate;

pressing a gasket into the top plate of the array plate;

aligning the top plate and the gasket with the bottom plate and the one or more slides; and compressing the array plate by tightening one or more fasteners extending through the bottom plate and the top plate.

C1. The method of paragraph C0, wherein pressing the gasket into the top plate of the array plate comprises inserting pins extending from the top plate into holes extending from the gasket.

C2. The method of paragraph C0 or C1, wherein pressing the gasket into the top plate of the array plate comprises utilizing a gasket applicator to evenly apply pressure to the gasket.

C3.1. The method of paragraph C3, wherein pressing the gasket into the top plate comprises mating platforms of the gasket applicator with apertures defined by the gasket.

C3.1.1. The method of paragraph C3.1, wherein pressing the gasket into the top plate further comprises mating castellations of the gasket applicator with apertures defined by the top plate.

C4. The method of any of paragraphs C0 through C3.1.1, wherein aligning the top plate and the gasket with the bottom plate and the one or more slides further comprises slidably receiving peripheral walls extending from the bottom plate into a recess defined by peripheral walls extending from the top plate.

C4.1. The method of any of paragraphs C0 through C4, wherein aligning the top plate and the gasket with the bottom plate and the one or more slides further comprises aligning asymmetric ridges extending from the top plate with complementary asymmetric ridges extending from the bottom plate.

C5. The method of any of paragraphs C0 through C4.1, wherein compressing the array plate by tightening one or more fasteners extending through the bottom plate and the top plate comprises tightening one or more hex screws using a hex wrench.

C5.1. The method of any of paragraphs C0 through C5, wherein compressing the array plate by tightening one or more fasteners extending through the bottom plate and the top plate comprises tightening at least six fasteners.

C6. The method of any of paragraphs C0 through C5.1, further comprising sealing the top plate by applying a foil seal.

D0. A gasket application tool comprising:

a plurality of platforms extending from a planar expanse, wherein each platform is configured to be received by an aperture of a gasket.

D1. The gasket application tool of paragraph D0, further comprising a plurality of castellations, each castellation extending from a respective platform, wherein each castellation has a width and a length less than a width and a length of the respective platform.

E0. A method of disassembling an array plate, the method comprising:

loosening one or more fasteners coupling a top plate of the array plate to a bottom plate of the hybridization plate;

removing the top plate from the bottom plate; and ejecting one or more slides from the array plate.

E1. The method of paragraph E0, wherein loosening the one or more fasteners coupling the top plate of the array plate to the bottom plate of the hybridization plate is performed underwater.

E2. The method of paragraph E0 or paragraph E1, wherein loosening the one or more fasteners coupling the top plate of the array plate to the bottom plate includes unscrewing one or more hex screws using a hex wrench.

E3. The method of any of paragraphs E0 through E2, wherein ejecting the one or more slides from the array plate includes poking a bottom of each slide through one or more apertures provided in the bottom plate.

E3.1. The method of paragraph E3, wherein ejecting the one or more slides from the array plate includes inserting one or more protrusions extending from a slide ejection tool through the one or more apertures.

E4. The method of any of paragraphs E0 through E3.1, wherein ejecting the one or more slides from the array plate includes inserting one or more protrusions extending from a slide ejection tool through one or more apertures defined by a gasket of the hybridization plate.

F0. A slide ejection tool comprising:

a plurality of protrusions extending from a planar expanse, wherein each protrusion is configured to be received by an aperture of a bottom plate of an array plate.

F1. The slide ejection tool of paragraph F0, wherein each protrusion corresponds to a slide received by an array plate, and wherein each slide has at least one corresponding protrusion.

F1.1. The slide ejection tool of paragraph F0 or F1, wherein each slide has at least two corresponding protrusions.

F1.2. The slide ejection tool of paragraph F1.1, wherein the at least two corresponding protrusions are evenly distributed along a length of each slide.

F2. The slide ejection tool of any of paragraphs F0 through F1.1, wherein each protrusion has a height greater than a thickness of the bottom plate.

G0. An array plate comprising:

a perforated cover plate defining a plurality of apertures;

a slide support frame disposed beneath the perforated cover plate, the slide support frame defining a first window having a peripheral flange extending around at least a portion of the first window, wherein the first window is configured to receive a slide such that the slide is supported by the peripheral flange; and a supporting plate disposed beneath the slide support frame, the supporting plate comprising a peripheral lip and an underlying support surface;

wherein each of the perforated cover plate, the slide support frame, and the supporting plate comprise at least one through hole, the at least one through hole configured to receive a fastener.

G1. The array plate of paragraph A0, the hybridization plate further comprising: a gasket comprising a second plurality of apertures;

wherein the first and second plurality of apertures collectively define a plurality of wells, and wherein the gasket is configured to be sandwiched between the perforated cover plate and at least one slide received by the slide support frame.

G2. The array plate of paragraph G2, wherein each of the perforated cover plate, the slide support frame, and the supporting plate comprise at least four through holes disposed at corners of the hybridization plate.

G3. The array plate of paragraph G2, wherein tightening the fastener is configured to compress the slide between the perforated cover plate and the supporting plate.

H0. A hybridization system, the system comprising:

the array plate of any of paragraphs A0 through A9.2, B0 through B9.2, and G0 through G3;

the gasket application tool of paragraph D0 or D1; and the slide ejection tool of any of paragraphs F0 through F2.

ADVANTAGES, FEATURES, AND BENEFITS

The different embodiments and examples of the hybridization plates described herein provide several advantages over known labware for hybridization assays. For example, illustrative embodiments and examples described herein significantly limit cross-contamination leakage.

Additionally, and among other benefits, illustrative embodiments and examples described herein are assembled prior to use, making large, easily pipettable wells. Leaks within illustrative embodiments and examples described herein are not introduced if gasket walls are touched.

Additionally, and among other benefits, illustrative embodiments and examples described herein utilize a majority of a printable slide area of a printed microarray slide, as the printable slide area aligns with microwells.

Additionally, and among other benefits, illustrative embodiments and examples described herein provide a circular mixing pattern, maximizing array uniformity.

Additionally, and among other benefits, illustrative embodiments and examples described herein utilize recessed hex-head screws, allowing flat foil seal application. Recessed hex-head screws are also easy to loosen underwater.

Additionally, and among other benefits, illustrative embodiments and examples described herein provide useful tools for hybridization plate assembly and disassembly, such as slide ejection tools, and gasket application tools. Furthermore, illustrative embodiments and examples described herein improve ease of application between the gasket and the perforated cover plate by utilizing pins instead of metal recesses.

Additionally, and among other benefits, illustrative embodiments and examples described herein include a bottom rim allowing use in both flat-bottom plate shakers and shakers that hold the bottom rim of a plate.

Additionally, and among other benefits, illustrative embodiments and examples described herein retain slides without the use of set screws.

Additionally, and among other benefits, illustrative embodiments and examples described herein allow barcode scanning from above the hybridization plate. Furthermore, illustrative embodiments and examples described herein align the microwells with the printable slide area, such that the wells do not overlap with barcodes.

Additionally, and among other benefits, illustrative embodiments and examples described herein cannot be assembled upside down.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An array plate comprising:

a perforated cover plate defining a plurality of first apertures and including a rim extending from the perforated cover plate, wherein the rim defines a gasket retention recess;

a supportive base plate defining a planar surface; and a gasket sandwiched between the perforated cover plate and the supportive base plate and defining a plurality of second apertures, such that the plurality of first apertures and the plurality of second apertures collectively define a plurality of wells;

wherein at least a portion of the gasket is in the gasket retention recess.

2. The array plate of claim 1, further comprising a plurality of fasteners;

wherein the perforated cover plate further comprises at least six first through holes different from the first apertures and distributed around a periphery of the perforated cover plate;

wherein the supportive base plate further comprises at least six second through holes different from the second apertures and distributed around a periphery of the supportive base plate; and wherein each fastener extends through a corresponding first through hole of the perforated cover plate and a corresponding second through hole of the supportive base plate.

3. The array plate of claim 1, wherein the supportive base plate includes a slab defining the planar surface, and wherein the supportive base plate further comprises one or more peripheral walls extending vertically from slab, wherein each one of the one or more peripheral walls is aligned with a corresponding lateral edge of the supportive base plate.

4. The array plate of claim 3, further comprising one or more ridges extending vertically from the slab, such that the one or more ridges, the one or more peripheral walls, and the slab collectively define one or more slide retention recesses configured to retain a slide.

5. The array plate of claim 3, wherein the one or more peripheral walls extending from the slab are mated with corresponding peripheral walls extending from the perforated cover plate.

6. The array plate of claim 5, further comprising first asymmetrical peripheral ridges extending from the slab, and further comprising second asymmetrical peripheral ridges extending from the perforated cover plate, and wherein the first and second asymmetrical peripheral ridges are mated in a single orientation.

7. The array plate of claim 1, wherein the supportive base plate includes one or more platforms, each defining a respective planar surface configured to support a single slide.

8. The array plate of claim 7, further comprising a slide support frame sandwiched between the gasket and the supportive base plate, the slide support frame comprising a pair of rails and a plurality of rungs extending between the pair of rails and defining one or more windows.

9. The array plate of claim 8, wherein the one or more windows and the one or more platforms collectively define one or more slide retention recesses.

10. The array plate of claim 1, wherein the plurality of first apertures and the plurality of second apertures collectively define a first subset of wells of the plurality of wells disposed in an array configured to align with a printable region of a barcode slide; and wherein the plurality of first apertures and the plurality of second apertures collectively define a viewing window configured to align with a barcode of a barcode slide.

11. The array plate of claim 1, wherein the perforated cover plate and the gasket collectively define forty-eight wells.

12. An array plate comprising:

a perforated cover plate defining a plurality of first apertures and including a rim extending from the perforated cover plate, wherein the rim defines a gasket retention recess;

a supportive base plate defining a planar surface;

a gasket sandwiched between the perforated cover plate and the supportive base plate and defining a plurality of second apertures, such that the first plurality of apertures and the second plurality of apertures collectively define a plurality of wells; and one or more slides sandwiched between the gasket and the planar surface, such that the planar surface supports the one or more slides;

wherein at least a portion of the gasket is in the gasket retention recess.

13. The array plate of claim 12, further comprising a plurality of fasteners;

wherein the perforated cover plate further comprises at least six first through holes distributed around a periphery of the perforated cover plate;

wherein the supportive base plate further comprises at least six second through holes distributed around a periphery of the supportive base plate; and wherein each fastener extends through a corresponding first through hole of the perforated cover plate and a corresponding second through hole of the supportive base plate.

14. The array plate of claim 12, wherein the supportive base plate includes a slab defining the planar surface, one or more peripheral walls extending vertically from slab, and one or more ridges extending vertically from the slab, such that the one or more ridges and the one or more peripheral walls collectively define one or more slide retention recesses, each retaining one of the one or more slides.

15. The array plate of claim 12, further comprising a slide support frame sandwiched between the gasket and the supportive base plate, the slide support frame comprising a pair of rails and a plurality of rungs extending between the pair of rails and defining one or more windows;

wherein the supportive base plate includes one or more platforms, each defining a respective planar surface configured to support a single slide of the one or more slides; and wherein each one of the one or more windows and a respective one of the one or more platforms collectively define a slide retention recess, each slide retention recess is located in a respective one of the one or more slides.

16. The array plate of claim 12, wherein a slide of the one or more slides is a barcode slide; and wherein the plurality of first apertures and the plurality of second apertures define an array of wells aligned with a printable region of the barcode slide, and a viewing window aligned with a barcode of the barcode slide.

* * * * *